United States Patent
Dayanandan et al.

(10) Patent No.: US 10,194,328 B2
(45) Date of Patent: Jan. 29, 2019

(54) METHODS AND TOOLS FOR PERSISTENT SPECTRUM ANALYSIS OF AN OPERATING RADIO FREQUENCY BAND

(71) Applicant: Ubiquiti Networks, Inc., San Jose, CA (US)

(72) Inventors: Sriram Dayanandan, Dublin, CA (US); Vish Ponnampalam, Palo Alto, CA (US)

(73) Assignee: Ubiquiti Networks, Inc., New York, NY (US)

( * ) Notice: Subject to any disclaimer, the term of this patent is extended or adjusted under 35 U.S.C. 154(b) by 0 days.

(21) Appl. No.: 14/938,674

(22) Filed: Nov. 11, 2015

(65) Prior Publication Data

US 2016/0100320 A1 Apr. 7, 2016

Related U.S. Application Data

(63) Continuation of application No. 14/754,189, filed on Jun. 29, 2015.
(Continued)

(51) Int. Cl.
*H04W 16/18* (2009.01)
*H04W 4/021* (2018.01)
(Continued)

(52) U.S. Cl.
CPC .......... *H04W 16/18* (2013.01); *H04B 17/391* (2015.01); *H04K 3/226* (2013.01);
(Continued)

(58) Field of Classification Search
USPC ............................ 370/254; 455/456.1, 115.1
See application file for complete search history.

(56) References Cited

U.S. PATENT DOCUMENTS

| 4,060,716 A | 11/1977 | Pekrul et al. |
| 5,131,006 A | 7/1992 | Kamerman et al. |
| (Continued) | | |

FOREIGN PATENT DOCUMENTS

| CN | 101154991 A | 4/2008 |
| CN | 101984563 A | 3/2011 |
| (Continued) | | |

OTHER PUBLICATIONS

Hardy et al.; U.S. Appl. No. 14/918,381 entitled "Cloud device identification and authentication," filed Oct. 20, 2015.
(Continued)

*Primary Examiner* — Hanh N Nguyen
*Assistant Examiner* — Jose L Perez
(74) *Attorney, Agent, or Firm* — Shay Glenn LLP

(57) ABSTRACT

Generation and use of geographic databases of frequency spectral information within an operating frequency band. Described herein are methods of making databases of geospectral information and using these databases to optimize performance of wireless networks. For example, a network of wireless radio devices that monitor the frequency spectrum of the operating frequency band may provide this geographically marked information to a central database to create a database of geospectral frequency information. This geospectral frequency information may be used to characterize, optimize or modify a network of wireless radio device, or to modify an individual wireless radio device.

17 Claims, 47 Drawing Sheets

Related U.S. Application Data

(60) Provisional application No. 62/019,353, filed on Jun. 30, 2014, provisional application No. 62/094,869, filed on Dec. 19, 2014.

(51) Int. Cl.
  *H04L 12/24* (2006.01)
  *H04B 17/391* (2015.01)
  *H04W 24/10* (2009.01)
  *H04K 3/00* (2006.01)

(52) U.S. Cl.
  CPC ......... *H04K 3/822* (2013.01); *H04L 41/0823* (2013.01); *H04L 41/0893* (2013.01); *H04L 41/12* (2013.01); *H04L 41/145* (2013.01); *H04L 41/22* (2013.01); *H04W 4/021* (2013.01); *H04W 24/10* (2013.01); *H04K 2203/18* (2013.01)

(56) References Cited

U.S. PATENT DOCUMENTS

| | | |
|---|---|---|
| 5,151,920 A | 9/1992 | Haagh et al. |
| 5,295,154 A | 3/1994 | Meier et al. |
| 5,406,260 A | 4/1995 | Cummings et al. |
| 5,422,887 A | 6/1995 | Diepstraten et al. |
| 5,428,636 A | 6/1995 | Meier |
| 5,504,746 A | 4/1996 | Meier |
| 5,546,397 A | 8/1996 | Mahany |
| 5,706,428 A | 1/1998 | Boer et al. |
| 5,740,366 A | 4/1998 | Mahany et al. |
| 5,844,893 A | 12/1998 | Gollnick et al. |
| 5,936,542 A | 8/1999 | Kleinrock et al. |
| 5,940,771 A | 8/1999 | Gollnick et al. |
| 6,032,105 A * | 2/2000 | Lee .............. H04W 16/18 455/62 |
| 6,130,892 A | 10/2000 | Short et al. |
| 6,194,992 B1 | 2/2001 | Short et al. |
| 6,337,990 B1 | 1/2002 | Koshino |
| 6,374,311 B1 | 4/2002 | Mahany et al. |
| 6,563,786 B1 | 5/2003 | Nee |
| 6,636,894 B1 | 10/2003 | Short et al. |
| 6,665,536 B1 | 12/2003 | Mahany |
| 6,697,415 B1 | 2/2004 | Mahany |
| 6,714,559 B1 | 3/2004 | Meier |
| 6,789,110 B1 | 9/2004 | Short et al. |
| 6,795,852 B1 | 9/2004 | Kleinrock et al. |
| 6,810,426 B2 | 10/2004 | Mysore et al. |
| 6,857,009 B1 | 2/2005 | Ferreria et al. |
| 6,868,399 B1 | 3/2005 | Short et al. |
| 7,020,082 B2 | 3/2006 | Bhagavath et al. |
| 7,088,727 B1 | 8/2006 | Short et al. |
| 7,117,526 B1 | 10/2006 | Short |
| 7,194,554 B1 | 3/2007 | Short et al. |
| 7,197,556 B1 | 3/2007 | Short et al. |
| 7,295,812 B2 | 11/2007 | Haapoja et al. |
| 7,386,002 B2 | 6/2008 | Meier |
| 7,457,646 B2 | 11/2008 | Mahany et al. |
| 7,739,383 B1 | 6/2010 | Short et al. |
| 7,752,334 B2 | 7/2010 | Paunikar et al. |
| 7,826,426 B1 | 11/2010 | Bharghavan et al. |
| 8,077,113 B2 | 12/2011 | Syed et al. |
| 8,190,708 B1 | 5/2012 | Short et al. |
| 8,335,272 B2 | 12/2012 | Roberts |
| 8,483,188 B2 | 7/2013 | Walton et al. |
| 8,804,732 B1 | 8/2014 | Hepting et al. |
| 8,967,460 B1 | 3/2015 | Baykal et al. |
| 9,078,137 B1 | 7/2015 | Chechani et al. |
| 9,154,970 B1 | 10/2015 | Gatmir-Motahari et al. |
| 9,172,605 B2 | 10/2015 | Hardy et al. |
| 9,516,700 B1 | 12/2016 | Rybak et al. |
| 9,680,704 B2 | 6/2017 | Pera et al. |
| 9,838,927 B2 | 12/2017 | Bergström et al. |
| 2003/0198200 A1 | 10/2003 | Diener et al. |
| 2004/0028123 A1* | 2/2004 | Sugar ................ H04L 1/1664 375/224 |
| 2004/0143428 A1* | 7/2004 | Rappaport ............ G06F 17/509 703/22 |
| 2004/0242274 A1 | 12/2004 | Corbett et al. |
| 2007/0032254 A1 | 2/2007 | Chen |
| 2007/0070691 A1 | 3/2007 | Walvis et al. |
| 2007/0099660 A1 | 5/2007 | Bhesania et al. |
| 2007/0201540 A1 | 8/2007 | Berkman |
| 2008/0049625 A1 | 2/2008 | Edwards et al. |
| 2009/0109867 A1 | 4/2009 | Mangetsu |
| 2009/0175181 A1 | 7/2009 | Kim et al. |
| 2009/0196173 A1 | 8/2009 | Wang et al. |
| 2009/0286484 A1 | 11/2009 | Phung et al. |
| 2010/0008237 A1 | 1/2010 | Olgaard et al. |
| 2010/0124886 A1* | 5/2010 | Fordham ............ H04B 17/382 455/67.11 |
| 2010/0182983 A1 | 7/2010 | Herscovici et al. |
| 2010/0182984 A1 | 7/2010 | Herscovici et al. |
| 2010/0197317 A1 | 8/2010 | Sadek et al. |
| 2010/0278061 A1 | 11/2010 | Ezri et al. |
| 2011/0090812 A1 | 4/2011 | Aoyama |
| 2011/0164700 A1 | 7/2011 | Porat et al. |
| 2011/0185059 A1* | 7/2011 | Adnani ................ H04W 24/08 709/224 |
| 2011/0211628 A1 | 9/2011 | Hammarwall et al. |
| 2011/0258678 A1* | 10/2011 | Cowling .............. H04W 16/16 725/125 |
| 2011/0287778 A1* | 11/2011 | Levin .................. G01S 5/0252 455/456.1 |
| 2011/0317633 A1 | 12/2011 | Tan et al. |
| 2012/0061458 A1 | 3/2012 | Bahr et al. |
| 2012/0096271 A1 | 4/2012 | Ramarathinam et al. |
| 2012/0109719 A1 | 5/2012 | Parmar et al. |
| 2012/0122424 A1 | 5/2012 | Herscovici et al. |
| 2012/0188892 A1 | 7/2012 | Demilie et al. |
| 2012/0281000 A1 | 11/2012 | Woodings |
| 2012/0307927 A1 | 12/2012 | Nammi et al. |
| 2012/0317224 A1 | 12/2012 | Caldwell et al. |
| 2013/0017794 A1* | 1/2013 | Kloper .............. H04W 74/0808 455/63.1 |
| 2013/0051441 A1 | 2/2013 | Cho et al. |
| 2013/0067564 A1 | 3/2013 | Fok Ah Cheun et al. |
| 2013/0081113 A1 | 3/2013 | Cherian et al. |
| 2013/0103836 A1 | 4/2013 | Baniqued et al. |
| 2013/0129091 A1 | 5/2013 | Kang et al. |
| 2013/0163653 A1 | 6/2013 | Hirschmann et al. |
| 2013/0201316 A1 | 8/2013 | Binder et al. |
| 2013/0205134 A1 | 8/2013 | Holtmanns et al. |
| 2013/0256407 A1 | 10/2013 | Su et al. |
| 2013/0333005 A1 | 12/2013 | Kim et al. |
| 2013/0340059 A1 | 12/2013 | Christopher et al. |
| 2014/0004865 A1 | 1/2014 | Bhargava et al. |
| 2014/0005809 A1 | 1/2014 | Frei et al. |
| 2014/0036805 A1 | 2/2014 | Sadek et al. |
| 2014/0041012 A1 | 2/2014 | Yeow et al. |
| 2014/0092884 A1 | 4/2014 | Murphy et al. |
| 2014/0115354 A1 | 4/2014 | Jabbaz et al. |
| 2014/0122298 A1 | 5/2014 | Oyer |
| 2014/0126403 A1 | 5/2014 | Siomina |
| 2014/0146764 A1 | 5/2014 | Kim et al. |
| 2014/0211890 A1* | 7/2014 | Adnani ................ H04B 1/006 375/340 |
| 2014/0218255 A1* | 8/2014 | Sanford ................ H01Q 1/525 343/837 |
| 2014/0269375 A1* | 9/2014 | Garcia .................. H04W 24/08 370/252 |
| 2014/0331298 A1 | 11/2014 | Baker et al. |
| 2015/0009901 A1 | 1/2015 | Gorajala Chandra et al. |
| 2015/0156645 A1 | 6/2015 | Ponnuswamy et al. |
| 2015/0163753 A1 | 6/2015 | Valliappan et al. |
| 2015/0245360 A1 | 8/2015 | Gao et al. |
| 2016/0014793 A1 | 1/2016 | Klemp et al. |
| 2016/0066200 A1 | 3/2016 | Dayanandan et al. |
| 2016/0066202 A1 | 3/2016 | Dayanandan et al. |
| 2016/0135186 A1 | 5/2016 | Sun et al. |
| 2016/0143028 A1 | 5/2016 | Mancuso et al. |
| 2016/0226623 A1 | 8/2016 | Fröberg Olsson et al. |

(56) References Cited

U.S. PATENT DOCUMENTS

| | | |
|---|---|---|
| 2016/0315781 A1 | 10/2016 | Dronadula et al. |
| 2016/0323810 A1 | 11/2016 | May |
| 2017/0048243 A1 | 2/2017 | Hardy et al. |
| 2017/0374069 A1 | 12/2017 | Hardy et al. |

FOREIGN PATENT DOCUMENTS

| | | |
|---|---|---|
| CN | 103298000 A | 9/2013 |
| CN | 103796292 A | 5/2014 |
| JP | 2007074193 | 3/2007 |
| KR | 10-2013-0141939 | 12/2013 |
| WO | WO98/40990 A1 | 9/1998 |
| WO | WO01/31855 A2 | 5/2001 |
| WO | WO01/31886 A2 | 5/2001 |
| WO | WO01/86877 A2 | 11/2001 |
| WO | WO2008/042804 A2 | 4/2008 |
| WO | WO2011/005710 A2 | 1/2011 |
| WO | WO2013/122591 A1 | 8/2013 |
| WO | WO2013/123445 A1 | 8/2013 |

OTHER PUBLICATIONS

ETSI; Reconfigurable radio systems(RRS) functional architecture (FA) for the managemennt and control of reconfigurable radio systems; ETSI TR 102 682 V1.1.1; 45 pages; retrieved from the internet (http://portal.etsi.org/webapp/WorkProgram/Report_WorkItem.asp?WKI_ID=28797); © Jul. 17, 2009.

Ponnampalam et al.; U.S. Appl. No. 14/754,189 entitled "Methods and tools for assisting in the configuration of a wireless radio network using functional maps," filed Jun. 29, 2015.

* cited by examiner

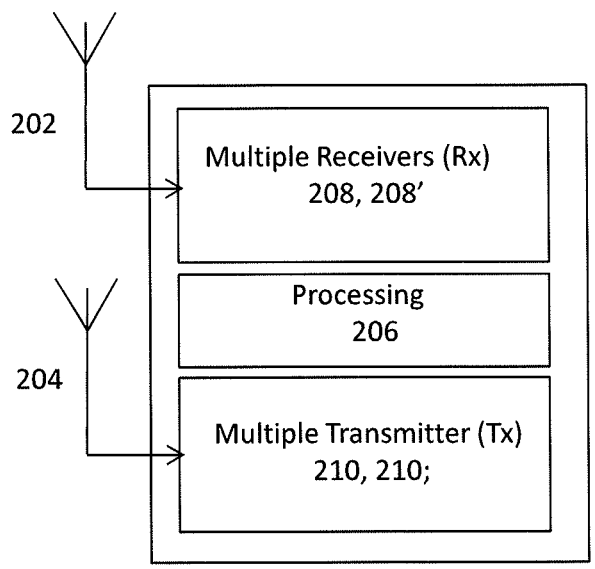
FIG. 2A
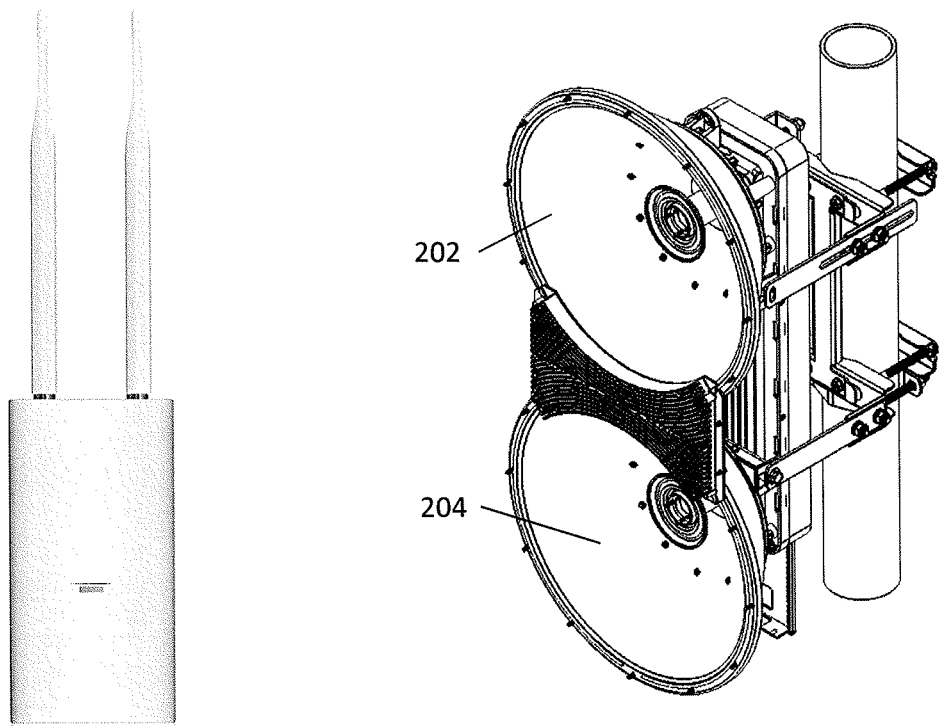
FIG. 2B
FIG. 2C

▲ 2003 Access Point

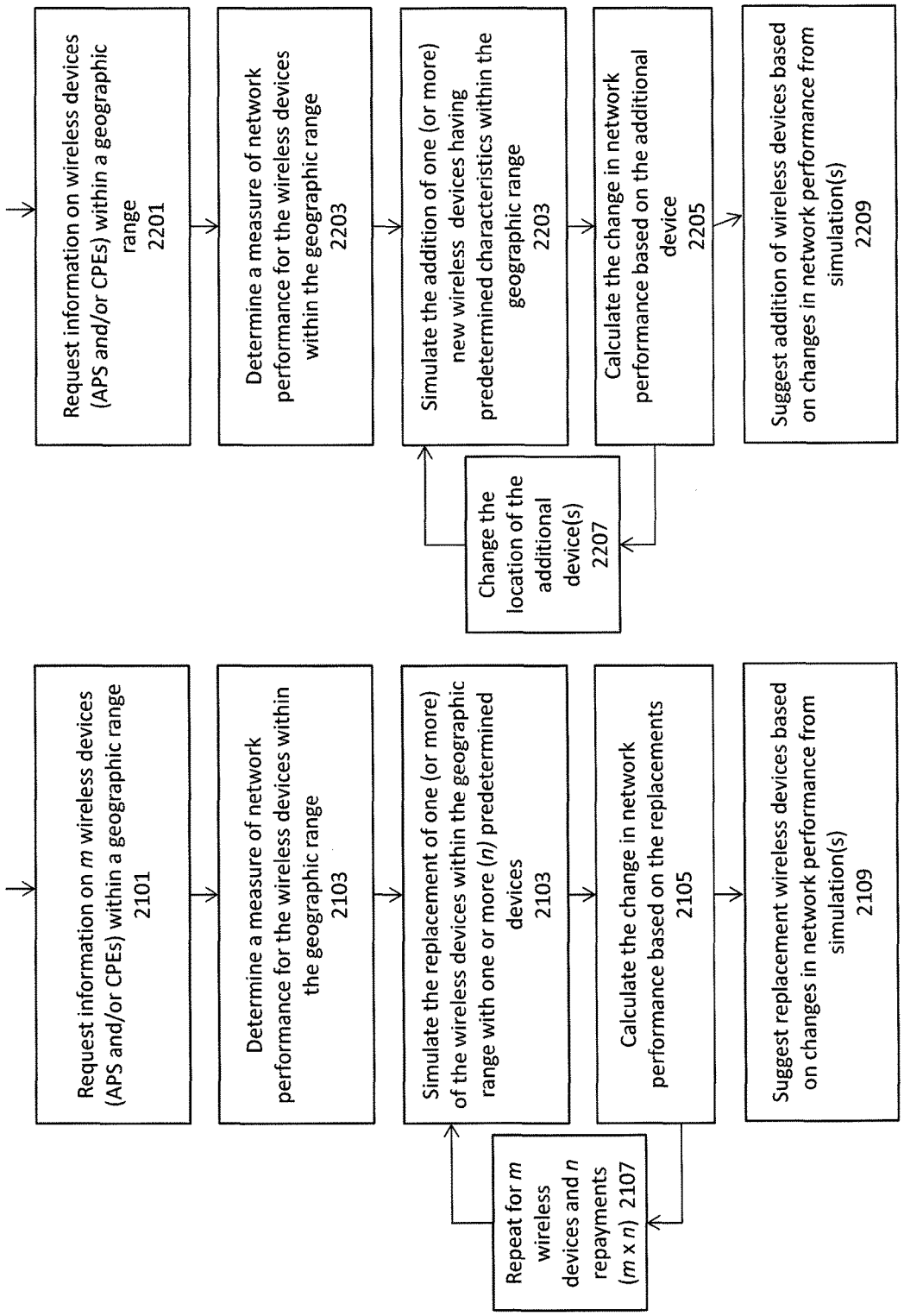

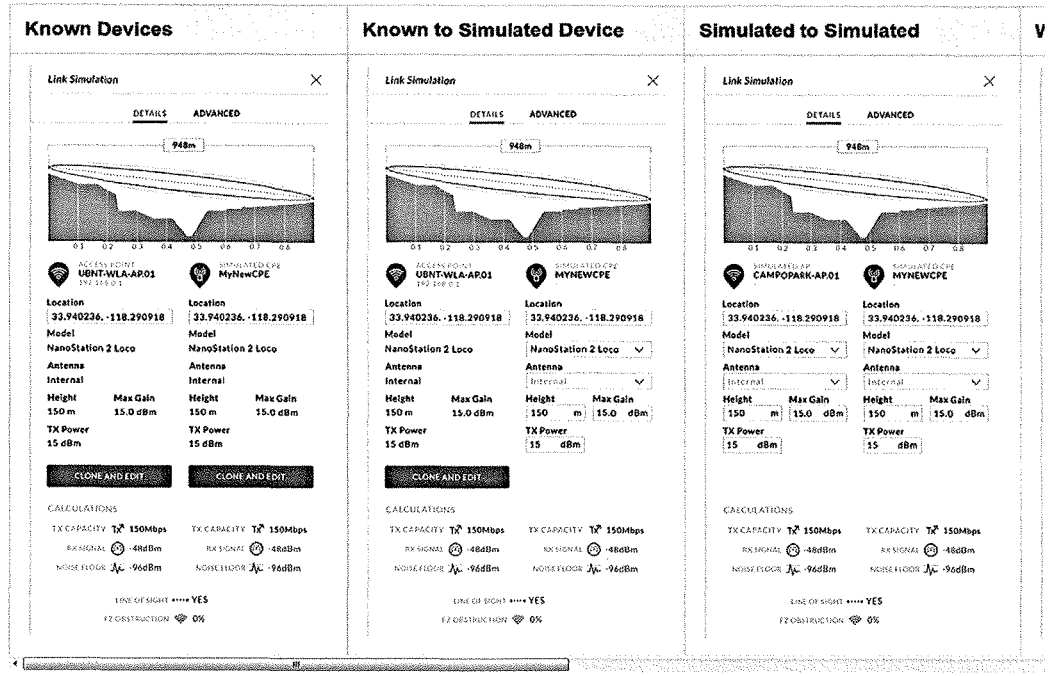
FIG. 37A
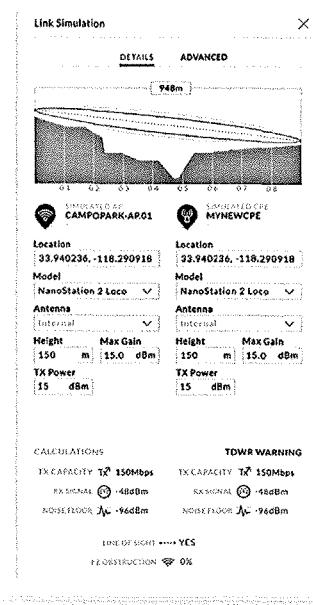 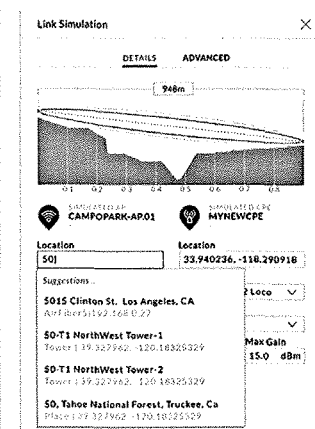 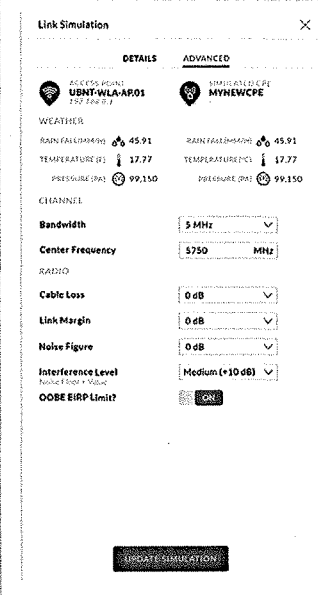
FIG. 37B

| Transmitting and Receive wireless info. within the operating freq. band (e.g., in one or more channels of the operating freq. band) from each of a plurality of wireless radio devices (e.g., wireless stations) that are separated geographically from each other and in wireless communication with an access point (e.g., transmit info. identifying the time, date or time and date that the set of spectrum info. was detected, and/or identifying the wireless radio device that detected the set of spectrum info.) 4201 |
|---|

| Monitoring the freq. spectrum of the operating freq. band (e.g., the entire operating band) over time to detect a set of spectrum info. of the operating freq. band from each of the wireless radio devices simultaneously with transmitting and receiving the wireless info. (e.g., storing one or more sets of spectrum info. of the operating freq. band in the wireless radio devices collecting the one or more sets of spectrum info) 4203 |
|---|

| Periodically transmitting to a spectrum analysis engine the spectrum info. with geographic location info. and time stamp info. 4205 |
|---|

| Creating a geographic database of spectrum info. over time using the spectrum info 4207 |
|---|

| Optionally updating the geographic database of spectrum info. with additional sets of spectrum info. detected at different times from each of the plurality of wireless radio devices 4209 |
|---|

FIG. 42A monitoring a freq. spectrum of the operating freq. band (e.g., the entire operating band) to detect a set of spectrum info. of the operating freq. band from each of a plurality of wireless radio devices (e.g., at least some of which are access points), wherein each of the wireless radio devices is configured to both monitor the freq. spectrum of the operating freq. band and to transmit and receive wireless info. (e.g., simultaneously monitor the freq. spectrum of the operating freq. band and transmit and receive wireless info. with other wireless radio devices, e.g., in one or more channels within the operating freq. band), and in some cases storing one or more sets of spectrum info. of the operating freq. band in the wireless radio devices collecting the one or more sets of spectrum info.
4213

encoding, in each wireless radio device, an enriched set of freq. spectrum info., wherein the enriched set of freq. spectrum info. includes the set of freq. spectrum info. and a geographic location of the wireless radio device that detected the set of freq. spectrum info. (e.g., also info. identifying the time, date or time and date that the set of spectrum info. was detected, and/or info. identifying the wireless radio device that detected the set of spectrum info.)
4215

transmitting the enriched set of freq. spectrum info. from each wireless radio device to a spectrum analysis engine
4217

aggregating the enriched sets of freq. spectrum info. to create a geographic database of spectrum info. over time
4219

updating the geographic database of spectrum info. with additional sets of spectrum info. detected at different times from each of the plurality of wireless radio devices
4221

FIG. 42B

METHODS AND TOOLS FOR PERSISTENT SPECTRUM ANALYSIS OF AN OPERATING RADIO FREQUENCY BAND

CROSS REFERENCE TO RELATED APPLICATIONS

This patent application is a continuation of U.S. patent application Ser. No. 14/754,189, filed Jun. 29, 2015, titled "METHODS AND TOOLS FOR ASSISTING IN THE CONFIGURATION OF A WIRELESS RADIO NETWORK," which claims priority to U.S. Provisional Patent Application. No. 62/019,353, filed Jun. 30, 2014, titled "CLOUD-BASED GEOGRAPHIC DATABASE OF FREQUENCY SPECTRUM INFORMATION WIRELESS NETWORKS," and U.S. Provisional Patent Application No. 62/094,869, filed Dec. 19, 2014, titled "METHODS AND APPARATUSES FOR MONITORING, CONFIGURING AND SIMULATING WIRELESS NETWORKS." Each of these patent applications is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are methods and tools for optimizing networks of wireless radio communications, including broadband wireless radios. These tools and methods may include the formation and use of geospectral maps, showing the regional and time-varying spectrum within an operating band.

BACKGROUND

Wireless communication devices and wireless networks have proliferated in recent years. This has resulted in region having different electromagnetic spectrum profiles. For example, in some regions geographic as well as population conditions have resulted in relatively crowded local frequency spectra. Although both regulatory agencies (such as the FCC in the United States) and manufacturers have attempted to regulate and minimize such crowding, it has proven difficult to optimize and prevent interference across commercially relevant portions of the electromagnetic spectrum. In particular, electromagnetic interference, from both natural and man-made sources, is difficult to predict and to avoid.

As the use of wireless devices continues to increase, the need for high-quality communication between wireless devices, and more particularly within entire networks of such devices becomes increasingly critical. Although it is difficult to predict and regulate the data rate of an entire network of radio devices, one important factor is the quality of each individual link. The type and performance parameters for each device in the network may contribute to the overall efficiency of the network. Thus, it may be important for a network administrator/installer to monitor the overall network in a manner that allows the quick and easy understanding of multiple performance metrics. Further, tools and methods of monitoring a network that simulate the performance (or changes in performance) and operation of the network or portions of the network over time would be particularly helpful. Graphical maps illustrating (in a cogent manner) all or relevant portions of a network may be particularly helpful.

In addition, it would be very helpful to provide tools and methods of recommending new devices or components of the wireless network, and/or replacement devices/components, based on a predetermined need (e.g., signal strength, up/down times, data rate, data densities, etc.) for all or portions of the network over time.

Thus, there is a need for devices and systems (e.g. tools), and particularly wireless radio devices and systems that provide both local monitoring of the frequency spectrum of a broadly-defined operating band while concurrently (and in some cases independently) receiving and transmitting wireless radio frequency signals.

In establishing wireless networks, e.g., wireless networks providing internet access, network management becomes important. For example, a wireless internet-providing network may consist of a variety of elements (nodes in the network) such an access point, backhauls, and customer provided elements (CPEs). In managing such networks it may be particularly helpful to generate, understand and manage the network topology which may provide information of network nodes, information of connection relationships between them, and, may provide a diagram of the whole network. Such topology diagrams may be particularly useful in understanding the connectivity between components of the network. On the basis of a network topology diagram, network managers can locate faulty nodes, expand the network, and/or enhance the behavior of all or parts of the network. In particular, it would be helpful to automatically generate topographical maps.

Although there are many methods for building network topology, it would be useful to provide one or more methods and tools (including device and systems) for automatically building, managing, displaying and manipulating network diagrams such as topology diagrams, and predicting changes in networks by manipulating a network topology. Finally, it would also be useful to provide one or more methods of group modifying parts of a network topology. Described herein are methods and apparatuses that may address the problems and needs discussed above.

SUMMARY OF THE DISCLOSURE

In general, described herein are tools and methods for the formation, regulation and modification of networks of wireless devices providing internet access. For example, described herein are tools and methods for optimizing the selection and placement of wireless radio devices in a network within a geographic region using a remote database. The remote database may include a geographic mapping of existing wireless devices within the network (and in some variations, one or more nearby networks), device characteristics for the wireless devices within the network, and radio frequency (RF) spectral information across times for a plurality of regions. As will be described in greater detail below, this RF spectral information may include the spectral information for these regions at multiple times (e.g. over a day, week, month, etc., including average values for daily, weekly, monthly and/or yearly time intervals) by minute, hour or multiple hour intervals. Any of the tools or methods described herein may include the use of a map, including some or all of this information.

For example, also described herein are tools and methods for forming (e.g., automatically), network topology diagrams representing logical groups of devices, and tools and methods for group configuring multiple devices within logical groups. Any of these tools or methods may be configured to automatically form and/or organize the topology diagram. These topology diagrams may be automatically determined using the database information described herein.

Also described herein are methods and apparatuses for simulating radio links of a network based on multiple variables, including actual geography, use profiles, and product/device parameters. Link simulation may be used as an interactive tool, and/or it may be used automatically, and may help determine placement and/or configuration (e.g., functional settings) of any of the nodes (APs, devices, backhauls, towers, etc.) of a network.

Any of the tools and methods described herein may be used to help modify and/or optimize a network. These tools and methods may be used to suggest and/or configure new devices (AP, CPEs, etc.) in a network. Described herein are a tools and methods for optimizing the selection and placement of wireless radio devices in a wireless network within a geographic region using a remote database that includes a geographic mapping of existing wireless devices within the network and/or adjacent networks, device characteristics for the wireless devices within the network and/or adjacent networks, and radio frequency spectral information across times for a plurality of regions (e.g., corresponding to locations of existing wireless devices). A tool may include a local user interface, a remote database, and a processor that communicates with the user interface and remote database. The methods and tools described herein may receive user input indicating a desired location and/or operational characteristics of new wireless radio device and may determine and suggest an optimal type, location and/or operational parameters for the additional device, or may suggest other modifications to the current network to optimize the network including the new device.

For example, a tool for assisting in the configuration of a wireless radio network may include: a user interface for a mobile device, the user interface configured to receive an input from a user and to output network management information, wherein the input includes a location of a new wireless radio device to be added to the wireless radio network within a geographic region; a database remote to the user interface, the database including a map of the geographic region, geographic location information for wireless devices within the wireless radio network, device characteristics for the wireless devices within the wireless radio network, and radio frequency (RF) spectral information over time for a plurality of regions within the geographic region; and a processor adapted to communicate with the user interface and the database and to send to the user interface the output network management information, wherein the output network management information comprising one or more of operational parameters for the new wireless radio device, a model type for the new wireless radio device, or a modification of one or more existing devices within the wireless radio network, wherein the output is determined by the processor using the map of the geographic region, the device characteristics for the wireless devices within the wireless radio network, and the radio frequency (RF) spectral information over time for the plurality of regions within the geographic region.

A tool for assisting in the configuration of a wireless radio network may include: a user interface for a mobile device, the user interface configured to receive an input from a user and to output network management information, wherein the input includes a location of a new wireless radio device to be added to the wireless radio network within a geographic region; a database remote to the user interface, the database including a map of the geographic region, geographic location information for each of a plurality of wireless devices within the wireless radio network, device characteristics for each of a plurality of wireless devices within the wireless radio network, radio frequency (RF) spectral information over time for a plurality of regions within the geographic region, and a listing of wireless radio device types including device characteristics for each of the types of listed wireless radio devices; and a processor adapted to communicate with the user interface and the database and to receive the input from the user interface and to send to the user interface the output network management information, the output network management information comprising a new device parameter determined by the processor using the map of the geographic region, the device characteristics for each of the plurality of wireless devices within the wireless radio network, the radio frequency (RF) spectral information over time for the plurality of regions within the geographic region, and the listing of wireless radio device types including device characteristics for each of the types of listed wireless radio devices; further wherein the new device parameter comprises one or more of: settings for the new wireless radio device, and a type of wireless radio device from the listing of wireless radio device types.

In general, a user interface is a graphical implementation through which a user and a computer system interact, and may include input devices (e.g., screens, displays, buttons, dials, etc.) and/or software and/or firmware running on a processor for controlling these interactive displays. For example, a user interface may be configured to display the map of the geographic region and allow the new wireless radio device to be selected on the map. A user interface may be configured to allow the user to input target characteristics of the new wireless radio device and wherein the process is configured to use these target characteristics to determine the output. A user interface may be configured to receive as input the wireless radio device type (which may include the make and/or model of the device, and/or may indicate that the device is an access point or CPE, etc.) for the new wireless radio device and wherein the process is configured to use the wireless radio device type to determine the output.

As used herein, a database includes a structured set of data held in a server, processor, memory, etc. (e.g., computer) that is accessible in various ways. The database may be indexed or cross-reference. For example, the databases described herein may be geographic databases which may index data based on the location (geographic location), the device (which may be associated with a geographic location) and/or the time/date, etc. The database may be an integrated collection of logically related data that consolidates information previously stored in separate locations into a common pool of records. A database may include any type of data and may be stored in virtually any format. Examples of the types of data that may be included are provided herein. A database may be part of a remote server and it may be consolidated, distributed and/or mirrored. The database may be on "cloud" server that is remotely accessible.

In some variations, where the database includes geographic information, the database may include terrain features (e.g., ground elevation, mountains, rivers, hills, cliffs, bodies of water, etc.) and man-made features (e.g., buildings, roads, towers, etc.). A database may include terrain obstructions as part of the map of the geographic region. For example, a database may include the geographic location information for the wireless devices within the wireless radio network including a plurality of access points and client devices.

Device characteristics for the wireless devices within the wireless radio network may include one or more of: power, antenna gain, antenna direction, data rate, operating frequency, operating frequency channel(s), maximum Tx/Rx rate(s), center frequency, interference level, bandwidth/channel width, cable loss, maximum power output, etc. The devices may be identified by one or more of: name (alphanumeric) and/or SSID, IP address, etc., or any sub-set of these. For example, device characteristics for the wireless devices within the wireless radio network database may comprise received signal strength information and usage information.

Any of the databases may also include device location information (e.g., for a specific device, the longitude, latitude, elevation/height, orientation, etc.) of the device.

Any of the databases described herein as part of the tools and/or used by a method may be a geospectral database. For example a database may include frequency spectral information received from a plurality of the devices within the wireless radio network at multiple times over a time period of greater than, e.g., 12 hours (e.g., greater than: 24 hours, 36 hours, 48 hours, 3 days, 4 days, 5 days, 6 days, 7 days, 8 days, 9 days, 10 days, 2 weeks, 3 weeks, 4 weeks, 5 weeks, 6 weeks, 2 months, 3 months, 4 months, 1 year, 2 years, etc.) comprising the radio frequency (RF) spectral information over time for a plurality of regions within the geographic region.

As mentioned, any of the tools described herein may include and/or be configured to operate with a processor. For example, the tools may include code configured to cause a processor to determine an output based on a metric for network performance over time including the RF spectral information, further wherein the metric comprises one or more of: predicted signal to noise ratios (SNR), network capacity, or data throughput.

The output of the user interface may include settings for the new wireless radio device, wherein the processor determines the output by estimating the data rate over time for the new wireless device to be added based on the received input and the geographic location information for the plurality of wireless devices within the wireless radio network, device characteristics for the wireless devices within the wireless radio network, and radio frequency (RF) spectral information over time within the geographic region.

As mentioned, in some variations the tool may provide an output recommending that a particular device (or type of device, e.g., a make/model of device having predetermined performance capabilities). For example, the output may include a type of wireless radio device from a listing of wireless radio device types, further wherein the processor determines the output by estimating the data rate over time for the new wireless device to be added based on the received input and the geographic location information for the plurality of wireless devices within the wireless radio network, device characteristics for the wireless devices within the wireless radio network, and radio frequency (RF) spectral information over time within the geographic region.

In general, described herein are methods for configuring a wireless radio network, the method comprising: displaying a user interface on a mobile device; receiving from the user interface an input from a user, wherein the input includes a location of a new wireless radio device to be added to the wireless radio network within a geographic region; contact-ing, in a processor, a database remote to the user interface, the database including a map of the geographic region, geographic location information for wireless devices within the wireless radio network, device characteristics for the wireless devices within the wireless radio network, and radio frequency (RF) spectral information over time for a plurality of regions within the geographic region; determining an output network management information, wherein the output network management information comprising one or more of operational parameters for the new wireless radio device, a model type for the new wireless radio device, or a modification of one or more existing devices within the wireless radio network, further wherein the output is determined by the processor using the map of the geographic region, the device characteristics for the wireless devices within the wireless radio network, and the radio frequency (RF) spectral information over time for the plurality of regions within the geographic region; and displaying the output on the user interface.

A method for configuring a wireless radio network may include: displaying a user interface on a mobile device; receiving from the user interface an input from a user, wherein the input includes a location of a new wireless radio device to be added to the wireless radio network within a geographic region; contacting, in a processor, a database remote to the user interface, the database including a map of the geographic region, geographic location information for wireless devices within the wireless radio network, device characteristics for the wireless devices within the wireless radio network, and radio frequency (RF) spectral information over time for a plurality of regions within the geographic region; determining an output comprising a new device parameter for the new wireless radio device, wherein the new device parameter comprises one or more of operational parameters for the new wireless radio device or a model type for the new wireless radio device, further wherein the new device parameter is determined by the processor using the map of the geographic region, the device characteristics for the wireless devices within the wireless radio network, the radio frequency (RF) spectral information over time for the plurality of regions within the geographic region, and a listing of wireless radio device types; and displaying the new device parameter on the user interface.

For example, a method may include automatically modifying one or more existing devices within the wireless radio network using the determined output network management information.

Receiving the input from the user may include displaying the map of the geographic region and allowing the user to select the location of the new wireless radio device on the map. Alternatively or additionally, the user may enter (by keystrokes, pull-down menus, or any equivalent technique) input into the user interface.

Receiving the input may comprise allowing the user to input target characteristics of the new wireless radio device and further wherein determining comprises using these target characteristics to determine the output. For example, receiving the input may comprise receiving a wireless radio device type for the new wireless radio device and further wherein determining comprises using the wireless radio device type to determine the output.

Contacting the database may comprises contacting a remote server, e.g., wirelessly, via an Ethernet cable, or any other appropriate means.

As mentioned above and shown in detail herein, determining an output may comprise using terrain obstructions as part of the map of the geographic region. For example, determining an output may comprise using the geographic location information for the access points and client devices within the network.

Determining an output may comprise using, for the wireless devices within the wireless radio network, one or more of: power, antenna gain, antenna direction, data rate, and operating frequency. Thus, any or some (or all) of this information may be used, as will be illustrated below, to determine the output. For example, determining an output may comprise using received signal strength information and usage information as the device characteristics for the wireless devices. Determining the output network management information may include using frequency spectral information received from a plurality of the devices within the wireless radio network at multiple times over a time period of greater than 12 hours (e.g., greater than: 24 hours, 36 hours, 48 hours, 3 days, 4 days, 5 days, 6 days, 7 days, 8 days, 9 days, 10 days, 2 weeks, 3 weeks, 4 weeks, 5 weeks, 6 weeks, 2 months, 3 months, 4 months, 1 year, 2 years, etc.) comprising the radio frequency (RF) spectral information over time for a plurality of regions within the geographic region. Determining the output network management information may include determining the output based on a metric for network performance over time including the RF spectral information, further wherein the metric comprises one or more of: predicted signal to noise ratios (SNR), network capacity, or data throughput.

Determining the output may comprise estimating the data rate over time for the new wireless device to be added based on the received input and the geographic location information for the plurality of wireless devices within the wireless radio network, device characteristics for the wireless devices within the wireless radio network, and radio frequency (RF) spectral information over time within the geographic region.

As mentioned above, also described herein are methods of building the databases described, and particularly databases include geospectral information, in addition to using them to optimize, suggestion or predict modifications to the network(s) they describe. Generation and use of geographic databases of frequency spectral information within an operating frequency band. Thus, described herein are methods of making databases of geospectral information and using these databases to optimize performance of wireless networks. For example, a network of wireless radio devices that monitor the frequency spectrum of the operating frequency band may provide this geographically marked information to a central database to create a database of geospectral frequency information. This geospectral frequency information may be used to characterize, optimize or modify a network of wireless radio device, or to modify an individual wireless radio device.

For example, a method of persistent spectrum analysis of an operating frequency band may include(e.g., FIG. 42A): transmitting and receiving wireless information within the operating frequency band from each of a plurality of wireless radio devices that are separated geographically from each other and in wireless communication with an access point 4201; monitoring the frequency spectrum of the operating frequency band over time to detect a set of spectrum information of the operating frequency band from each of the wireless radio devices simultaneously with transmitting and receiving the wireless information 4203; periodically transmitting to a spectrum analysis engine the sets of spectrum information detected along with information identifying the geographic location of the wireless radio device that detected each set of spectrum information, wherein each set of spectrum information is time stamped 4205; and creating a geographic database of spectrum information over time at the spectrum analysis engine using the sets of spectrum information 4207.

Also described herein are methods of building a geographic database of spectrum information for an operating frequency band. For example, a method of building a geographic database of spectrum information for an operating frequency band may include (FIG. 42B): monitoring a frequency spectrum of the operating frequency band to detect a set of spectrum information of the operating frequency band from each of a plurality of wireless radio devices 4213, wherein each of the wireless radio devices is configured to both monitor the frequency spectrum of the operating frequency band and to transmit and receive wireless information; encoding, in each wireless radio device, an enriched set of frequency spectrum information, wherein the enriched set of frequency spectrum information includes the set of frequency spectrum information and a geographic location of the wireless radio device that detected the set of frequency spectrum 4215; information; transmitting the enriched set of frequency spectrum information from each wireless radio device to a spectrum analysis engine 4217; and aggregating the enriched sets of frequency spectrum information to create a geographic database of spectrum information over time 4219.

The plurality of wireless radio devices may be wireless stations (e.g., access points, CPEs, etc.). For example, at least some of the wireless radio devices are access points.

Monitoring may include monitoring the frequency spectrum of the entire operating band. The operating band may be any appropriate frequency spectral range, e.g., 5 GHz to 6 GHz (e.g., covering the 5 GHz band), 2.4 GHz to 2.5 GHz (e.g., covering the 2.4 GHz band), 3.60 to 3.70 (e.g., covering the 3.6 GHz band), 60.0 to 61.0 GHz (e.g., covering the 60 GHz band), etc. Transmitting and receiving may include transmitting and receiving in one or more channels within the operating frequency band. Transmitting may include transmitting information identifying the time, date or time and date that the set of spectrum information was detected. Transmitting may comprise transmitting information identifying the wireless radio device that detected the set of spectrum information.

Monitoring the frequency spectrum of the operating frequency band may comprise storing one or more sets of spectrum information of the operating frequency band in the wireless radio devices collecting the one or more sets of spectrum information. Any of these methods may include updating the geographic database of spectrum information with additional sets of spectrum information detected at different times from each of the plurality of wireless radio devices.

As mentioned above, at least some of the wireless radio devices may be access points (APs) and/or CPE, etc. The step of monitoring may comprise monitoring the frequency spectrum of the entire operating band, or a portion of the entire operating band (e.g., more than 50%, more than 60%, more than 70%, more than 80%, more than 90%, etc.). The operating band may be regulated (e.g., the 5 GHz band) or unregulated band, or may span both. The step of transmitting and receiving may comprise transmitting and receiving in one or more channels within the operating frequency band.

Each of the wireless radio devices may be configured to simultaneously monitor the frequency spectrum of the operating frequency band and to transmit and receive wireless information with other wireless radio devices. In general, each of the wireless radio devices is configured to transmit and receive wireless information in one or more channels within the operating frequency band.

The step of encoding may comprise including in the enriched set of frequency spectrum information identifying the time, date or time and date that the set of spectrum information was detected, and/or information identifying the wireless radio device that detected the set of spectrum information.

Monitoring the frequency spectrum of the operating frequency band may comprise storing one or more sets of spectrum information of the operating frequency band in the wireless radio devices collecting the one or more sets of spectrum information.

The method may also include updating the geographic database of spectrum information with additional sets of spectrum information detected at different times from each of the plurality of wireless radio devices.

Each of the wireless radio devices may be configured to simultaneously monitor the frequency spectrum of the operating frequency band and to transmit and receive wireless information with other wireless radio devices. Each of the wireless radio devices may be configured to transmit and receive wireless information in one or more channels within the operating frequency band.

Encoding may comprise including in the enriched set of frequency spectrum information identifying the time, date or time and date that the set of spectrum information was detected. Encoding may comprise including in the enriched set of frequency spectrum information identifying the wireless radio device that detected the set of spectrum information.

Monitoring the frequency spectrum of the operating frequency band may include storing one or more sets of spectrum information of the operating frequency band in the wireless radio devices collecting the one or more sets of spectrum information.

Any of these methods may also include updating the geographic database of spectrum information with additional sets of spectrum information detected at different times from each of the plurality of wireless radio devices.

A method of mapping wireless coverage within a geographic region may include: retrieving information on wireless radio devices within the geographic region from a database of geographic wireless spectrum information, wherein the database comprises spectrum information within an operating frequency band from each of a plurality of wireless radio devices that are separated geographically from each other, information identifying the geographic location of the wireless radio devices, and an operating characteristic and/or an operating characteristics identifier for each of the wireless radio devices within the geographic region; and presenting a map of the geographic region including an icon for each of the wireless radio devices within the geographic region wherein the icon for each of the wireless radio devices is arranged geographically on the map; and indicating, on the map, one or more of: signal range and/or strength for each wireless radio device within the geographic region; frequency spectrum within the operating frequency band at one or more of the wireless radio devices within the geographic region; time course of signal strength within one or more predetermined frequency within the operating band for one or more of the wireless radio devices within the geographic region; and identity as an access point (AP) or customer provided equipment (CPE).

A method of improving wireless coverage of a network may include one or more access point communicating with a plurality of client wireless radio devices, the method comprising: retrieving, in a processor, information on wireless radio devices within a geographic region from a database of geographic wireless spectrum information, wherein the database comprises spectrum information at a plurality of different times within an operating frequency band from each of a plurality of wireless radio devices that are separated geographically from each other, information identifying the geographic location of the wireless radio device, and an operating characteristic and/or an operating characteristics identifier for each of the wireless radio devices within the geographic region; and simulating, using the processor, based on the retrieved information, the effect of switching at least one of the wireless radio devices within the geographic region with a predetermined wireless radio device having different operating characteristics; calculating a measure of improvement based on the simulation; and presenting, on a user interface, when the simulation indicates an improvement in network performance, the predetermined wireless radio device, the measure of improvement, and the identifier of the at least one wireless radio device within the geographic region. In any of these methods, the wireless ratio device switched may be an access point.

A method of estimating network performance within a geographic region, the method comprising: retrieving information on wireless radio devices within a geographic region from a database of geographic wireless spectrum information, wherein the database comprises spectrum information within an operating frequency band from each of a plurality of wireless radio devices that are separated geographically from each other, information identifying the geographic location of the wireless radio device, and an operating characteristic and/or an operating characteristics identifier for each of the wireless radio devices within the geographic region; simulating, based on the retrieved information, the effect of adding at least one additional wireless radio device within the geographic region, the additional wireless radio device having predetermined operating characteristics; calculating a measure of change in network performance based on the simulation; and presenting an indicator of network performance based on the simulation.

The simulation may include optimizing the geographic location and/or performance characteristics, from a list of predetermined performance characteristics, by maximizing the improvement in network performance.

In addition to the tools and methods described herein for using the mapping and databases (e.g., geospectral databases of network spectral information over time), also described herein are methods and tools for mapping, including method of optimizing the display of any of the maps described herein. These user interfaces, or display, methods and tools are particularly advantageous because they permit the simplification of a large amount of complex information so that a user may quickly and accurately understand and modify the network.

Specifically, described herein are tools and methods for the formation, regulation and modification of networks of wireless devices providing internet access (e.g., radio devices). Tools and methods for forming, including automatically forming, network topology diagrams representing logical groups of devices as a single node in the diagram, and tool and methods for group configuring multiple devices within logical groups. Also described herein are methods and apparatuses for simulating radio links of a network based on multiple variables, including actual geography, use profiles, and product/device parameters.

A method of automatically determining and displaying a topological representation of a wireless network having a plurality of nodes connected to an internet source, the method comprising: grouping a plurality of radio devices into logical groups based on shared connectivity and one or more properties into a logical group node; displaying a plurality of logical group nodes with connections between the logical group nodes illustrated; and annotating the logical group nodes to indicate a number of radio devices within the logical group node, a category of radio devices in the logical group node, and an estimate of the efficiency of the radio devices in the logical group node.

In any of these tools and methods for determining topological representation of the network (or a portion of the network), the topological representation may be automatically determined, e.g., the connectivity of each of the plurality of radio devices may be automatically determined. This is particularly advantageous particularly in topologies including switches, because automatically determining connection where switching is used has proven difficult. For example, any a method (or tool) may include automatically determining the connectivity of each of the plurality of radio devices by accessing a database including and radio frequency (RF) spectral information over time for a plurality of regions within a geographic region.

As mentioned above, the nodes may correspond to client devices having wireless radios connected to an access point. Displaying may comprise displaying on a geographical map.

In general, the one or more properties that may be used to group devices into logical groups may generally include device operational characteristics, for example: device type, device make/model, and device status.

Any of these methods including determining topological representations may also include selecting a logical group and operating on all of the members of the selected logical group. For example, any of these methods may include selecting a logical group and concurrently configuring all of the members of the selected logical group.

Any of these methods may also include allowing a user to select a device from a logical group and displaying device-specific information on that device.

Annotating the logical group nodes to indicate a category of radio devices in the logical group node may include indicating that the local group node is online, offline and/or the data rate (Tx, Rx, Tx/Rx, etc.), or the like.

For example, a method of automatically configuring a group of radio devices wirelessly connected to an internet source may include: grouping a plurality of radio devices into logical groups based on shared connectivity and one or more properties into a logical group node; displaying a plurality of logical group nodes with connections between the logical group nodes illustrated; selecting one or more logical group nodes; selecting a configuration parameter; and configuring the radio devices within the one or more selected logical group nodes with the configuration parameter in an order from furthest to closest to the internet source. The method may include automatically determining the connectivity of each of the plurality of radio devices. For example, automatically determining the connectivity of each of the plurality of radio devices by accessing a database including and radio frequency (RF) spectral information over time for a plurality of regions within a geographic region.

The nodes may correspond to client devices having wireless radios connected to an access point.

In general, displaying may comprise displaying on a geographical map.

As mentioned above, the one or more properties that may be used to group the devices may include: device type, device make/model, and device status. These methods may also include allowing a user to select a device from a logical group and displaying device-specific information on that device.

Any of the tools and methods described herein may include determining and/or displaying a dynamic link, including the calculation of a link between two or more devices in a network, such as between an AP and one or more CPEs. These calculations may be performed on actual devices in a network or based on simulated devices (within an actual network of devices), or they may be used to simulate changes in an actual device (e.g., changes in location, orientation, or any other property of the device or network).

For example, described herein are methods of simulating one or more links in a network to determine wireless transmission characteristics based on the simulated link. A method of simulating one or more links in a network to determine wireless transmission characteristics based on the simulated link may include: placing, on a map of a geographic location, a first point corresponding to an access point and a second point corresponding to a wireless radio device; simulating the transmission characteristics on a link between the first and second points based on the free space loss (FSL), receive signal level (RSL), Fresnel zone and a rain rate; and displaying an indication of the quality of the transmission characteristics on one or more lines connecting the plurality of points.

Any of these methods may advantageously include displaying, on or adjacent to the map, a Fresnel profile between the access point and the wireless radio device, wherein the Fresnel profile comprises a geographic amplitude, a region representing a 100% Fresnel zone and a region representing a Fresnel zone that is between 50% and 100% (e.g., 50%, 60%, 70%, 80%, 90%, 95%, etc.).

A method of simulating one or more links in a network to determine wireless transmission characteristics based on the simulated link may include: placing, on a map of a geographic location, a first point comprising an access point and a second point comprising a wireless radio device; simulating the transmission characteristics of a link between the first point and the second point based on the free space loss (FSL), receive signal level (RSL), Fresnel zone and a rain rate; displaying an indication of the quality of the transmission characteristics on one or more lines connecting the plurality of points; displaying, on or adjacent to the map, a Fresnel profile between the access point and one of the wireless radio devices, wherein the Fresnel profile comprises a geographic amplitude, a region representing a 100% Fresnel zone and a region representing a Fresnel zone that is between 50% and 100%; and displaying, on or adjacent to the map, a status description of the access point and the plurality of wireless radio devices, comprising a name and actual or simulated link efficiency between the access point and each of the plurality of wireless radio devices.

The method may also advantageously include displaying, on or adjacent to the map, a status description of the access point and the wireless radio device, comprising a name and an actual or simulated link efficiency between the access point and the wireless radio device.

Placing may include placing the second point corresponding to a simulated wireless radio device. The method may include placing a third point corresponding to an actual wireless radio device.

Any of these methods may also advantageously include displaying on or adjacent to the map a point corresponding to radar tower. For example, displaying on or adjacent to the map an indicator of potential interference from or with a radar source.

Any of these methods may also advantageously include displaying on or adjacent to the map a graph illustrating the actual or simulated data rate of the link over a predetermined time period of greater than 4 hours (e.g., greater than 8 hours, greater than 12 hours, greater than 24 hours, greater than 2 days, etc. including between 4 hours and 5 days, between 4 hours and 48 hours, between 4 hours and 24 hours, between 4 hours and 12 hours, etc.).

Displaying the indication of the quality of the transmission characteristics on one or more lines connecting the plurality of points may include displaying a line representing the link in a color or texture indicating the quality or efficiency of the link.

In any of the devices described herein, the devices may include a spectrum analyzer portion and a first receiver that may be operated concurrently and independently of each other. Information on the spectrum that comes from monitoring the operating band may be stored, analyzed and/or transmitted by a processor that is associated with the spectrum analyzer, referred to herein as a spectrum processor. The spectrum information may be encrypted and may be transmitted to one or more remote processors (including servers) using the transmitter (Tx) that is used for normal operation of the wireless radio, or the spectrum analyzer may include a dedicated transmitter (or transceiver).

In general, the spectrum processor may be separate than a processor that operates/control operation of the primary receiver (and/or transmitter and/or transceiver). For example, the spectrum processor may be configured to store, transmit, and/or analyze the spectrum information, as well as control the scanning of the spectrum by the spectrum analyzer (secondary receiver). For example, a spectrum process of a spectrum analyzer may be configured to store spectrum information for later transmission. In some variations the spectrum processor may be configured to prepare the spectrum information for storage and/or transmission. For example, the spectrum processor may be configured to compress, extract, or encode the spectrum information for storage and/or transmission. For example, the spectrum processor may also attach additional information, such as identifying information for the device (wireless radio device) including a unique identifier specific to the device, and/or information about the general type of the device (model, year, etc.), time/date information may also be bundled with the spectrum information. The spectrum processor may therefore store the information and transmit it either continuously or discretely. The spectrum processor may use a dedicated transmitter and/or it may use the primary transmitter of the wireless radio device. For example, the spectrum information may be encoded and passed for transmission by the device (e.g. to a remote server) in a manner that does not interrupt normal operation of the wireless radio device (in the absence of the additional spectrum analyzer).

Also described herein (e.g., when building or maintaining a geospectral database) are general methods of simultaneously monitoring a frequency spectrum of an operating band and transmitting and receiving wireless information within the operating band. Any of these methods may be performed by the apparatuses (device and methods) described herein. For example, a method of simultaneously monitoring a frequency spectrum of an operating band and transmitting and receiving wireless information within the operating band may include: receiving and transmitting radio frequency signals within the operating band using a, wireless radio device including an integrated spectrum analyzer; continuously monitoring the frequency spectrum of the operating band using the wireless radio device concurrently with receiving and transmitting the radio frequency signals using the spectrum analyzer of the wireless radio device; and transmitting spectrum information collected from the spectrum analyzer to a remote spectrum analysis unit.

Another method of simultaneously and independently monitoring a frequency spectrum of an operating band and transmitting and receiving wireless information within the operating band may include: receiving and transmitting a radio frequency signal within the operating band using a, wireless radio device having an integrated spectrum analyzer; continuously monitoring the frequency spectrum of the operating band and encoding the spectrum information using the spectrum analyzer of the wireless radio device concurrently with receiving and transmitting the radio frequency signal within the operating band; and transmitting the spectrum information to a remote spectrum analysis unit.

As mentioned, in any of these methods, the spectrum information in the wireless radio device may be stored, for later analysis and/or transmission. Any of the methods descried herein may also include encoding the spectrum information in the wireless radio device.

Thus, described herein are methods of persistent spectrum analysis of an operating frequency band. These methods may include persistent monitoring to create a geospectral database, and/or to use this geospectral information to modify the operating of one or more (e.g., a network) wireless radio devices. In general, these methods may be performed while the geographically distributed nodes (wireless radio devices) providing spectrum information about the operating frequency band are also concurrently acting as wireless radio devices that transmit and receive wireless data; this wireless data may be encoded in packets or otherwise and may be received and transmitted in parallel with the persistent spectrum monitoring. For example, a method of persistent spectrum monitoring may include: transmitting and receiving wireless information within the operating frequency band from each of a plurality of wireless radio devices that are separated geographically from each other; monitoring the frequency spectrum of the operating frequency band to detect a set of spectrum information of the operating frequency band from each of the wireless radio devices; transmitting to a spectrum analysis engine the sets of spectrum information detected along with information identifying the geographic location of the wireless radio device that detected each set of spectrum information; and creating a geographic database of spectrum information at the spectrum analysis engine using the sets of spectrum information. The plurality of wireless radio devices may be access points (APs) and/or wireless stations (e.g., customer provided equipment that communicates with an AP).

As mentioned, monitoring may generally include monitoring the frequency spectrum of the entire operating band or a substantial portion of it (e.g., more than 50%, more than 60%, more than 70%, more than 80%, more than 90%, etc.). The operating band may be regulated (e.g., the 5 GHz band) or unregulated band, or may span both. The step of transmitting and receiving may comprise transmitting and receiving in one or more channels within the operating frequency band.

In general, the step of transmitting and receiving of wireless information may be performed simultaneously with monitoring the frequency spectrum. Thus, the nodes that feed spectrum information (e.g., APs, CPEs, etc.) may be operating as described above, as both wireless radio devices and as spectrum analyzers. The step of transmitting may comprise transmitting information identifying the time, date or time and date that the set of spectrum information was detected, and/or transmitting information identifying the wireless radio device that detected the set of spectrum information.

In general, the step of monitoring the frequency spectrum of the operating frequency band may comprise storing one or more sets of spectrum information of the operating frequency band in the wireless radio devices collecting the one or more sets of spectrum information. The wireless radio devices forming the nodes may store the spectrum information and/or may encode it, e.g., to form "enriched" spectrum information that includes the location and/or time/date and/or device receiving/recording the information.

The methods may also include updating the geographic database of spectrum information with additional sets of spectrum information detected at different times from each of the plurality of wireless radio devices.

Also described herein are methods of building a geographic database of spectrum information for an operating frequency band, the method comprising: monitoring a frequency spectrum of the operating frequency band to detect a set of spectrum information of the operating frequency band from each of a plurality of wireless radio devices, wherein each of the wireless radio devices is configured to both monitor the frequency spectrum of the operating frequency band and to transmit and receive wireless information; encoding, in each wireless radio device, an enriched set of frequency spectrum information, wherein the enriched set of frequency spectrum information includes the set of frequency spectrum information and a geographic location of the wireless radio device that detected the set of frequency spectrum information; transmitting the enriched set of frequency spectrum information from each wireless radio device to a spectrum analysis engine; and aggregating (e.g., collecting, combining, etc.) the enriched sets of frequency spectrum information to create a geographic database of spectrum information.

Thus, the tools and methods described herein may relate to the formation, regulation and modification of networks of wireless internet providing devices, including radio devices. These networks may include nodes having one or multiple connections, including access points (APs), Customer-premises equipment or customer-provided equipment (CPE), backhauls, etc. For example, described herein are methods and apparatuses for forming logical view network topology diagrams representing "logical groups" of devices as a single node in the diagram (e.g. a Backhaul represents a PtP link of two devices, CPEs connected to a single AP are grouped together), providing a simplified representation of a network. In particular, described herein are enhances displays/views that may be particularly useful for organizing and displaying nodes and groups of nodes in a relational manner.

In general, any of the methods and tools described herein may include methods and apparatuses for simulating modifications to a network, including the addition or removal (or change) of one or more links in the network. This may be referred to as a link simulator, and may include simulation based on multiple variables, including actual geography, use profiles, and product/device parameters, as well as concurrent/combined simulation of multiple links and/or link modifications (e.g. changing device characteristics, use profiles, or the like). Such link simulation may be particularly useful for simulating existing, real world devices, for planning installations of networks and/or network components. Finally, described herein are method and apparatuses for mobile presentation and control of any of the logical group diagrams, logical group configurations, and/or link simulations to a mobile communications (e.g., mobile phone) device.

BRIEF DESCRIPTION OF THE DRAWINGS

FIG. 2A is schematic diagrams showing one variation of a wireless broadband radio apparatus.

FIGS. 2B and 2C show variations of wireless broadband radio apparatuses; FIG. 2B shows a device having two antenna; in FIG. 2C, the device has two parabolic antenna.

FIG. 8 schematically illustrates the use of the GSBB to improve network performance by simulating the replacement of one or more wireless devices (e.g., APs) within the network.

FIG. 9 schematically illustrates the use of the GSDB model network performance by simulating the effect on network performance by adding one or more wireless devices.

in FIG. 24C, the Invercargill backhaul is selected, automatically selecting the upstream nodes connecting the backhaul to the internet. FIG. 24E illustrates a view of a selected backhaul (East Bay p2p device), including performance information about this node of the logical link display.

In FIG. 30, the user interface shown includes a geographical mapping (showing street locations and names) of a geographic region covered by a portion of a network or to be covered by a portion of a network.

FIG. 37A illustrates user interface display panels that may be used to describe link simulation between known (actual) devices in a network, known and simulated devices in the network, or just simulated devices. FIG. 37B illustrates user display panels similar to those shown in FIG. 37A showing a warning (e.g., of known RF source such as TDWR), or the use of intelligent searching to determine which devices (real or simulated) to use as links, as well as providing user input/output for simulating the link (advanced details).

In FIG. 38, exemplary input data, which may be used in the link simulation, is shown.

FIG. 42 shows a method of persistent spectrum analysis of an operating frequency band.

DETAILED DESCRIPTION

In general, described herein are tools and methods for managing (e.g., optimizing, modifying, etc.) a network of wireless radio frequency (RF) communication devices, including broadband networks. In particular, these methods and tools may be particularly well suited for networks including devices that both transmit and receive RF signals and, in some cases concurrently, monitor the RF spectrum. As will be apparent to those of skill in the art, not all of the tools and methods described herein are limited to operating with devices having spectral analysis capability or networks of such devices. However, such networks, which may provide dynamic (e.g., monitoring over time) information about the RF spectrum that may be useful or essential in some of the methods and tools described herein.

In general, a station, which may be an access point (capable of point-to-point and point-to-multipoint) or a CPE (typically point-to-point) may be configured to monitor the RF spectrum in and around which it operates. For example, a wireless radio apparatuses may include a first (primary) receiver and a second (secondary) receiver that are connected in parallel, for example, to the same receiving antenna. The primary receiver may be a high-selectivity receiver, and may be configured to receiver radio-frequency signals within an operating frequency band. The second receiver may be configured as a spectrum analyzer, that analyzes all or a portion (e.g., at predetermined frequency locations) of the operating band. The secondary receiver typically operates simultaneously with the first receiver, and may operate continuously or periodically (e.g., at regular intervals) to scan the operating band or predetermined portions of the operating band. The second receiver may be controlled by a secondary processor, which may be configured as a spectrum processor for controlling operation of the secondary receiver as a spectrum analyzer.

Figure 1B:
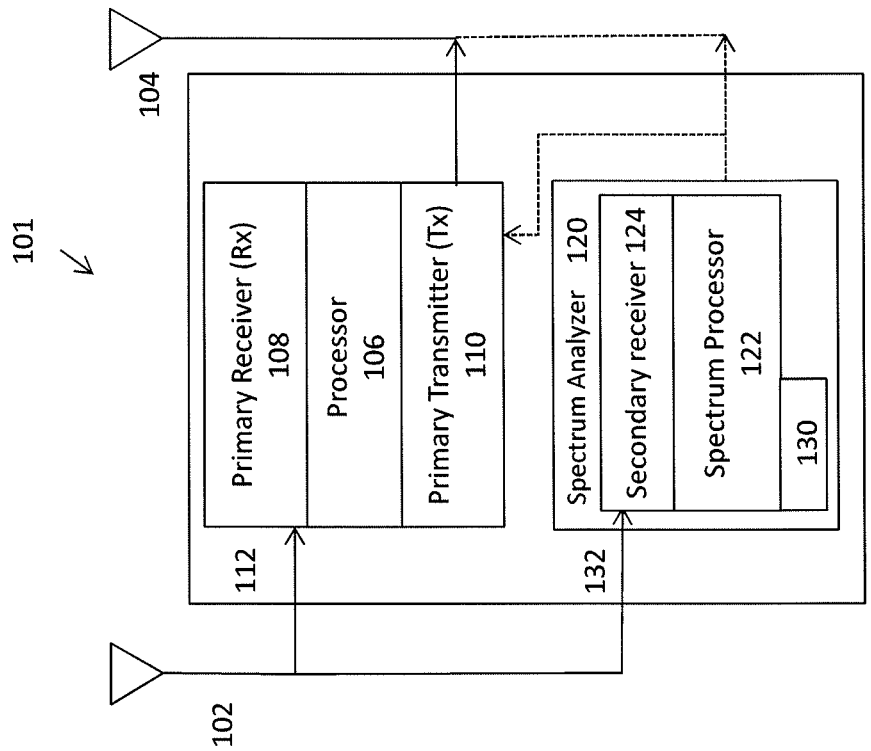
FIG. 1B schematically illustrates another example of a device having an integrated spectrum analyzer for independently and continuously monitoring the operating band.
Figure 1A:
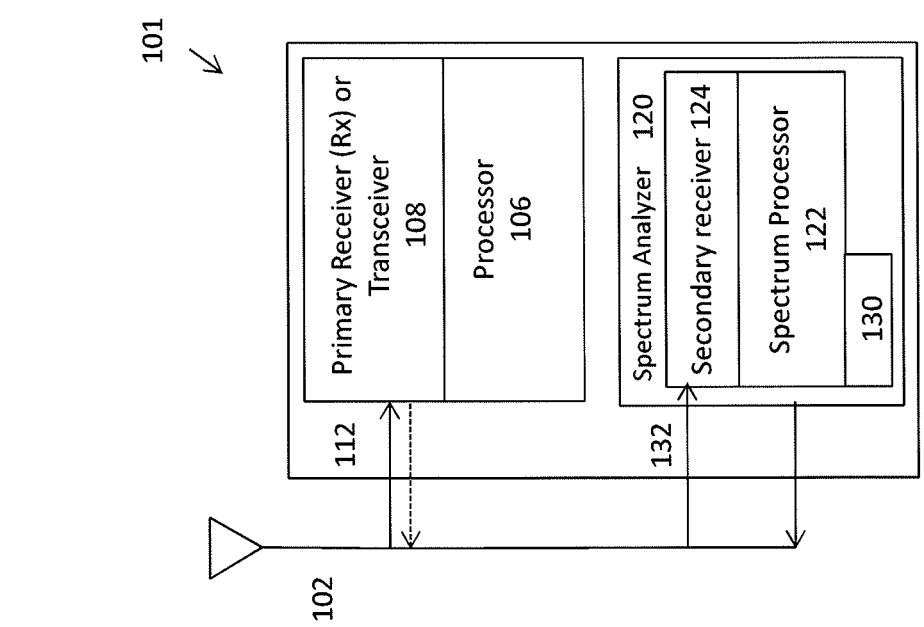
FIG. 1A schematically illustrates one example of a device having an integrated spectrum analyzer for independently and continuously monitoring the operating band.

For example, FIGS. 1A and 1B schematically illustrate two generic variations of devices that include a primary receiver (or a receiver portion of a transmitter) that is used to receive wireless data and operates at one or more frequency channels within an operating band; these devices also include a secondary receiver that, in conjunction with a secondary processor, simultaneously scans the frequency spectrum of the operating band.

In FIG. 1A, the device 101 includes an antenna 102 to which a primary receiver 108 is connected via a receiving path (line 112). The primary receiver 108 is connected to (and may be controlled by) a primary processor 106 or controller. In some variations the receiver is part of a transceiver. In some variations (not shown) a separate transmitter may be connected to the processor 106 and/or the antenna 102. This 'primary' pathway may operate to wirelessly communicate with one or more other devices and typically transmits and receives radio-frequency information using one or more channels that are part of an operating frequency band. In this example, a secondary receiver 120 is connected in parallel with the primary receiver 108 to the same antenna 102 which is also connected to a secondary processor 122. In some variations a separate antenna may be used. In FIG. 1A, the secondary receiver 124 is configured as a spectrum analyzer 120, and the secondary processor 122 is configured as a spectrum processor 122. The spectrum processor can control the spectrum analyzer 120 and process spectrum information about the frequency band (or specific, predetermined sub-portions of the frequency band). In particular, the spectrum analyzers (e.g., the spectrum processor portion of the spectrum analyzer may store (e.g., in a memory 130), analyze, encode, and/or transmit the spectrum information.

For example, a spectrum processor may cause the secondary receiver to scan through the operating band (frequency band) collecting frequency spectrum information, including process frequency.

In use, there are many functions that may be performed by apparatuses including a primary receiver and a secondary receiver adapted to analyze the local frequency spectrum of the apparatus. In some examples, such an apparatus may be used for simultaneously communicating wirelessly (e.g., via the primary receiver, a primary transmitter and/or a primary transceiver) and monitoring the local frequency spectrum over the operating band. The frequency information may be collected, analyzed, stored and/or transmitted. Spectrum information (data) from the spectrum analyzer may be processed by filtering or the like. A spectrum analyzer my process signals continuously, e.g., without consideration of protocol preambles or data coding as would be used in the primary receiver. Thus packet detection is not required. Frequency domain information may describe power versus frequency for the real and imaginary component.

Spectrum information may be encoded with additional information such one or more of: temporal information (date/time the frequency information was collected), location/position information (e.g., GPS information locating the device geographically), orientation information (e.g., direction orientation), device-identifying information (unique identifiers for a particular device, information about the make/model of the device, lot number, etc.), or the like.

Any of the frequency information (including encoded information) may be stored and/or transmitted. For example, in FIG. 1A, the spectrum analyzer is shown connected to the antenna so that it can be transmitted.

FIG. 1B is another example of a device including a spectrum analyzer 120 connected in parallel to a primary receiver 108. In this example, the primary receiver is also connected to a processor 106 along with a primary transmitter. A second antenna 104 may be used to transmit, while a receiving antenna 102 is used for receiving wireless radio-frequency information. In FIG. 1B, the same device may be transmitting and receiving simultaneously, and at the same time monitoring (using the spectrum analyzer 120) the frequency spectrum of the operating band.

In both FIG. 1A and FIG. 1B, the spectrum analyzers may wirelessly transmit spectrum information (encoded or not). The spectrum information may be transmitted by primary transmitter and/or directly by the antenna (e.g., in FIG. 1B, the transmission antenna), as indicated by the dashed lines in FIG. 1B.

As mentioned above, described herein are radio devices that include at least two sets of radio receivers, where the first (primary) one of the receivers may be configured to act as a wireless radio for receiving data and the second receiver may be adapted to do persistent spectrum analysis of the band that the first receiver is operating in. In some variations, the device may modify the first receiver based on information from spectrum analysis. In some variations, the device does not modify the first receiver based on information from the spectrum analysis. The device may be adapted to transmit information about the local radio frequency (RF) environment from the spectrum analyzer and report this information to an aggregator (e.g., a remote processor/server) that can combine this information with other frequency spectrum information from other locations (or overlapping locations). This collected information may be used to optimize the network frequency channel planning, for example.

Figure 1C:
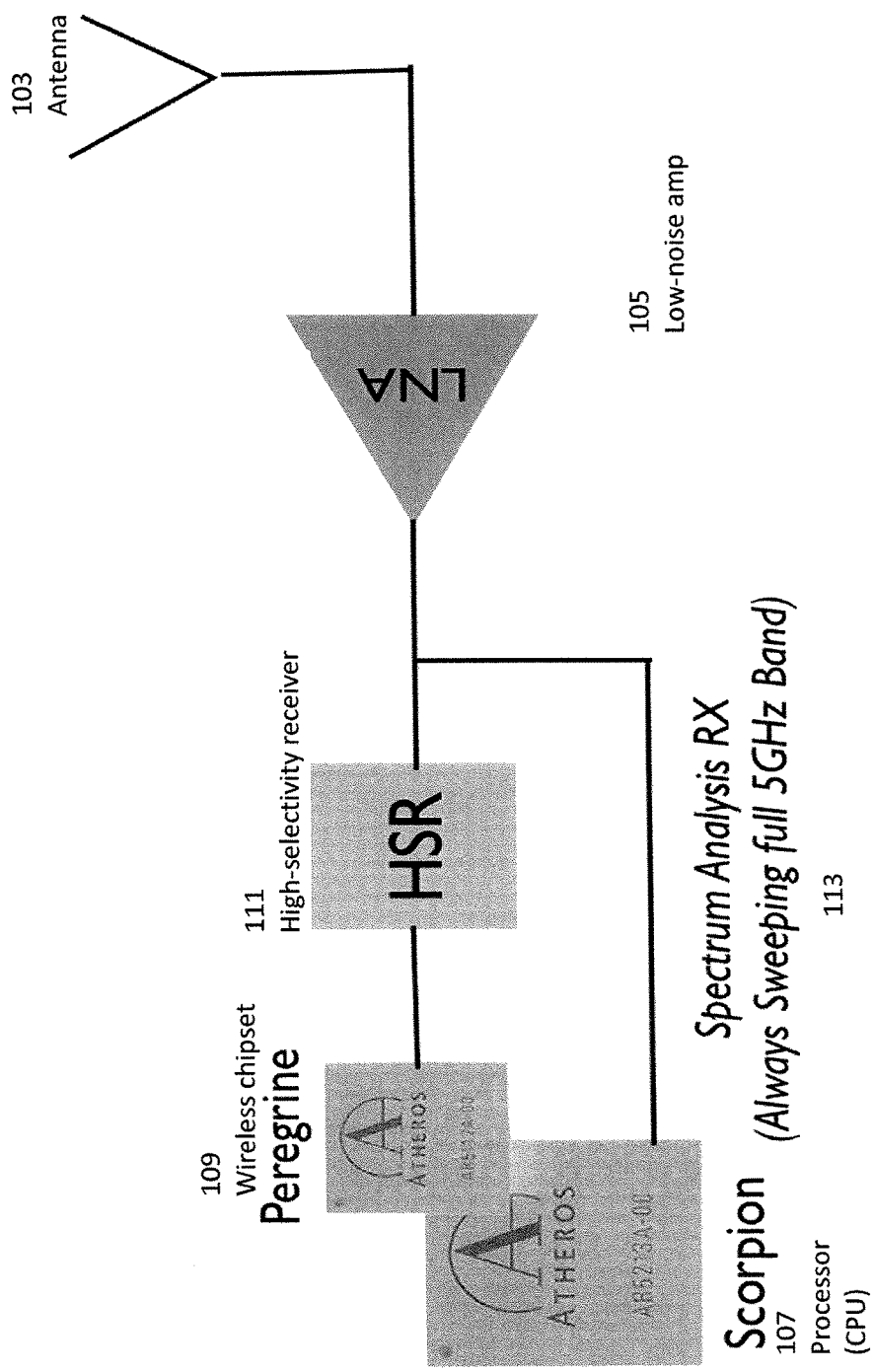
FIG. 1C is a schematic illustration of a wireless radio device including a persistent spectrum analyzer operating in parallel with a high-selectivity receiver.

Thus, described herein are apparatuses and methods that use a secondary receiver set, which may be independent of the first receiver set and may be connected to the same receiving antenna or may have a separate antenna, and is configured as a spectrum analyzer. In the example, shown in FIG. 1C, a radio device that is configured as an 802.11 device operating in the 5 GHz band and includes pair of receivers 111, 113. One of the receivers is adapted as a spectrum analysis receiver that is continuously sweeping the full 5 GHz band. In FIG. 1C, both receivers are connected to the same front-end, including an antenna adapted to receive in the 5 GHz band 103 and pre-filtering, such as a low-noise amplifier 105. The first receiver 111 is a high-selectivity receiver (HSR) for processing data within the 5 GHz band. In parallel with the high-selectivity receiver 111, a second receiver 113 operates as a spectrum analyzer to monitor the 5 GHz band used by the first receiver 111. A wireless chipset 109 and processor 107 may be used by either or both receivers. For example, an 802.11(n) 5 GHz radio may be used as a spectrum analyzer along with another (data) receiver (primary receiver 111) as part of an 802.11 ac radio. The 802.11(n) receiver may perform persistent spectrum analysis in the background as the other receiver receives data.

As will be described in greater detail below, the spectrum information may be used to modify or adjust the operation of a network that includes one or more of the devices described above. In particular, similar devices may all report back to a server or processor (aggregator) that can monitor the overall RF environment status of a network or of multiple networks. This information may be used, to form a database which may itself be used, for example, to optimize network, by optimizing frequency channel planning or other means, or for optimizing the positioning or operation of individual devices within the network.

As mentioned above, the spectrum information received by the apparatuses described herein may be collected by one or more aggregators (e.g., databases). For example, a wireless network may be configured so that at least some of the wireless radios in the system gather and transmit spectrum information. This spectrum information preferably includes both frequency information as well as geographic and temporal information. This information may be collected or aggregated, for example, by a remote processor (e.g., a remote server) which may include a spectrum analysis engine that is configured to aggregate the information and may form and/or maintain (update, etc.) a database, such as a geospectral database, with this information. For example, the remote processor may generate a geo-spectrum database (GSDB) that includes the aggregated information. As described in greater detail below, this geo-spectrum database may be used (e.g., by the SAE or other processor) to generate output (e.g., maps, reports, etc.) to indicate the geo-spectral information. FIGS. 7A-7F, discussed in more detail below, illustrate one example of this.

Thus, described herein are networks in which multiple wireless radios in the network monitor (e.g., continuously) all or a portion of one or more operating bands in parallel with ('normal') operation as a wireless RF radio receiving and transmitting wireless information in a portion of the operating band (e.g., the channel). A networked system that monitors the RF spectrum at various remote locations using wireless RF devices may be adapted for monitoring, without disrupting the network operation. For example, a network may include endpoint wireless receivers (e.g., customer provided/purchased equipment or CPEs) and/or wireless access points (APs) that each monitor the band using a secondary receiver that is configured to operate in parallel with a primary wireless radio receiver, and monitory the frequency spectrum of the communication band without interfering with the operation of the primary receiver/transceiver and/or transmitter for the device. Thus, the frequency information collected by the network may be network-wide and not just limited to spectrum information at the base-station.

This information may be used to create a geospatial spectral usage database that includes historic frequency information, per time-span and per geographic location. This information may generally be monitoring and/or used remotely (e.g., on the cloud). Information such as spectrum usage information may be collected, stored and analyzed, and this information may have a relatively fine granularity (e.g., kHz), and may include, for example, frequency, power, duty-cycle, etc. as well as GPS-location and antenna information (e.g., directionality, gain, etc.) about the receiver. The angle where the antenna is pointing may also be stored in the database and/or can be determined by using information about the GPS-Location and antenna information (such as directionality, gain, etc.) of peer devices.

An analysis of this geospatial spectral usage database may be performed for a variety of uses, and the analysis may be made from historical data or in real-time. For example, this enriched spectrum information (e.g., enriched with geographic/directional and temporal information) may be used to deterring a best frequency of operation for a specific network for communication between an AP and one or more CPEs (e.g., AP to CPE and CPE to AP directions). This determination may be time-based, based on the per-day/time spectrum usage information discovered. For example, a network (individual components of the network) may be configured to dynamically change frequency at specific times based on this information. Thus, if an analysis of this data shows that a particular region of the network experiences more crowding of a frequency spectrum at a particular time of day, then the network may regulate operation of these regions to alleviate/avoid problems. In another example, a system may dynamically change frequency upon detecting interference/blocking signal, as illustrated below. This may be done based on an analysis of a larger database, or based only on locally collected frequency spectrum information.

In another example, the network and/or devices (APs and/or CPEs) may switch to more robust coding schemes that combat that specific interference as evaluated by the engine. Additionally or alternatively, the network and/or devices may change sub-carrier symbol mapping, etc., based on an analysis of the spectrum.

Thus, also described herein are systems that may analyze the type of spectrum usage based on the usage signature (bandwidth, duty-cycle, etc.) and any feedback to transmitter and receiver so that can use this information to combat it. The network/systems/devices may also or alternatively coordinate transmission of power control/frequency selection across base stations and their CPEs in real-time if the spectrum analysis indicates self-interference.

Figure 3:
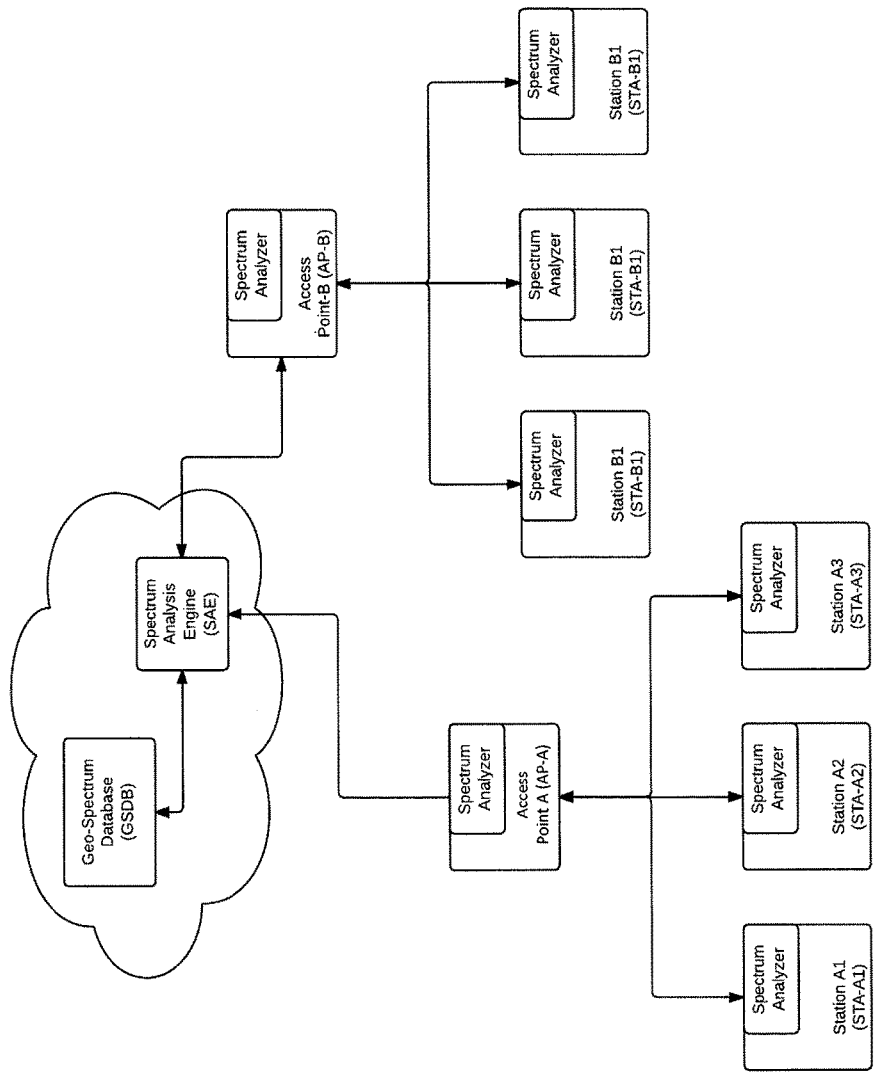
FIG. 3 schematically illustrates a network in which at least some of the nodes are wireless RF radio devices having a secondary reliever configured to act as a spectrum analyzer. The network passes enriched frequency spectrum information from these nodes onto a remote server including a spectrum analysis engine (SAE) and/or a go-spectrum database (GSDB). The SAE may build and/or use the GSDB. Additional networks (not shown) may also communicate with the remote server.

For example, FIG. 3 illustrates one example of a network/system in which at least some of the individual devices with a wireless RF radio are configured to include a secondary reliever configured to act as a spectrum analyzer. In FIG. 3, an example of an architecture of a system as described above is shown. In this example, the network includes three Stations, STA-A1, STA-A2 and STA-A3 connected to an Access Point, AP-A. In addition, the network includes three other stations STA-B1, STA-B2 and STA-B3 which are connected to Access Point AP-B. In this example, all Stations and Access Points are shown to have built-in Spectrum Analyzers, however in other embodiments only a subset of APs and STAs are equipped with built-in Spectrum Analyzers, including only the access points and/or only the stations (e.g., CPEs) or a subset of each. In FIG. 3, Each AP along with its connected STAs form a wireless network which operates in a certain radio channel or a plurality of radio channels, which are part of the frequency band that the network is designed to operate in. Wireless transmissions between an AP and its STAs occupy a certain part of the spectrum/frequency-band.

In the example in FIG. 3, two wireless networks are shown: one formed by AP-A and STA-A1/A2/A3, and another formed by AP-B and STA-B1/B2/B3. The two networks could occupy either overlapping or non-overlapping parts of the available spectrum/frequency-band. Each network may have the choice to operate in one of many possible channels. However the level of mutual interference between networks may depends on which part of the spectrum each network occupies. Different networks may experience different levels of interference from external sources, such as other wireless networks, in different parts of the frequency band. Including local variations. Thus, the radio channel each wireless network operates in may determine the wireless data throughput of that individual network as well as networks operating in close proximity to it. Consequently, a distributed or centralized spectrum allocation/planning system may significantly boost performance and efficiency of wireless networks.

As discussed above, a basic building block of a spectrum allocation systems described herein are the local radio devices that each include a spectrum analyzer, e.g., in parallel with a primary receiver/transmitter/transceiver. For example, a secondary receiver configured as a spectrum analyzer built into some of the APs and STAs may collect data pertaining to radio channels of the entire frequency band or a part of it, which is referred to herein as spectral data or spectrum information.

Access points may determine which radio channel(s) to operate their respective wireless networks. In one embodiment, spectral data (and temporal and/or spatial/geographic information) collected by the STAs are transmitted to the AP they are connected to. An AP make use of spectral data from collected from the STAs with spectral data it collected to determine which radio channel to operate in. For example, an AP may receive information from the spectrum analysis engine; the remote spectrum analysis engine may provide instructions on which radio channel(s) to operate in, or it may itself determine which radio channel(s) to operate in. For example, each AP may autonomously decide, based on the spectral data, which channel to operate in. This mode of operation may be referred to as distributed spectrum allocation. Alternatively, the AP may be assisted in choosing the radio channel by one or more centralized entities. This mode of operation may be referred to as centralized spectrum allocation (see below).

Centralized spectrum allocation may be performed with (or assisted by) a Spectrum Analysis Engine (SAE). The SAE collects spectral data from multiple networks, as shown in FIG. 3, and may determine the optimal radio channels for each network. Also in FIG. 9, a Geo-Spectrum Database (GSDB) is another entity which may be used in centralized spectrum allocation systems, especially for unlicensed spectrum. The GSDB may arbitrate the use of unlicensed frequency bands. For example, it could be operated by a radio regulatory authority (e.g. FCC) or an authorized third party (e.g. spectral data base provider) to control access to the spectrum and enforce spectrum usage rules.

Figure 4:
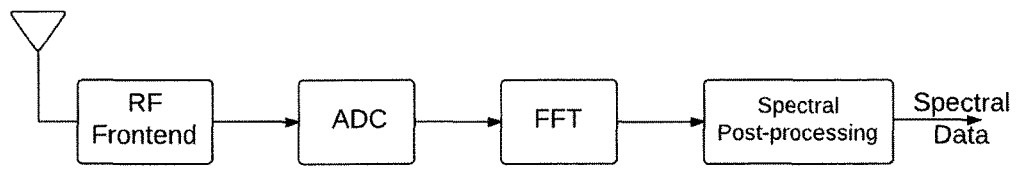
FIG. 4 is a schematic illustration of one variation of a spectrum analyzer portion of a wireless radio device.

FIG. 4, similar to FIGS. 1A-1C, illustrates schematically a portion of another variation of a wireless radio device including a spectrum analyzer. As shown in FIG. 4, a spectrum analyzer module may include: an RF Frontend, which typically consists of filters, amplifiers, and/or mixers which receive a wideband signal at a specific RF frequency and converts it into a baseband or IF signal; an Analog to Digital Converter (ADC), which samples and digitizes the baseband or IF signal; a Fast Fourier Transform (FFT) module, which applies FFT to the incoming signal which converts the time-sampled signal into a frequency-sampled signal; and a spectral post-processing module, which may post-processes the FFT data, especially through applying algorithms that look for spectral and/or temporal properties of the received signal. The FFT module allows detailed inspection of signal properties across the radio spectrum occupied by the signal. In particular, the spectrum occupied by the received signal may be divided into multiple Frequency Segments. Spectral Data may correspond to Frequency Segments.

Tuned to a certain RF frequency, the spectrum analyzer may be capable of receiving and processing a certain bandwidth signal which typically only covers a fraction of the radio band of interest. However the spectrum analyzer can sequentially tune to multiple RF frequencies which span the entire radio band and thus collect spectral data across the entire radio spectrum of interest.

Figure 5:
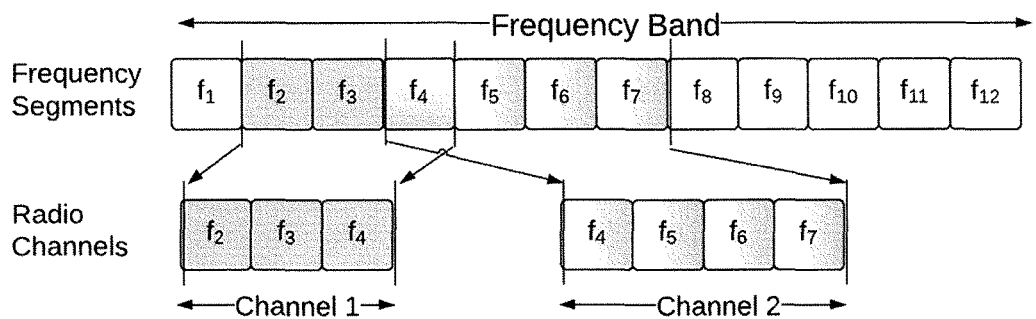
FIG. 5 graphically illustrates a frequency band (e.g., an operational frequency band) having a range of frequencies, in which the band is divided up into a plurality of different frequency channels, which may overlap.

FIG. 5 illustrates the relationship between the Frequency Band, Frequency Segments and Radio Channels. In FIG. 5, the Frequency Band is the entire radio spectrum which a wireless system is designed to operate on. The Frequency Band is divided into multiple Frequency Segments. Though FIG. 5 shows frequency segments to be non-overlapping and of equal bandwidth, this does not have to be the case. As described earlier, signals transmitted within a wireless network occupy one or more Radio Channel. Each Radio Channel may consist of multiple Frequency Segments.

Figure 6:
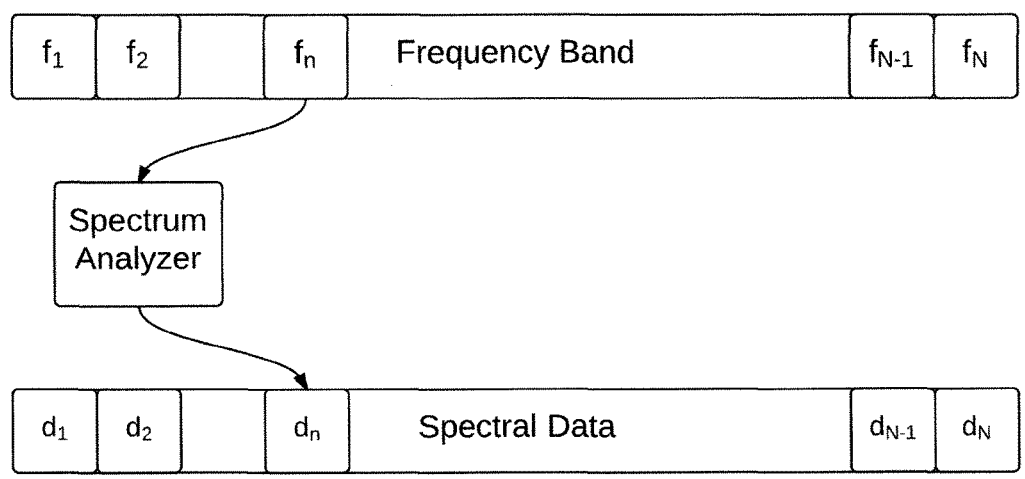
FIG. 6 illustrates one variation of the operation of a spectrum analyzer portion of a wireless radio device that analyzes frequency information and provides information on the spectrum (spectral data). The spectral data may be enriched by adding data (information) on the timing, location of collection, device collecting and/or operating characteristics of the device.
Figure 12:
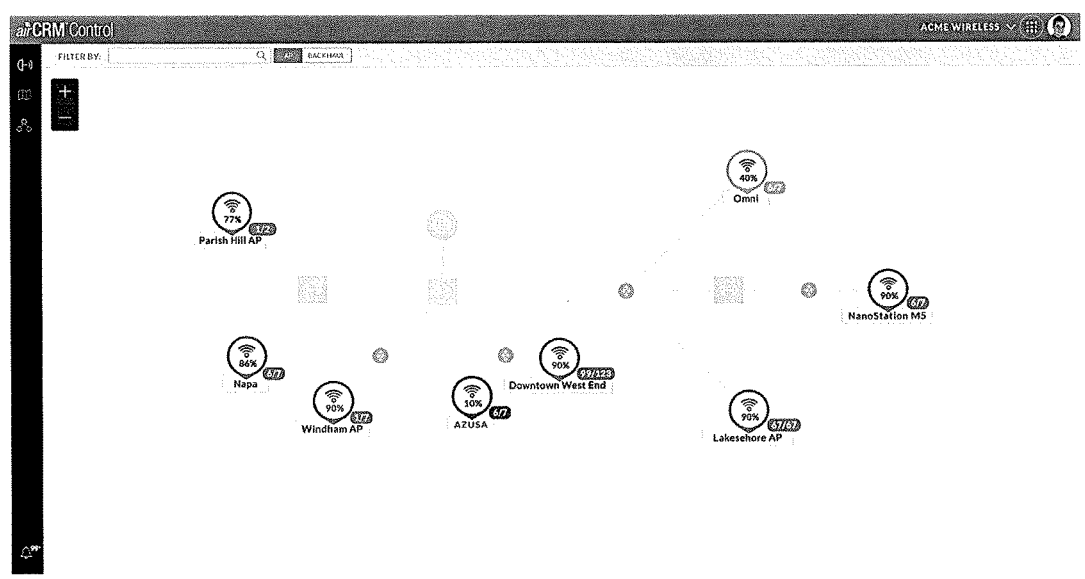
FIG. 12 illustrates an alternative logical view of the mapping shown in FIGS. 10A-11, emphasizing the stations (filtering the view to display stations).

FIG. 12 illustrates (schematically) frequency segments and spectrum data. In FIG. 6, the relationship between frequency segments and spectral data is shown and the spectral data, $d_n$, corresponding to the frequency segment, $f_n$.

In one variation, the spectral data $d_n$ is a quality metric associated to the frequency segment $f_n$, indicating the level of interference and noise observed in that frequency segment. The quality metric, for example, can be indicated by a non-negative integer where zero indicates poor frequency segment quality (i.e., high level of interference and/or noise) and larger positive integers indicating progressively better frequency segment quality (i.e., low levels of interference and/or noise).

Alternatively or additionally, the spectral data $d_n$ may be the average power level of the interference plus noise observed in the frequency segment $f_n$. In some variations, the spectral data $d_n$ is the Probability Density Function (PDF) of the interference plus noise power observed in the frequency segment $f_n$. In some variations, the spectral data $d_n$ is the Cumulative Density Function (CDF) of the interference plus noise power observed in the frequency segment $f_n$.

Attributes of the spectral data include but not limited to: location (longitude, latitude, altitude); orientation (directionality of rx/tx antenna); antenna pattern (associated to tx/rx antenna); antenna polarization (e.g. vertical/horizontal); time of measurement (i.e. time spectral data was measured); and frequency selectivity factor of receiver.

As mentioned above, a system may be configured for distributed spectrum allocation using the frequency spectrum, geographic and/or temporal information forming the enriched frequency spectrum information. In one variation, distributed spectrum allocation may be performed as described below. For example, each STA in a network sends Spectrum Data along with Spectral Data Attributes to the Access Point. This may be done in response to a request from the Access Point or may be transmitted by the STAs to the AP arbitrarily. When an AP determines it needs to change the channel its radio network is operating in, it will determine a new channel to move to. The new channel may be determined through processing the most recent spectral data received from the STAs along with the AP's own most recent spectral data. The determination of the new channel may be based on, but not limited to, interference and noise levels. Once the AP determines the new channel, it may also determine a time in the future at which the network is to move to this new channel. The time instance at which to move channels may be determined through a pseudo random process such that the probability that multiple APs will move channels simultaneously is small, in order to avoid one or more networks in close proximity moving to the same channel. An AP may inform all STAs in the network the new channel and the time when the network will move to the new channel. Prior to making the channel move, the AP may again check the quality of the new channel it intends to move to. This may be done by processing new spectral data obtained from STAs and its own spectrum analyzer, obtained since the decision to move channel was made. If the new channel is still deemed to be good, a channel move will happen as planned. If an AP determines the quality of the channel it intends to move has degraded, it may terminate the channel move. This may be communicated to all STAs in the network and the channel selection process will start over again.

The networked systems described herein, in which some or all of the wireless radio devices in the system include an additional receiver (or receivers) configured to operate as spectrum analyzers, may be configured so that a remote processor (e.g., a remote server) can both receive the enriches spectral information (e.g., local frequency spectrum information, geographic information identifying the geographic, e.g., GPS, location that the spectrum was taken from, temporal information identifying the time, and device characteristics identifying the device identity and/or operational parameters) but may also transmit control information to the each of the spectrum analyzers. For example, the remote processor may indicate the timing, parameters of the frequency band, etc. for each spectrum analyzer.

Thus, the remote processor may collect/aggregate the enriched frequency spectrum information, including (as described above) creating and maintaining a database of enriched spectrum information. This information is multi-dimensional (e.g., frequency, location, time, directionality, etc.). Directionality may be determined based on the operating characteristics of the particular device collecting the frequency spectrum information. Typical operating/performance parameters for various devices (e.g., APS, CPEs, such as dish antenna, sector antenna, etc.) may be pre-known by the remote server (cloud) or database. For example, the location of antenna may be included as GPS data, and this location information as well as the identity of the device (e.g., model, make, etc.), may be sufficient to allow the device or system to deduce the direction or orientation of the device. Thus, using the provided information on identity, location and characteristics (which may be part of a pre-determined dataset or look-up table) may allow the system to derive additional operational information, in addition to the real-time persistent spectrum data that may be passed on from the multiple remote devices.

As mentioned above, one possible advantage of the current systems and devices is the concurrent (simultaneous) use of both receivers. For example, typically a wireless radio device required a wired access directly to the device when orienting and installing it into a network, in part because the link from the new device into the network (e.g., into an AP or other network member) would not be operational until the new device had been partially added to the network. Thus, the new "local" radio device could not both run the spectrum analyzer and send/receive any new info, particularly not in real time.

In addition, the persistent, real-time spectrum analyzers that run in parallel with a primary receiver/transceiver and transmitter may be particularly useful for dynamic frequency selection (DFS), because the devices and systems described herein, in which there are simultaneously operating primary receivers and secondary (spectrum analyzers) receivers may allow concurrent channel availability checks to detect radar signals and allow the radio devices to move their operating frequencies if a radar signal is detected. Thus, with a persistent frequency analyzer (secondary receiver) the device can monitor for protected frequencies without any down time. This could be done locally by the device, as described in the examples below, or it could be done by a remote processor (e.g. cloud server).

Thus, in general networks including these dual-receiver devices (where the secondary receiver is a frequency monitor) may be very useful for optimization, including sub-channelization. For example, when using OFDM, which typically has subcarriers, knowledge about the local frequency band traffic may allow the device (or the overall system to choose for the device) to pick subcarriers that are the best. For example, using a 20 MHz spectrum, the apparatus (device or system) may pick the subcarriers that have the least amount of traffic or interference, based on real-time information or based on historical data from a database including local or nearby enriched frequency information. Thus, the device may optimize by mapping specific subcarriers (e.g., with OFDMA). As mentioned above, this mapping/optimization may be time dependent, meaning that time-based information may be used to indicate from the historical information when interference typically starts, allowing the device/system to change the modulation coding scheme or frequency used based on the location-specific frequency information.

Any of the apparatuses (device and systems) described herein may include the additional dimension of polarity (e.g., horizontal and vertical polarity). Thus, the enriched information may include polarity information.

Returning now to FIG. 3, recall that a CPE (e.g., customer premise equipment) may act as a terminal device, such as a small device that is doing the receiving/sending). In FIG. 3, the AP acts as a base station that connects to one or more CPEs in point to point connections. Also described herein are methods of optimizing these point-to-point connections. They systems and devices described herein my generally optimize such point-to-point connections by providing directional information and guiding the installer (or aligner) to point them in an optimal direction to maximize signal strength. Setup of these systems (installation) may be guided by the network (e.g., the database of enriched frequency information) including selecting optimal operating characteristics, suggesting locations, etc.

As mentioned above, a remote controller/server may aggregate enriched spectrum information from a plurality of different local devices having a dedicated, continuous spectrum analyzers (secondary receivers). The resulting database (aggregation of enriched spectrum information) may be dynamic, rather than static, as it may be continuously or periodically updated from each of the local spectrum analysis unit. This database may be referred to as a geospectrum database (GSDB), as illustrated in FIG. 3. In addition to optimizing the performance of regional devices (including Aps and CPEs) but may also be used to provide information about "reservations" for particular frequency ranges. Blocked out frequency ranges may be blocked out for regulatory reasons, or based on actual frequency spectrum (signal strength) measurements, and thus may be dynamic and/or time dependent.

In one example, the spectrum analyzed in approximately 1 GHz, and individual devices in a network or an aggregator (e.g., remote server) may look at/for crowding within this spectrum. This information could be used locally or remotely to regulate transmit power. For example, the new information may be used to decide the best time for a local device to transmit. As mentioned above, a network may include a plurality (e.g., more than one) device having the dual receiver's with one receiver being a dedicated frequency, e.g., spectrum, analyzers. In some variations all of the access points (APs) will include a secondary receiver adapted to operate as continuous spectrum analyzer, and some (but not necessary all) of the end devices, e.g., CPEs, may have a dedicated frequency analyzer.

In general, the devices having the parallel frequency (spectrum) analyzers, that can deliver enriched frequency spectrum information to an aggregator may be adapted to transmit any of: time (the time that the frequency spectrum information is received), location (the location of the device), antenna directionality (e.g., gain and direction), transmit identity of the antenna (e.g., from which a device or system can look up characteristics of the actual antenna), polarity of the antenna, etc. Typically, this information may tell the remote aggregator or the local device what the local frequency spectrum looked like for frequency spectrum given the time, frequency, direction, location, and polarity. In general, a particular channel may be line-of-sight, using only two polarities.

Note that although the devices and systems (including networks) described herein are exemplified for outdoor systems, any of these devices and systems may be used in indoor networks, indoor/outdoor networks, local area networks (LANs), etc.

A database (and particularly a dynamic database) of enriched frequency spectrum information, such as a GSDB) may include information from multiple "networks" that may be independent of each other, and even non-networked local devices. For example, any of the dual-receiver devices (having a secondary receiver that is configured to be operated as a spectrum analyzer) may transmit enriched frequency spectrum information to an aggregator (such as a cloud server) and the information added to the database.

In some variations the enriched frequency spectrum information described herein may be used prior to, during and/or after setting up or expanding a network (e.g., adding additional APs and/or stations). For example, a database of enriched frequency spectrum information may be analyzed to estimate the latency or bandwidth restrictions (or any other performance indicator) for various networks or portions of a network. Thus, the database could be used to rank or compare networks having overlapping geographic coverage. For example, a roaming device (e.g., portable computer, smartphone, etc.) could determine (or request a remote processor to determine and transmit) from the database which network is best for a particular geographic region, particularly in areas with multiple providers.

In some variations, the database may be used to improve/enhance an existing network, indicating areas where network coverage is less robust (e.g., noisy, including multiple interferers, or subject to heavy periodic traffic, etc.). The database may be used to optimize the installation of a device into the network. For example, the database may be used by a remote or local device to determine the directionality, orientation, power and other operational parameters of a device (the device may or may not include a secondary receiver configured as a spectrum analyzer). In any of the variations described herein, the database may also include topographical information.

As mentioned above, the enriched frequency spectrum information (e.g., and/or a database such as a GSDB) may be used to provide various levels of optimization to all or a portion of a networks. For example, at a base level, a device within a network could use the frequency spectrum information locally to adjust parameters (frequency of operation, such as channel, etc.) based on the local spectrum information either in real-time, or based on historical (prior time-of-day, day-of-week, day-of-month, etc. information) frequency spectrum information. At another level, a device (e.g., AP) within a networks may receiver and/or request information from a remote processor (e.g., cloud server including a spectrum analysis engine, or SAE) to adjust working parameters of the AP or connected stations. For example an SAE may instruct the devices to modify parameters based on the frequency spectrum database information in order to resolve potential conflicts in transmission/reception, such as may occur where there are nearby APs. At another level, an entire network or portion of a network could be optimized using this information.

During installation of a wireless radio device that operates within the operational band covered by the database (e.g., the GSDB), this information may be used to more effectively work with the various nodes of the network. A spectrum analysis engine could use the GSDB to recommend ways to set-up a network so that it will run most effectively.

Although many of the device variations described herein including two receivers acting in parallel, the database of enriched frequency information may be constructed using devices that do not include a separate primary and secondary receiver. For example, a device (e.g., AP or station) may have a single receiver that operates as both the primary receiver for transmission of wireless data and for monitoring the frequency spectrum. For example, a single receiver may switch between modes (e.g., monitoring frequency spectrum and receiving wireless data). Such an embodiment may be used in particular when switching between modes could be performed relatively quickly (e.g., faster than 5 ms). Similarly, a network may include one or more nodes that only include frequency spectrum monitoring devices (receivers). In some variations the devices may include a virtual wireless radio, which may have both a filter (for receiving wireless data at frequencies within the band) and spectrum analyzer (for monitoring frequency spectrum information of the entire operational band.

As discussed above, in reference to FIG. 3, the systems and devices described herein may monitor (continuously or discretely) an operating frequency band to analyze the frequency spectrum, and this information, along with geographical and other identifying information (e.g., antenna type, etc.) may be aggregated from local apparatuses (e.g., access points and/or CPEs) by a remote database, such as a processor or group of processors configured as a spectrum analysis engine (SAE). The processor(s) may collect this information into a geo-spectrum database (GSDB), and this information may be accessed and presented in various ways.

For example, in some variations the GSDB information may be presented in the form of a report or map, which may be static or interactive. This report or map may be used, for example, by an installer or network maintenance professional to modify or optimize a wireless network, or to enhance wireless coverage.

Figure 7A:
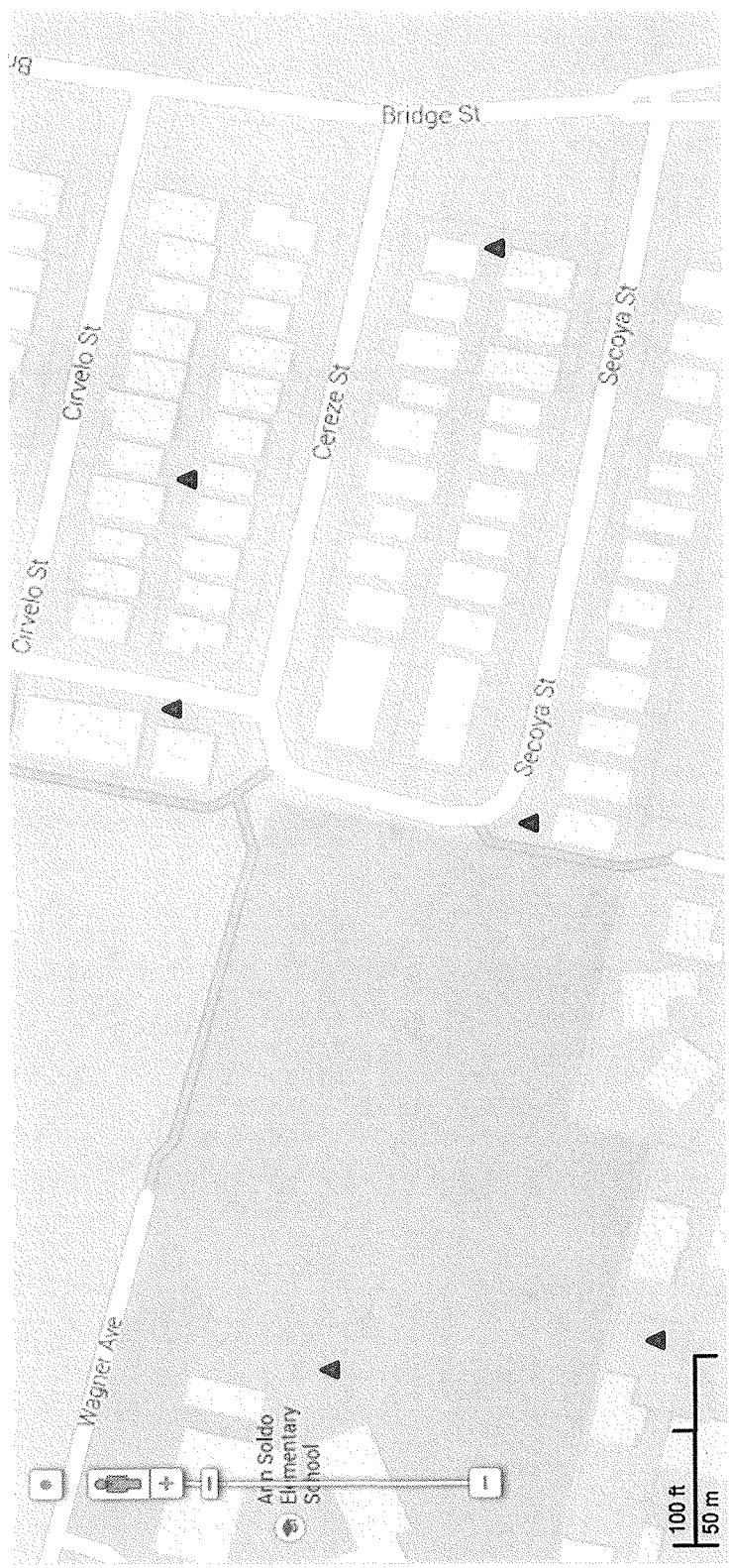
FIG. 7A is one example of a display (map) of information from a geo-spectrum database (GSDB) as described herein.
Figure 7B:
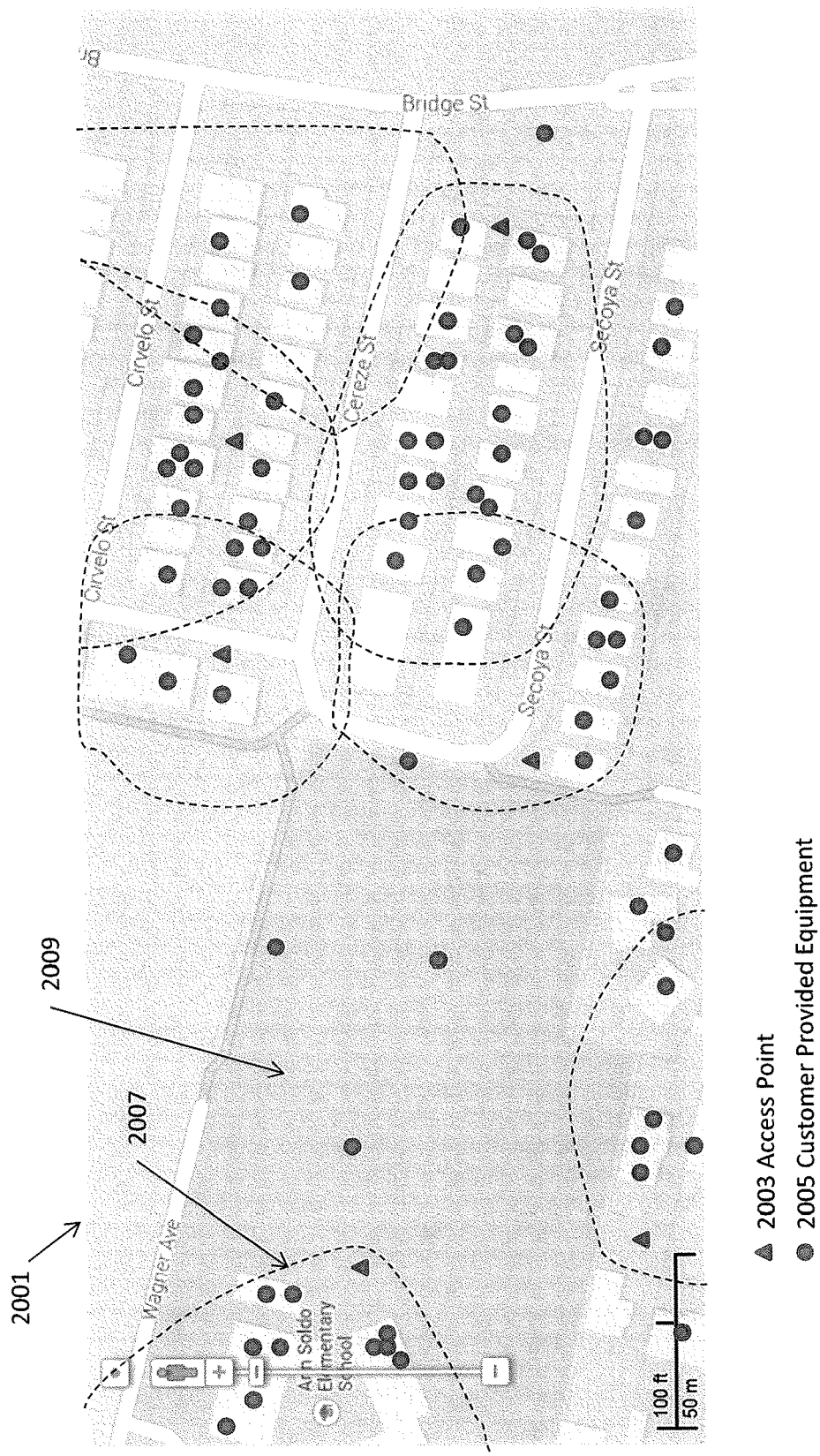
FIG. 7B is another example of a map of GSDB information indicating including APs and CPEs.

FIG. 7A illustrates one example of an output of a GSDB configured as a map, showing geographic information about a region, e.g., including geographic features such as hills, mountains, bodies of water, etc. and man-made structures such as roads, buildings, or the like. In addition, representations of wireless devices (e.g., access points 2003) are also shown relative to these features. In FIG. 7A, six access points are indicated. In some variations, the map may be adapted to show the actual or predicted range of wireless coverage for each of these access points, as illustrated in the dashed lines 2007 in FIG. 7B. Coverage information may be determined (e.g., from the GSDB by the SAE) using recorded spectral information and/or from information about known parameters/characteristics of the devices (antennas/radios) forming the APs. The GSDB may include the GPS information for each connected AP, as well as (as shown in FIGS. 7B-7F), the locations of each SAE, and particularly SAEs that communicate with the remote server. Any of the SAEs may also include the spectrum analyzer components described herein.

As mentioned, the presentation (e.g., maps) from the GSDB may be interactive or adjustable. For example, SAEs may be shown or removed, and more detailed information about any of the features, including but not limited to device status (e.g., on/off, working status, etc.), identity (make/model no.), characteristics (laptop, router, etc.) or the like may be presented, for example, by selecting (e.g., scrolling over, clicking on, etc.) the icon (circles and triangles) representing the AP 2003 or CPE 2005 shown. A presentation (map) such as the one shown in FIG. 7B may be useful, for example, to indicate geographic regions where connections are absent or weak. For example, in FIG. 7B, the borders 2007 (dashed lines) showing the range of each AP may represent a range cutoff based on signal strength (e.g., 50%, 40%, 30%, 20%, 10%, etc.) of the like, and may be shown over different times or frequency ranges, information which may be readily derived from the GSDB. Heat-mapping (color mapping) may be used to show this and/or it may be animated over a time period, showing the changes in the 'borders' of coverage of different regions. For example, in the snapshot 2001 shown in FIG. 7B, some regions 2009 including CPEs are not shown within range of an AP, at least for the time period and/or frequencies shown. This information may be used by a manager/installer to determine where to place a new AP, or where to replace existing APs to improve coverage. In some variations this information may be used automatically to provide suggestions such as this. For example, a system may analyze the GSDB to identify regions of low or poor coverage and determine ways to improve the coverage; the system may run simulations to determine where to place new devices (including information about device performance as well as the historical information) or how to replace/reposition an existing AP to service actual or projected CPEs. For example, FIG. 8 illustrates a method of improving network performance by using a GDSB to optimizing operational characteristics of one or more of the wireless devices within a geographic region. In FIG. 8, the method may include swapping out existing devices with one or more other devices having different operational characteristics (see steps 2101, 2103, 2105, 2107 and 2109). Similarly, FIG. 9 illustrates a method of improving network performance by simulating the addition of one or more network devices (e.g., APs); the method may also include optimizing the position of a new device having a predetermined location. See, e.g., steps 2201, 2205, 2207, and 2209. Methods such as those shown in FIGS. 21 and 22 may be used by the owner of the database or by one or more clients, who may be provided access to all of the wireless devices within a geographic region, or a subset of those (e.g., those forming network), or a subset of the APs and all of the CPEs, or any combination thereof.

Figure 7C:
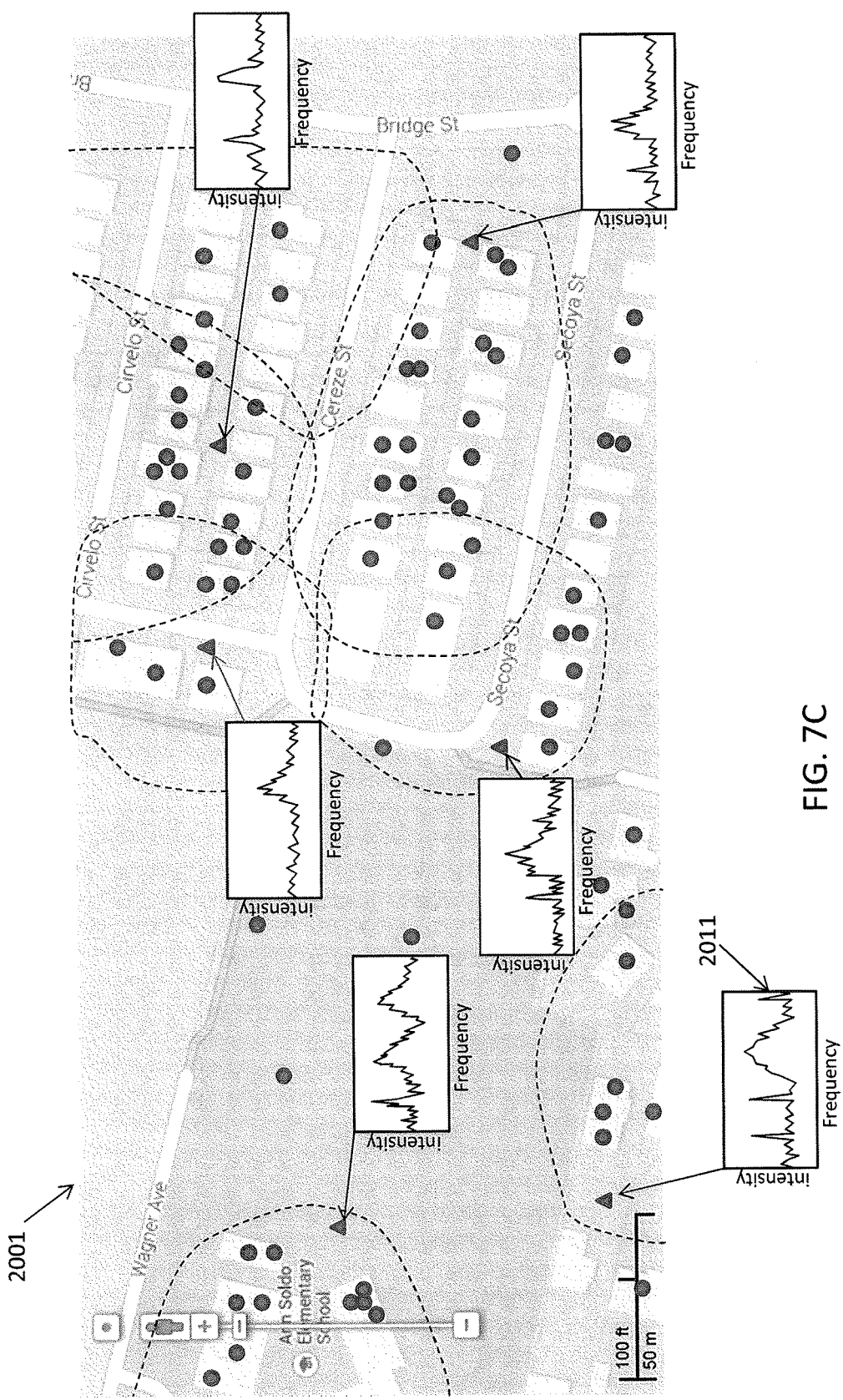
FIG. 7C is another example of a map of geo-spectrum information that may be taken from or deduced from a GSDB. Similarly.

Any of the representations of data from the GSDB may also provide spectral information that is tied to the geography, including the specific APS and/or CPEs, as shown in FIG. 7C. For example, frequency spectral information (e.g., frequency vs. intensity) for all or some of the devices may be shown either directly on the map or in a referenced manner. In FIG. 7C, a single moment in time is shown, indicating the frequency spectrum at that time for all of the APs shown. The user or the database may scale the graphical information appropriately. Alternatively, this information may be directly overlaid onto the map. For example, a 2D or 3D map (perspective view) of the geographical region may be shown with colors indicating the spectral traffic. Thresholds may be applied, so that only frequency intensities above a particular threshold are displayed. As mentioned, such views may be animated to show changes over time, and/or across frequencies.

Figure 7D:
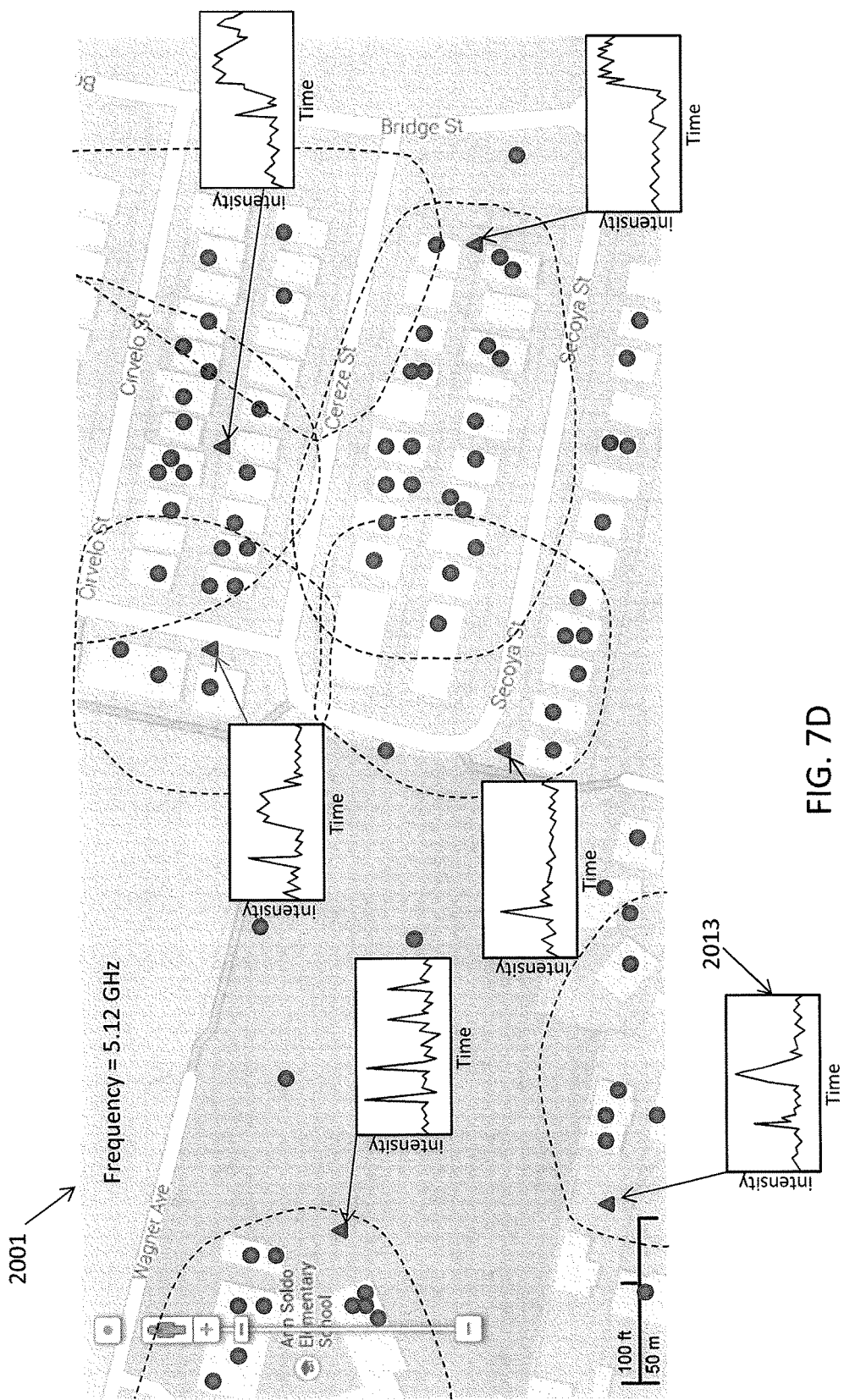
FIG. 7D is another example of a map of geo-spectrum information that may be taken from or deduced from a GSDB.

FIG. 7D shows a similar mapping showing a static image of a particular frequency (5.12 GHz in this example) over time. The inset graphs indicate the time course of signal intensity at this frequency for each AP. As mentioned above, this display may be modified to be shown directly on top of a 2D or 3D representation of the geographic map (e.g., using color and/or bars above the map, etc.). In any of these displays, the scale (e.g., magnification) may be adjusted.

Figure 7E:
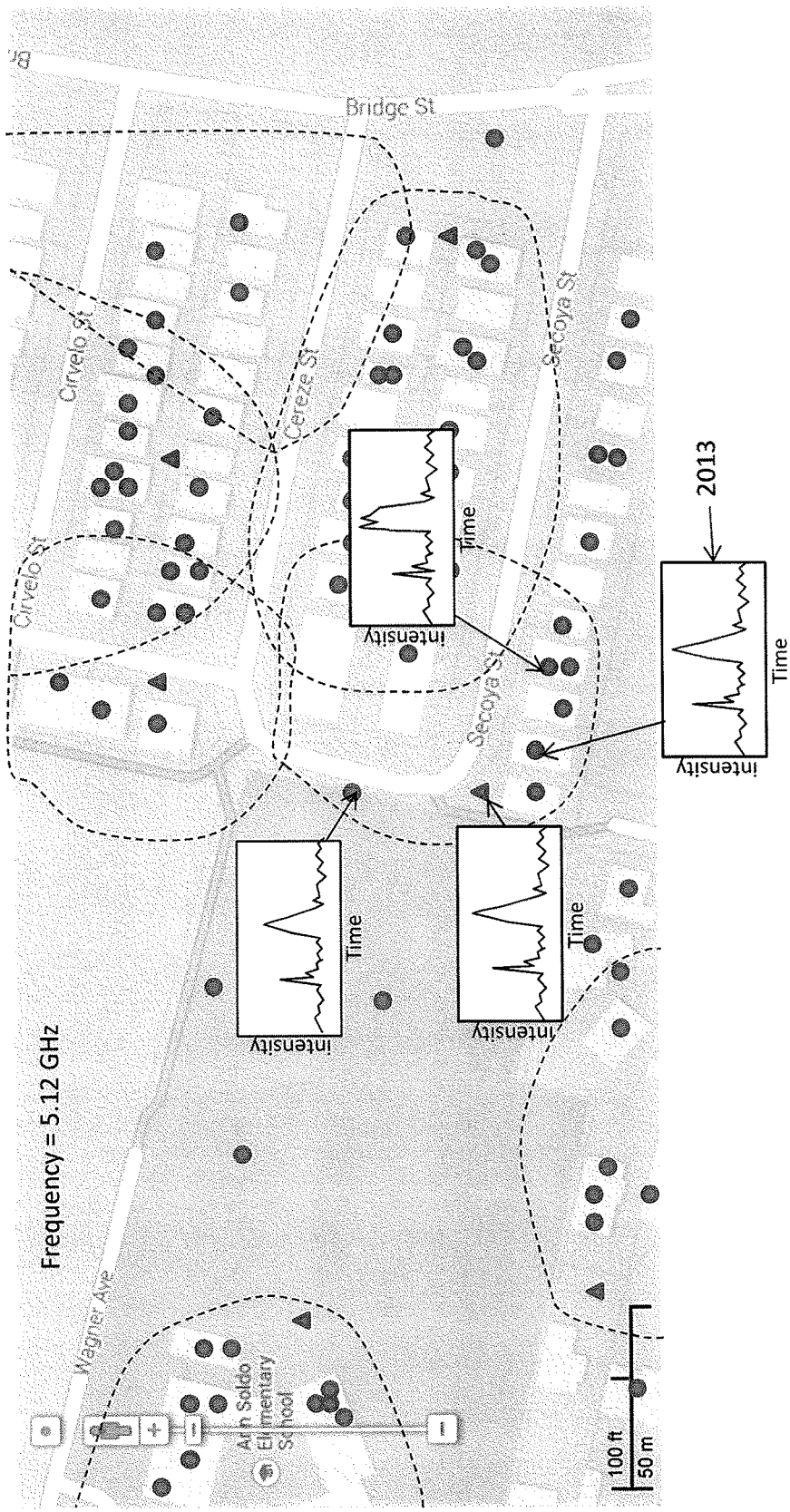
FIG. 7E is another example of a map of geo-spectrum information that may be taken from or deduced from a GSDB.

FIG. 7E shows an alternatively in which the user may look specifically at performance within a particular AP, for example, by looking at the AP and CPE frequency spectrum information. Some or all of the APs and CPEs may include the spectral analyzers described herein. Note that even APs and/or CPEs that do not include spectrum analyzers may be included in the GSDB, and represented. For example, CPEs (or APs) may report to a remote processor (including the SAE) when installed, including their identity and geographic location.

Figure 7F:
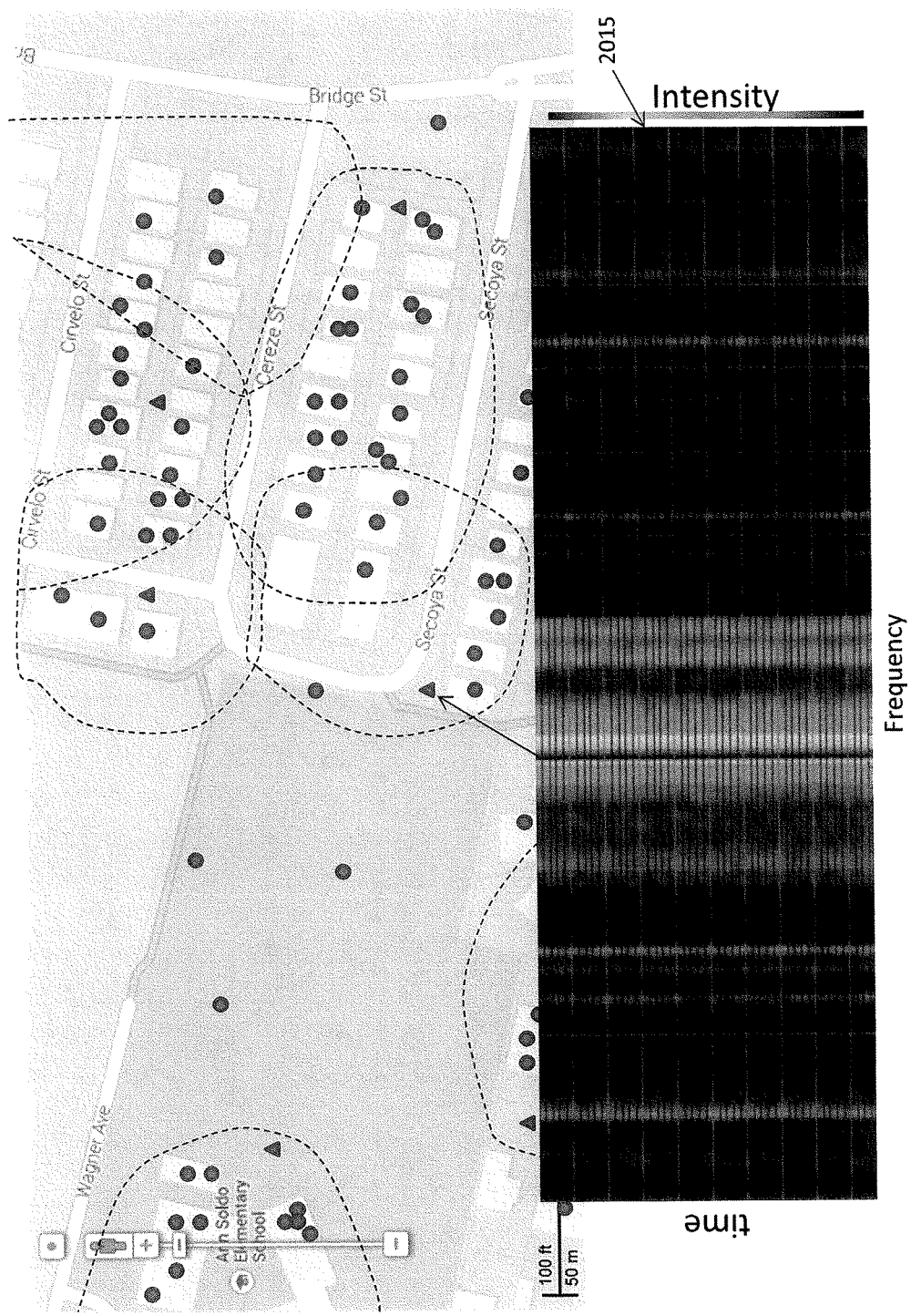
FIG. 7F is another example of a map of geo-spectrum information that may be taken from or deduced from a GSDB, as described herein.

FIG. 7F illustrates an alternative method of displaying spectral information. In this example, one (or more, not shown) AP and/or SAE having frequency spectral information in the GSDB may be selected and a 'waterfall' type of display showing both frequency, time and intensity may be displayed 2015. In this example, the y-axis shows changes in time, while the intensity is represented by a heat-mapping (color) scale, and frequency (e.g., the operating frequency band) is shown in the y-axis.

Any representation of the geographic and frequency spectral information described may be used by an installer or may be automatically used by a processor to suggest ways to improve or modify coverage. For example, a map such as the ones shown may reveal that there is a gap in coverage, or congestion in some frequency ranges coverage, at particularly times of the day (e.g., in the early evening). This information may allow the user to determine, for example, which antennas could be modified or replaced to alleviate coverage problems. Additional information, such as backhaul information, may also be shown on these representations. For example, point-to-point connections between APs (backhaul) may be indicated in a particular color or line style.

In any of the variations described herein, a processor (e.g., the SAE) may use the GSDB information to automatically calculate the spectral information and/or ways to modify it, including simulating the effects of changes by addition/modification of APs and CPEs. Thus, the GSDB and any output may indicate signal strength and throughput for the various nodes (APs and CPEs.

Also described herein are services and/or processes in which the GSDB is analyzed to determine ways to improve signal quality and reliability for such wireless networks, including simulating modifications, ranking the results, and presenting the options to an installer or other entity who may make the proposed changes. For example, a service may calculate from the GSDB an analysis of the quality of signals (e.g., throughput) in a geographic region, and could calculate/suggest where and what devices to add or modify as well as a predicted level of improvement. Thus, the systems could be used to project/predict how to improve quality metrics based on modifying and/or adding new devices or by switching out existing devices. Such services may also or alternatively allow troubleshooting. For example, a display of GSDB information such as the ones shown in FIGS. 7A-7F may indicate existing problems with a network.

Although the examples described in FIGS. 7A-7F show a birds-eye (2D) map view, which may include pop-up box(es) with the spectral or other information, other display methods may be used to show the information include and derived from the GDSP, animated and/or 3D and interactive representations of the information.

Logical View

Also described herein are method and apparatuses for displaying a topology diagram that is enhanced to show groupings of devices a single node. This may be referred to as a "logical view" of the topology. In general, this method and apparatus allows is an improvement of a typical network topology diagram because it adds a layer of abstraction, representing groupings of devices as a single node in the diagram. For example, a backhaul represents a PtP link of two devices may be represented as a single node, CPEs connected to a single AP may be grouped together as a single node, etc. This provides a simplified, digestible representation of a network. Thus, the methods and apparatuses described herein provide a simple, usable interface which allows users to view and administer their network topology.

For example, the methods and apparatuses (e.g., tools) described herein may be configured as methods (or tools for implementing them) for automatically determining and displaying a topological representation of a wireless network having a plurality of nodes connected to an internet source. These methods and tools may generally include grouping a plurality of radio devices into logical groups based on shared connectivity and/or one more properties, into a logical group node. Significantly, the topological mapping may be automatic, meaning that a user does not have to manually enter the connectivity of the components in the network, including APs, backhauls, CPEs (or any other station) even when connected to one or more switches. The method and tools may display a plurality of logical group nodes and indicate the number of radio devices within the node, and/or the category of radio devices within the node, and/or an estimate of the efficiency of the radio device in the node. This display may be helpful in understanding and interpreting the health and organization of the network, and may be useful to a network administrator/installer in managing the network, including in installing new components into the network.

In general, the methods and apparatuses forming this logical (rationally grouped) view may place all devices on the topological diagram, and where the relationship between devices are not known above a threshold certainty level, they may be shown with a notification for the user to confirm.

In use, this display may be used by network administrators to monitor and configure the network, and may be used by users to monitor the network. A logical map may be used/shown available for each segment of a network (or for some portion of a network). In some variations a default location and segment may be used.

Figure 10A:
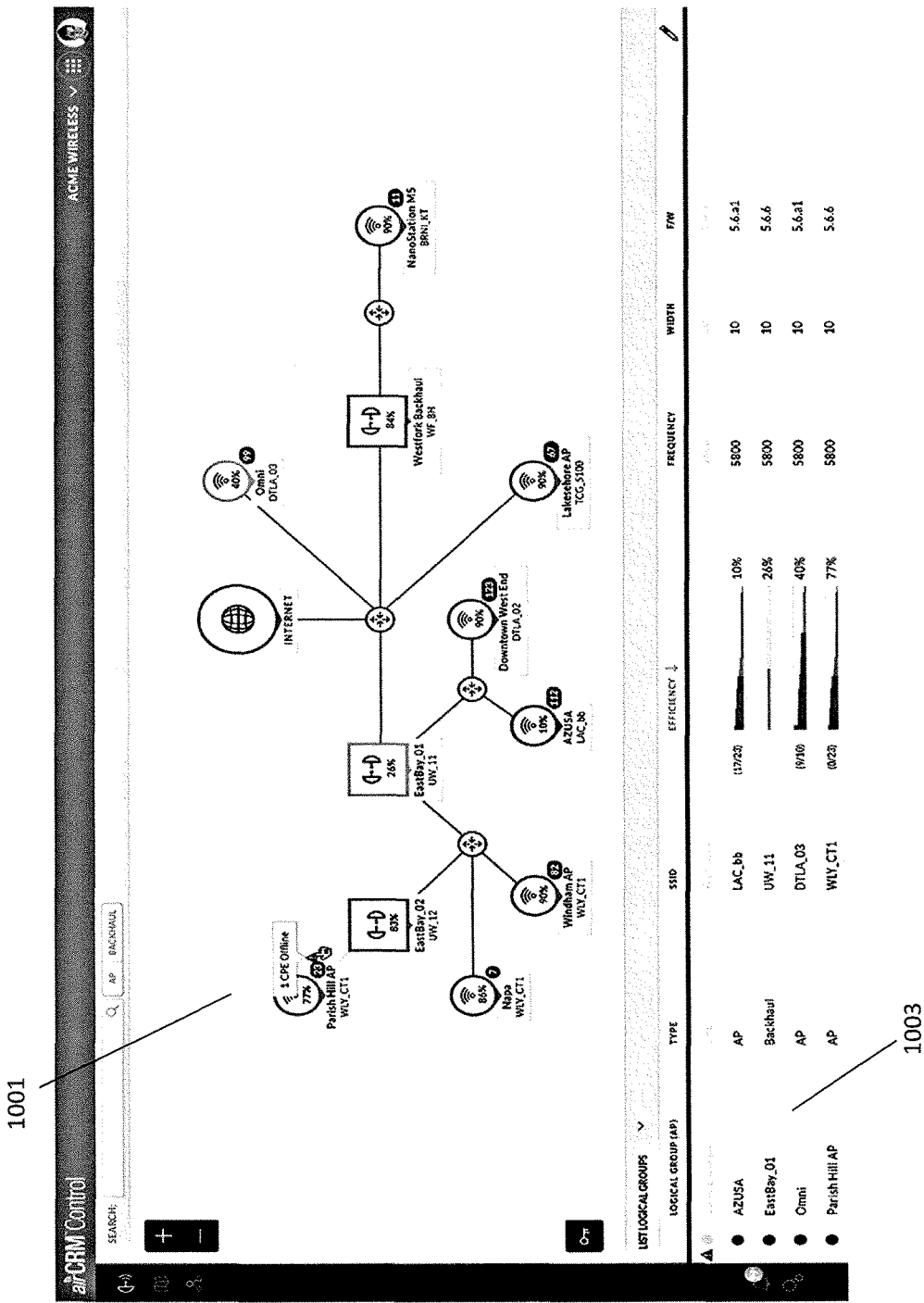
FIG. 10A shows one example of a user interface of a tool illustrating a logical grouped topological view.
Figure 10B:
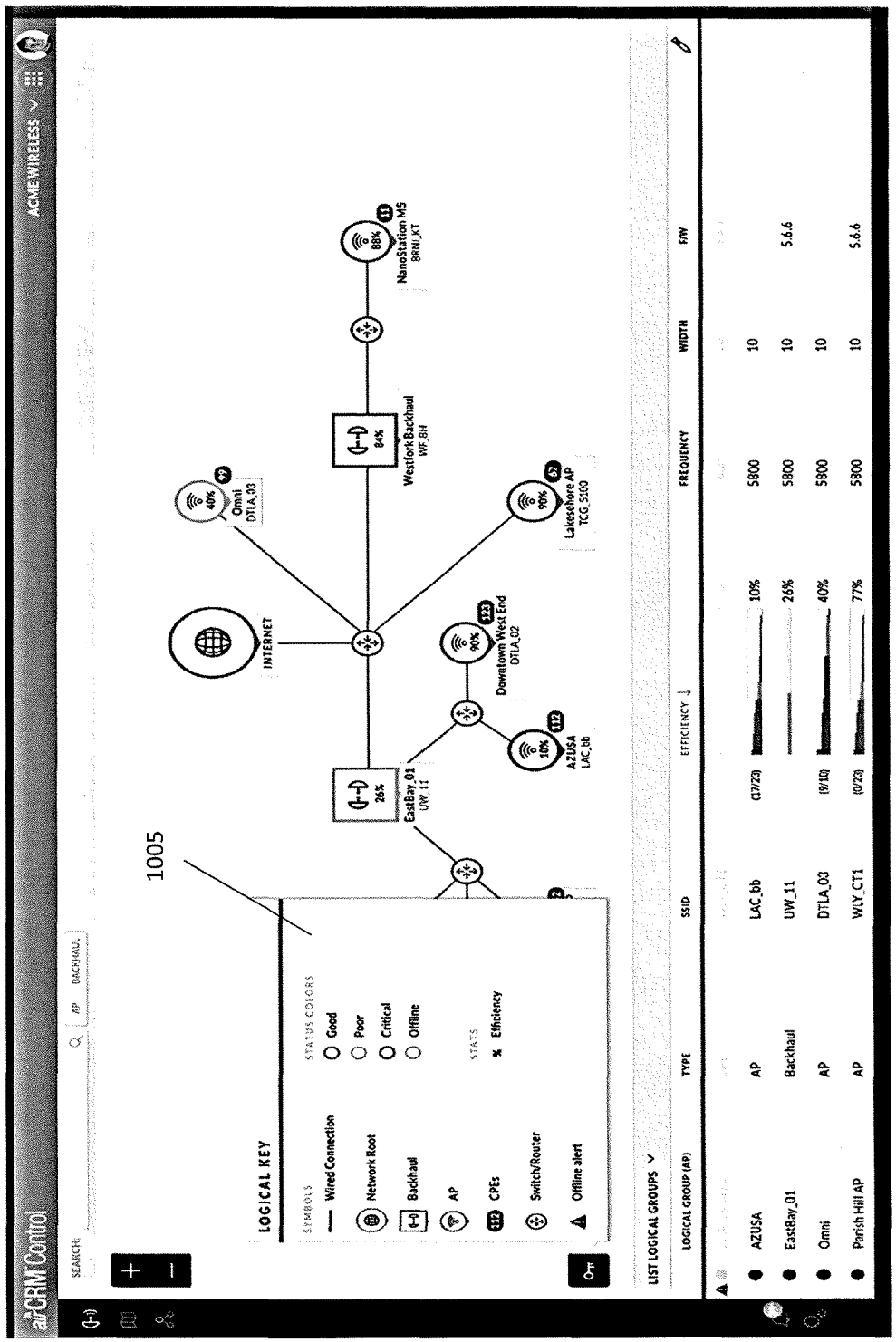
FIG. 10B shows the tool of FIG. 10A with a key displayed.

FIG. 10A shows a first example of a topological illustration of a local view. In this example the tool detects and/or determines the topological relationship between the devices in the network, and then rationally groups them, based on rules, as discussed above. The nodes (where nodes may include rationally grouped nodes) and connections between the resulting nodes may be displayed as illustrated in FIGS. 10A and 10B. In FIGS. 10A and 10B, the upper portion of the user interface display 1001 shows a logical mapping of all or a portion of the network. Below this mapping 1003 is a listing of the logical groups with indicators of the identity of the one or more groups, the type of group (e.g., AP, CPE, backhaul, etc.), the SSID, and an indicator (graphical and/or numeric/percentage) of the efficiency of the group and/or devices in the group. The type, status and name for each node may be displayed, as shown, including any alert relevant to the nodes or network (e.g., "1 CPE off-line" shown in the Parish Hill AP). The number of components forming the rationally grouped node may also be displayed. In addition to the map, a concurrent set of detailed information for the logical groups may be shown, as shown in the listing below the graphical map. In this example, the logical group (AP), type, SSID, an estimation of the efficiency, the frequency, width, and F/W is shown, as well as any indication of alerts (e.g., indicating a problem or issue). FIG. 10B shows a logical key 1005 for diagram shown in FIG. 10A.

Figure 11:
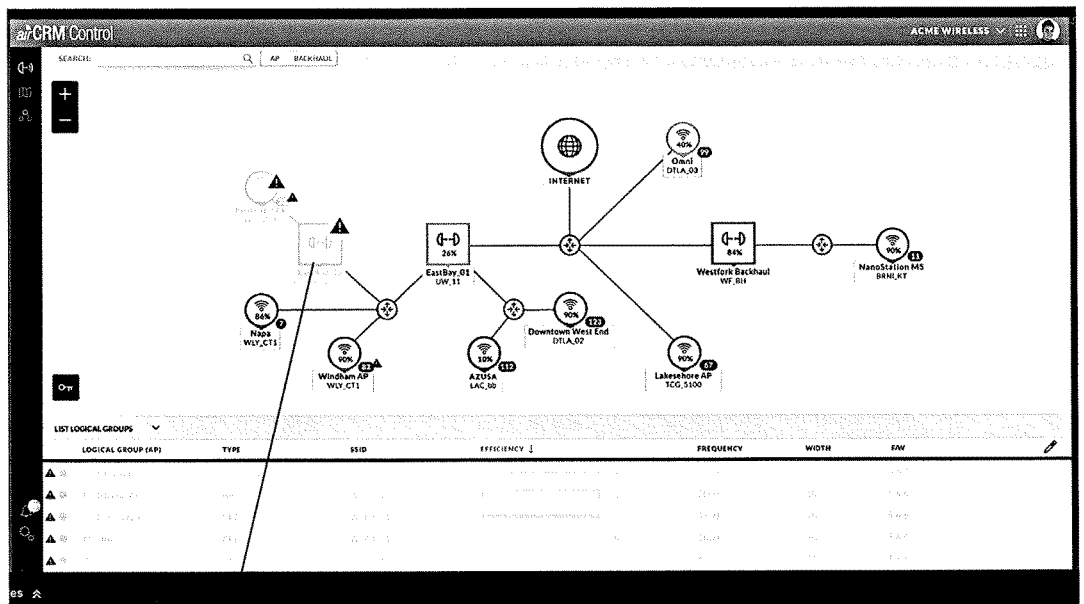
FIG. 11 is another example of a logical view of a tool as shown in FIG. 10A, illustrating nodes having stations that are offline or experiencing problems that may be indicated by the tool.

FIG. 11 shows another example of a user interface for a logical mapping of a network, illustrating a logical view in which a backhaul and AP are offline 1109, and shown graphically by 'greying out' along with an alert (red triangle) indicator.

Figure 13:
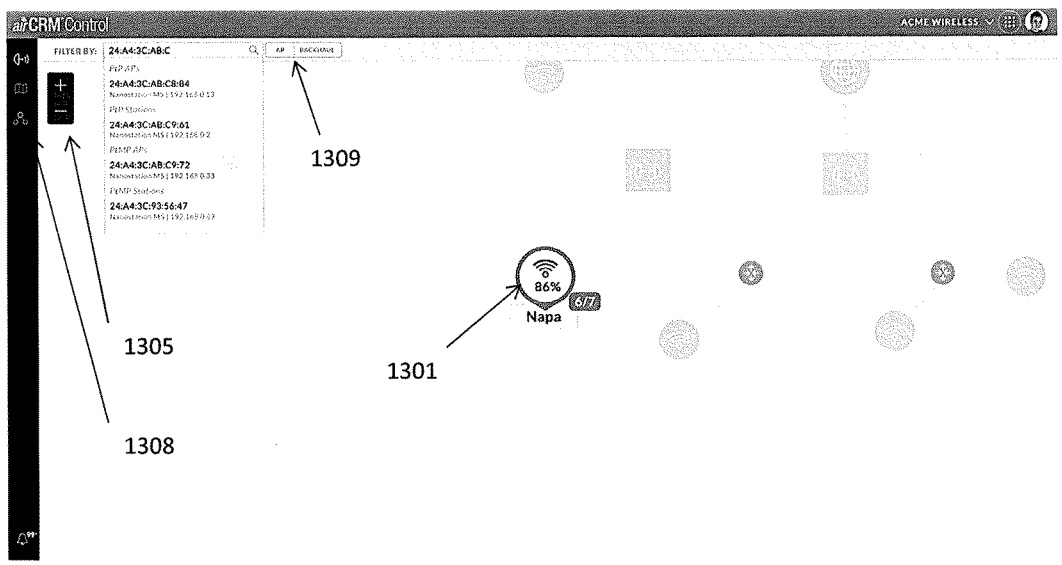
FIG. 13 is another filtered view of the logical link mapping shown in FIGS. 10A-12, filtered to display stations connected to a particular access point and connected set of stations.
Figure 14:
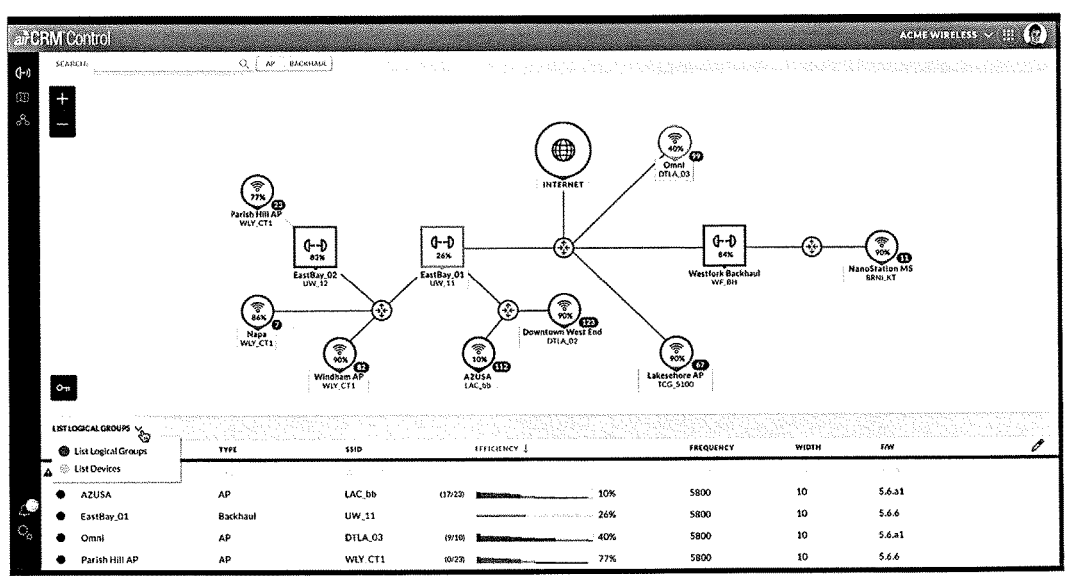
FIG. 14 shows another example of a tool including a display of logical link mapping in the upper portion of the user interface, and a listing of a selected set (e.g., subset) of logical groups shown below, including an identifier (e.g., name), type (e.g. AP, backhaul, etc.), SSID, efficiency, frequency, width (e.g., bandwidth), etc.

Any of these displays may be filtered, to remove or highlight various nodes (combined nodes). For example, FIG. 12 shows one variation of a filter applied to display information specific to the access points (AP) in the map. Similarly, the grouped nodes may be searched, as shown in FIG. 13, in which a pull-down menu is used to display one particular AP 1301. Information on that specific or a subgroup of specific nodes may be expanded, including describing the information in the node. For example, FIG. 14 shows a list that is organized as selected by the user to group in a predetermined way (e.g., list by logical groups, list by devices, etc.). Thus, information about the displayed map (logical view) may be displayed in the detailed list below (or separate) from the graphical view.

In any of these views, the user interface may include controls (e.g., buttons, sliders, etc.) for the control of display parameters, including increasing/decreasing magnification 1305, selecting the display parameters (e.g., between logical view mapping, and device view, e.g., display of individual stations, etc.) 1308, selecting components to display/collapse 1309, etc.

FIG. 10B illustrates a graphical key describing which each of the icons for the nodes represents (e.g., network root, backhaul, AP, CPEs by number, Switch/Router, alerts such as offline alerts, etc.) as well as status indicators which may be icons, colors, numbers, etc., (e.g., good, poor, critical, offline). Finally a numeric value may indicate the percent efficiency of each node. The percent efficiency may be calculated by each node (or collection of nodes) or may be calculated separately (e.g., by a remote/cloud server).

Figure 15:
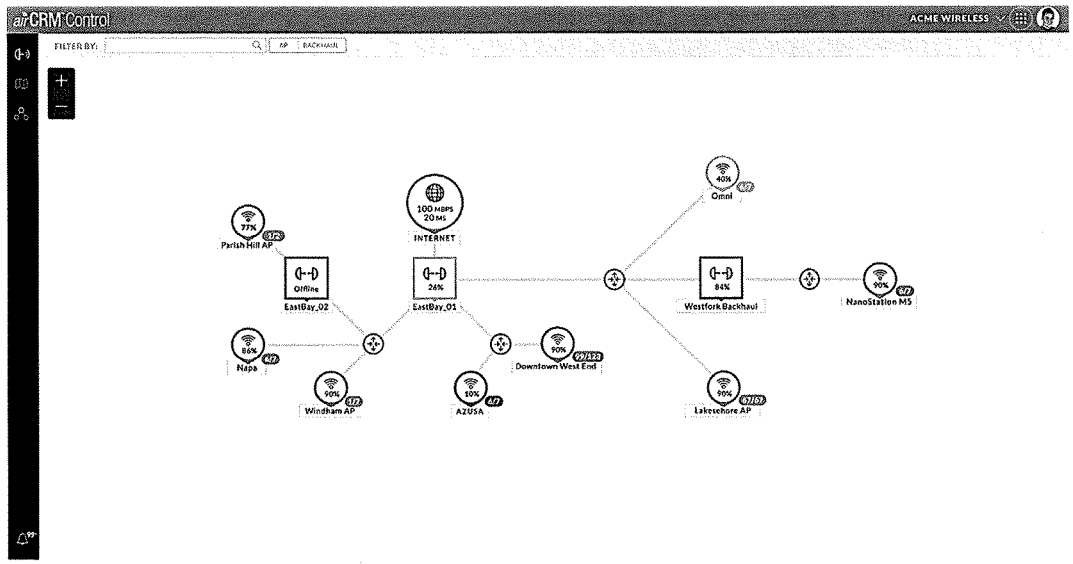
FIG. 15 illustrates another view of a local link mapping of a user interface tool.
Figure 16:
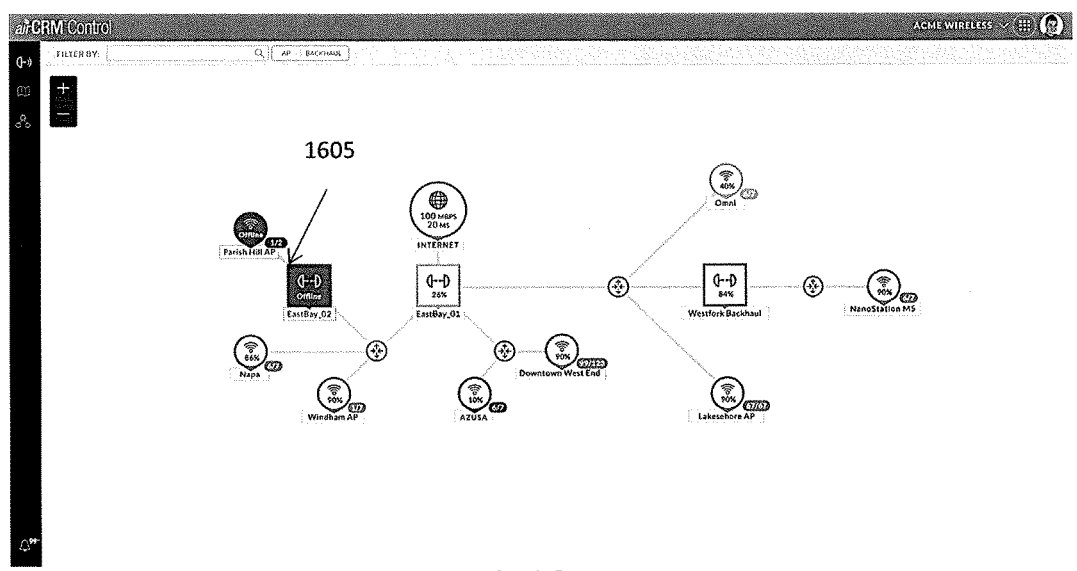
FIG. 16 shows another, alternative view of the logical link mapping shown in FIG. 15 with some of the links offline.

FIGS. 15 and 16 show alternative representations of the logical view including alternatives for views in which one or more nodes is down (offline) 1605, as shown in FIG. 16.

Figure 17A:
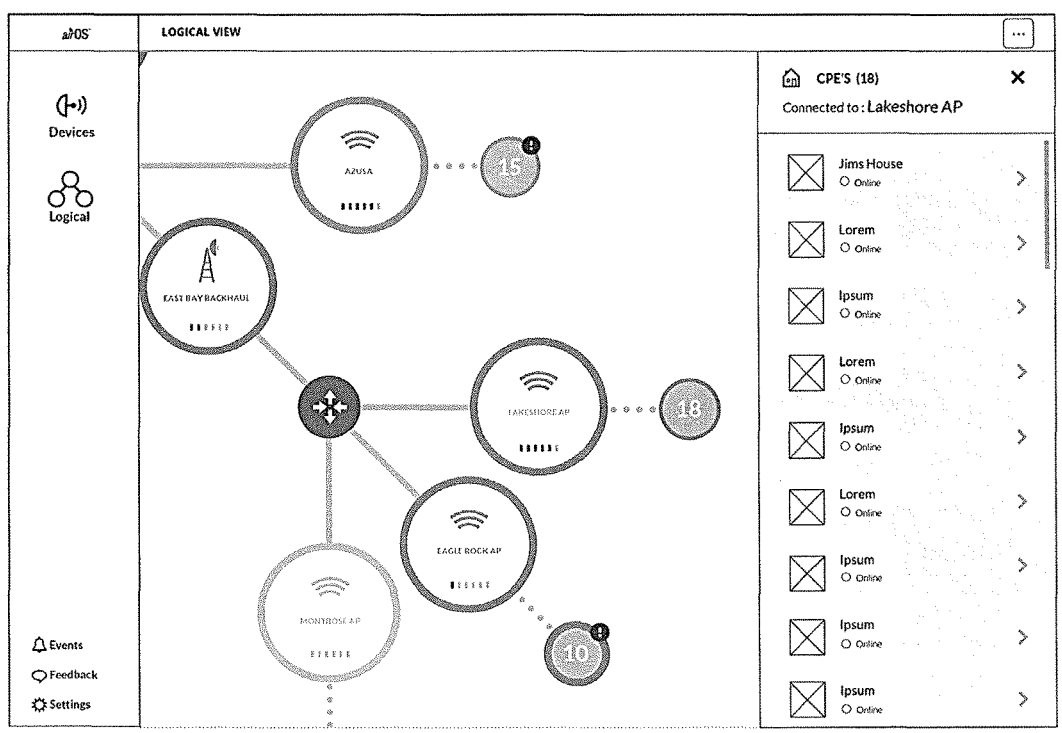
FIG. 17A shows an example of a user interface tool showing an enlarged view that may be automatically determined and displayed by the tool, including a plurality of connected (e.g., via a switch) nodes that are connected to a backhaul and an internet connection.
Figure 17B:
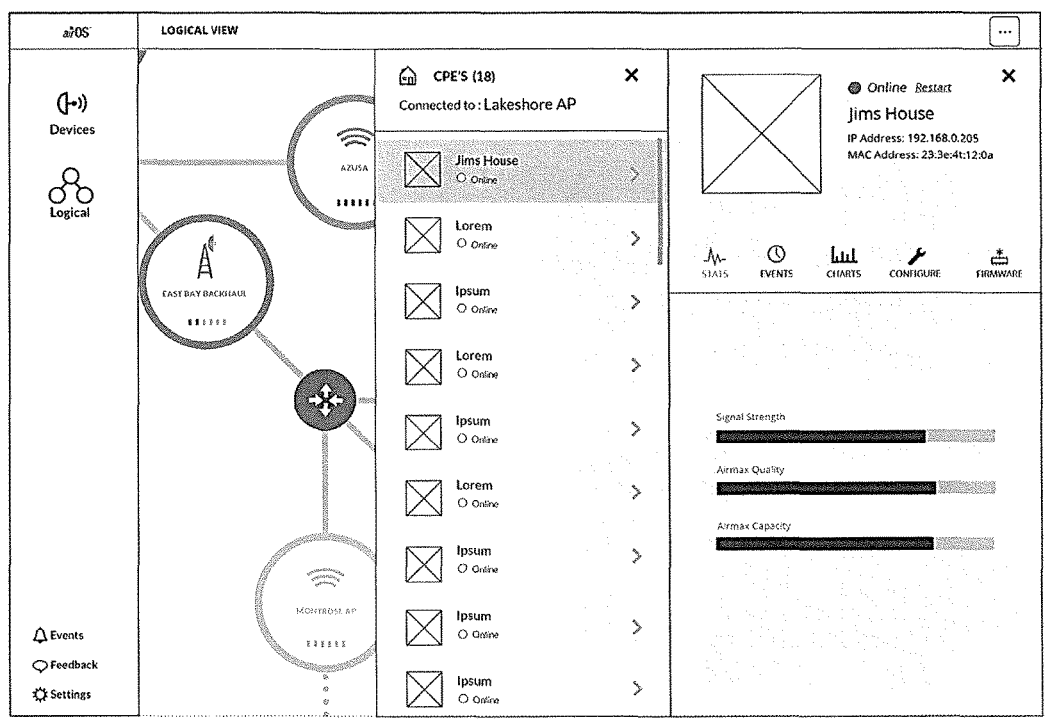
FIG. 17B is another example of the view shown in FIG. 17A, further displaying information about CPEs connected to one of the AP nodes, including signal strength, quality and/or capacity of the AP.

FIGS. 17A and 17B show a view of details about the individual components making up one of the nodes (in this example, an AP having 18 CPEs). Information about a specific CPE may be shown by selecting the node (FIG. 17A) and then selecting an individual member forming the node (FIG. 17B).

Figure 18:
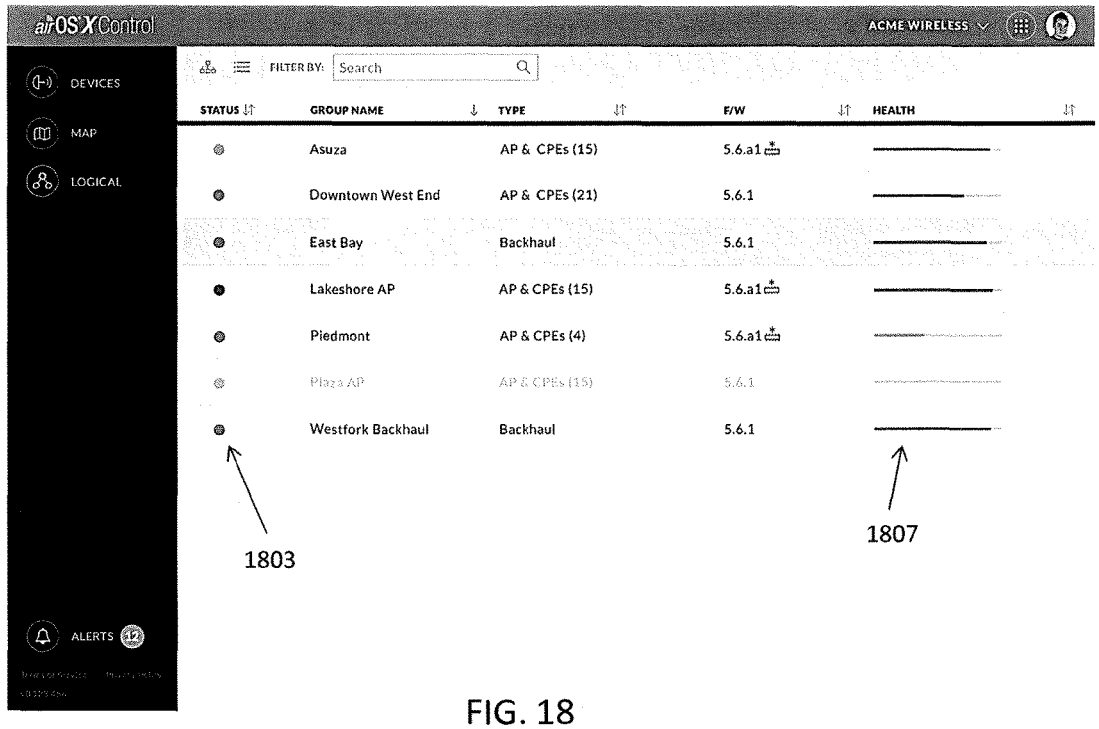
FIG. 18 illustrates another example of a logical mapping view of a display of a user interface portion of a tool including a listing of nodes (groups, APs, etc.) including operational information about each of the groups in the network or portion of the network.

FIGS. 18-22 illustrate alternate variations of the logical view information shown in FIGS. 10A-17B above. For example, FIG. 18 shows a listing of the nodes without the graphical display, with a graphical indicator of the status 1803 (which may be in color, or may include a graphic/icon or text to describe), as well as indicators of the group name, type, and an indicator of the 'health' of the node 1807, which may reflect the rate of transmission through the link(s) of the node, or another metric of the connectivity, signal strength, or the like, including the efficiency of one or more devices forming the node, and communicating with the rest of the network.

Figure 19:
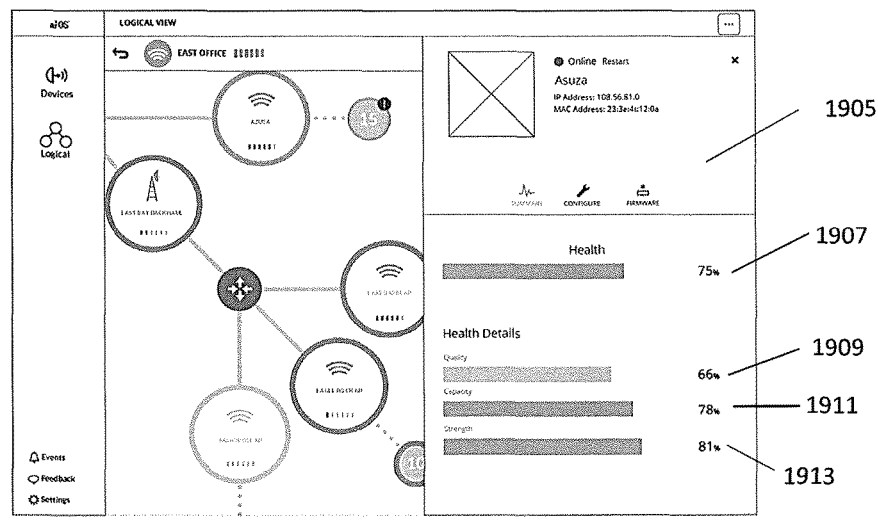
FIG. 19 is similar to FIG. 17A, but with a portion of the display illustration performance information about a selected station from the network.
Figure 20:
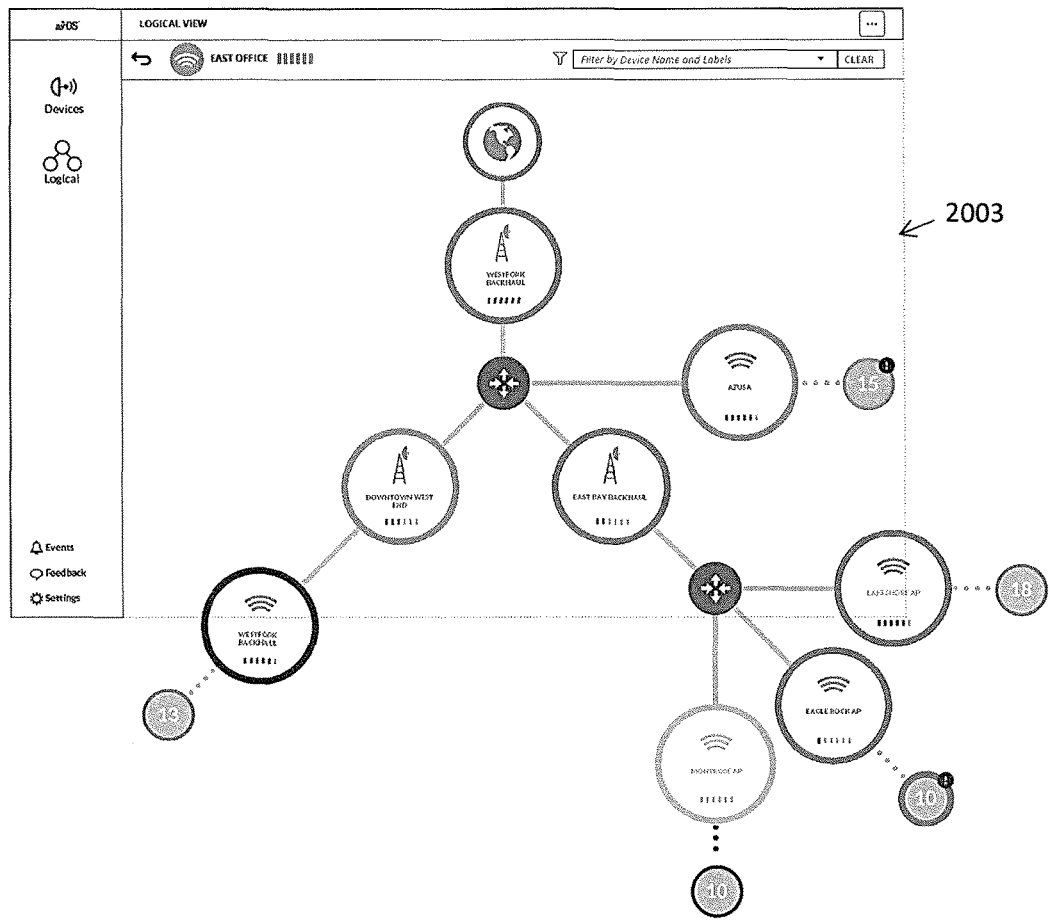
FIG. 20 illustrates a mapping of a portion of a network using a tool as described above.
Figure 21:
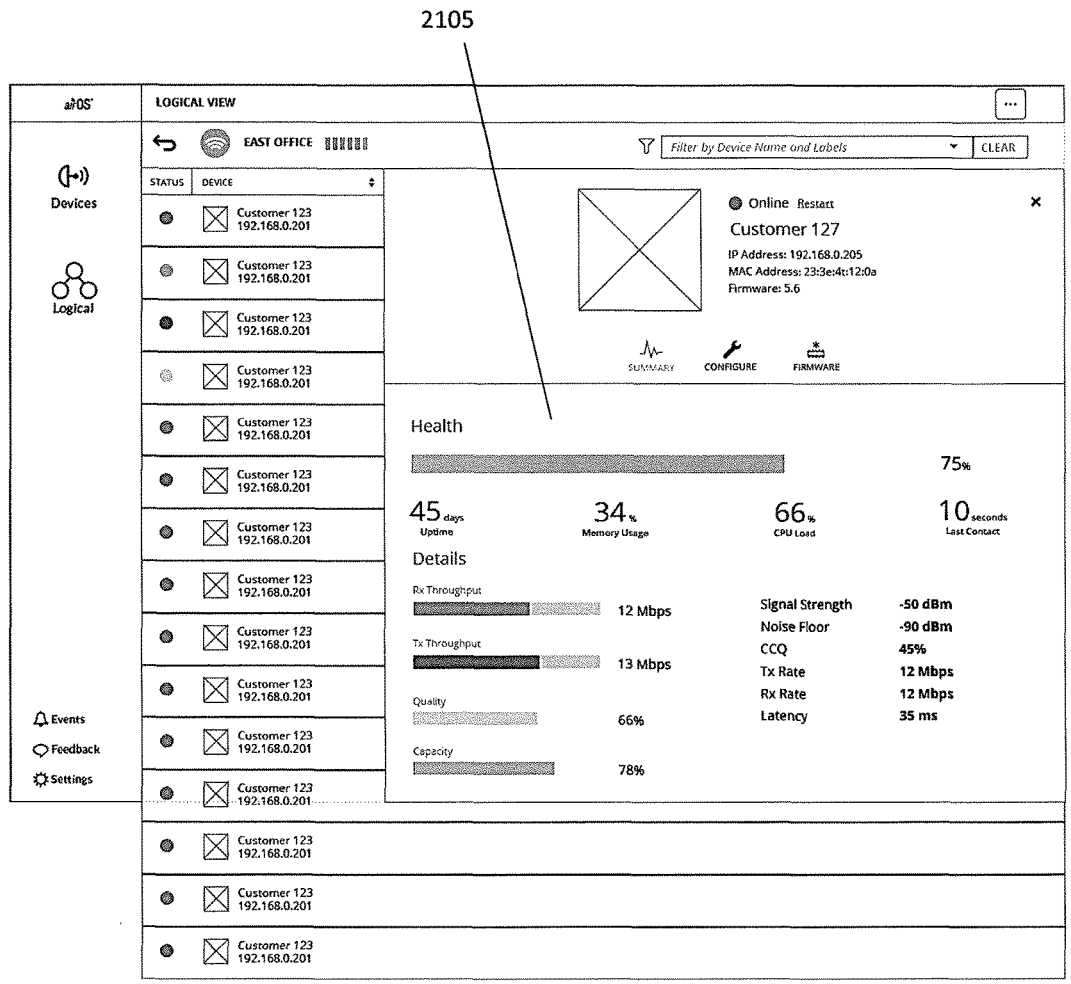
FIG. 21 illustrates another logical link view (shown as a table or listing rather than a mapping) illustrating performance information about one of the CPEs (stations) connected to the network.
Figure 22:
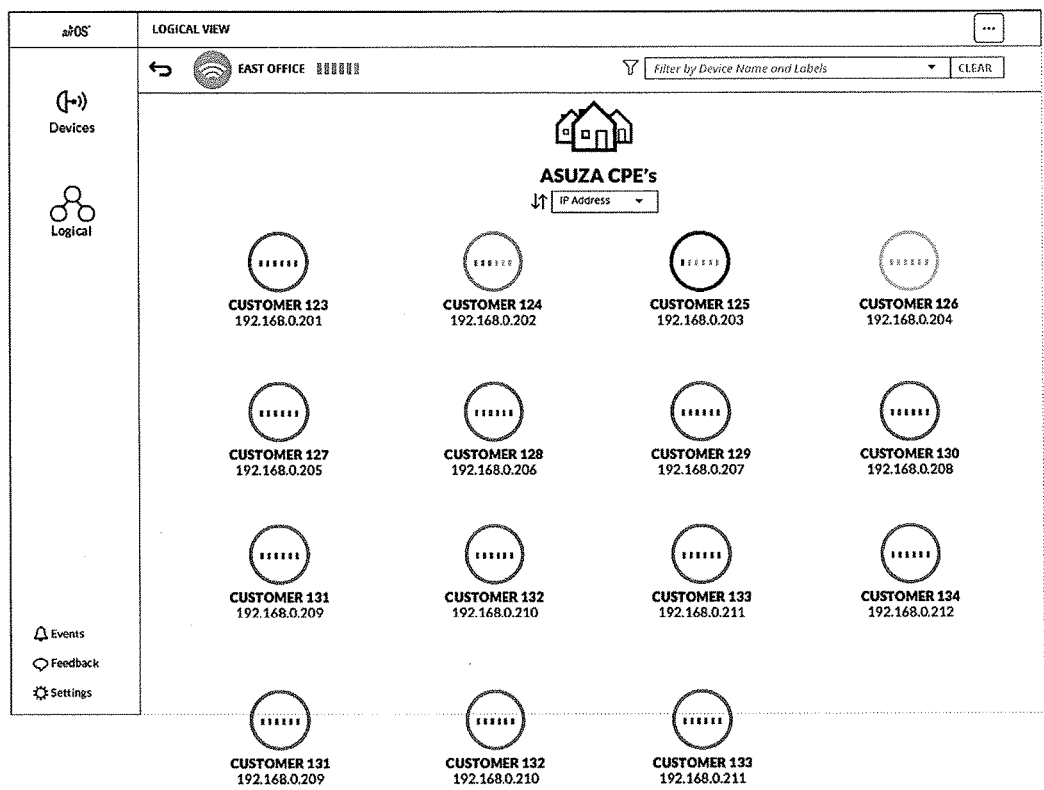
FIG. 22 shows another example of a display for a user interface of a tool that may be used in addition to or alternatively to the display shown in FIG. 21.

FIG. 19 is another example of a portion of a logical view of a network, including detailed information about a particular node (in this case the Asuza node) which is connected to 15 CPEs. The detailed information 1905 in this example includes information about the health of this node, which is shown both as an overall metric 1907, shown as a percentage, incorporating the details of overall quality 1909, capacity 1911, and strength 1913 of communication with and/or within the node (e.g., to/from the AP). FIG. 20 illustrates an example of a logical view of a network, which may be shown in part by the user interface, and the user interface may be moved to adjust the portion being displayed, as shown by the box 2003. Similarly, FIG. 21 shows an example of a logical view listing of the devices forming part of the node being examined ("East Office"), along with detailed information 2105 about the health of the node and/or one or more individual components in the node. FIG. 22 shows an alternative view of the devices in a particular node that have been grouped as part of the node ("Asuza"). In this example, all of the stations are CPEs communicating with a particular AP. Devices are indicated by a name and/or IP address.

Figure 23:
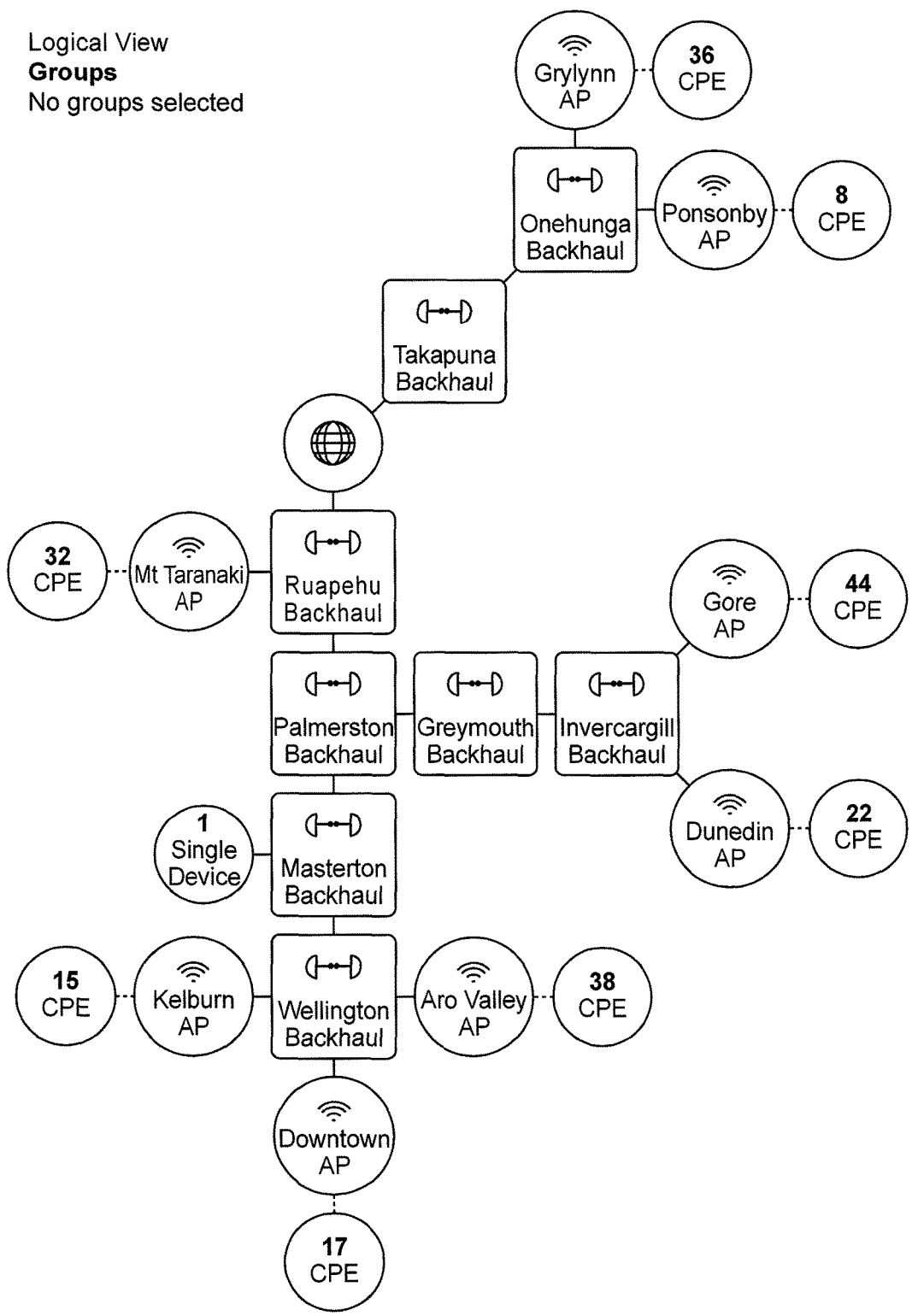
FIG. 23 illustrates another example of a logical view showing a plurality of groups (nodes) including APs, CPEs, backhauls, etc.

FIG. 23 illustrates one example of a logical link mapping of a network (all or a portion of a network). In addition to displaying the mapping and allowing the rapid and easy display of additional information about the network, a user interface may also simplify modification of all or a portion of the network, including configuring device in the network.

Multi-Device Configuration Using Logical Groups

The logical view described above may also be used to provide a simplified method of changing settings for all (e.g., a group) of settings within a logical group. For example, the logical view may be used to change common settings for all devices in a logical group (forming the node). Although a variety of settings may be modified, in order to keep the view simple, only a subset of settings may be changed (and/or displayed as allowed to be changed).

The logical view described above may be configured to permit multiple selections ("multi select"), including selecting the order of operations. If user needs to configure something that is not available from Logical View, they can select another view (e.g., a device-specific view) and access a full set of device configuration options.

In particular the apparatuses and devices described herein may allow the batch selection of multiple devices forming one or across multiple nodes (including entire nodes), and may structure the batch selection and modification of configuration so that connectivity is not jeopardized. For example, since changing a configuration can break a wireless link, and changing configuration in the wrong order will cause the remote device to become inaccessible. Thus, it may be important to implement configuration changes in and order from "farthest from the internet" to "closest". For example, if devices in a network are connected so that: <internet>-A~~~B-C~~~D, if a user selects all 4 of these devices, and makes a configuration change, the methods and apparatuses describe herein may operate to automatically change/save the configuration of D, then C, then B, then A.

When selecting multiple devices, some configuration options cannot be applied to all devices. I'm such situations, the method or apparatus may detect and provide for this, for example preventing or determining dynamically based on the incompatible options available for each item. For example, in some variations all of the devices networked (and even forming the same node), may operate across different frequencies. Some devices do not have the same frequency options as other devices. The apparatus may detect these differences, and may prevent the selection of this as a batch option. For example, the frequency option (to modify frequency of selected components) may not be displayed, or it may be grayed out. Similarly, channel bandwidth may be determined and controlled; different devices may have different options for bandwidth (e.g., some may have 5/10/20, some 3/5/8/10/20/25, etc.), so if such devices are selected, only the common options between all devices may be displayed.

In addition, there may be different security options between different devices that may be selected. In some variations the selection of devices having different security options may be prohibited, or may be modified, for example, by allowing and organizing sequential selection of sub-sets of selected groups.

In general, to start, any number of devices may be selected. In some variations one or more nodes may be selected, which may select all of the devices forming that node (e.g., an AP including all of the connected CPEs). In some variations, multiple nodes may be selected, including multiple APs and CPEs. In some variation the node may be backhaul or multiple backhauls. Selection may be made from one or more of the views described herein, including the logical view illustrated above. For example, nodes or individual members (devices) forming a node may be selected graphically (e.g., by 'clicking' on the node), selecting it from a list or drop-down menu, or the like.

Figure 24A:
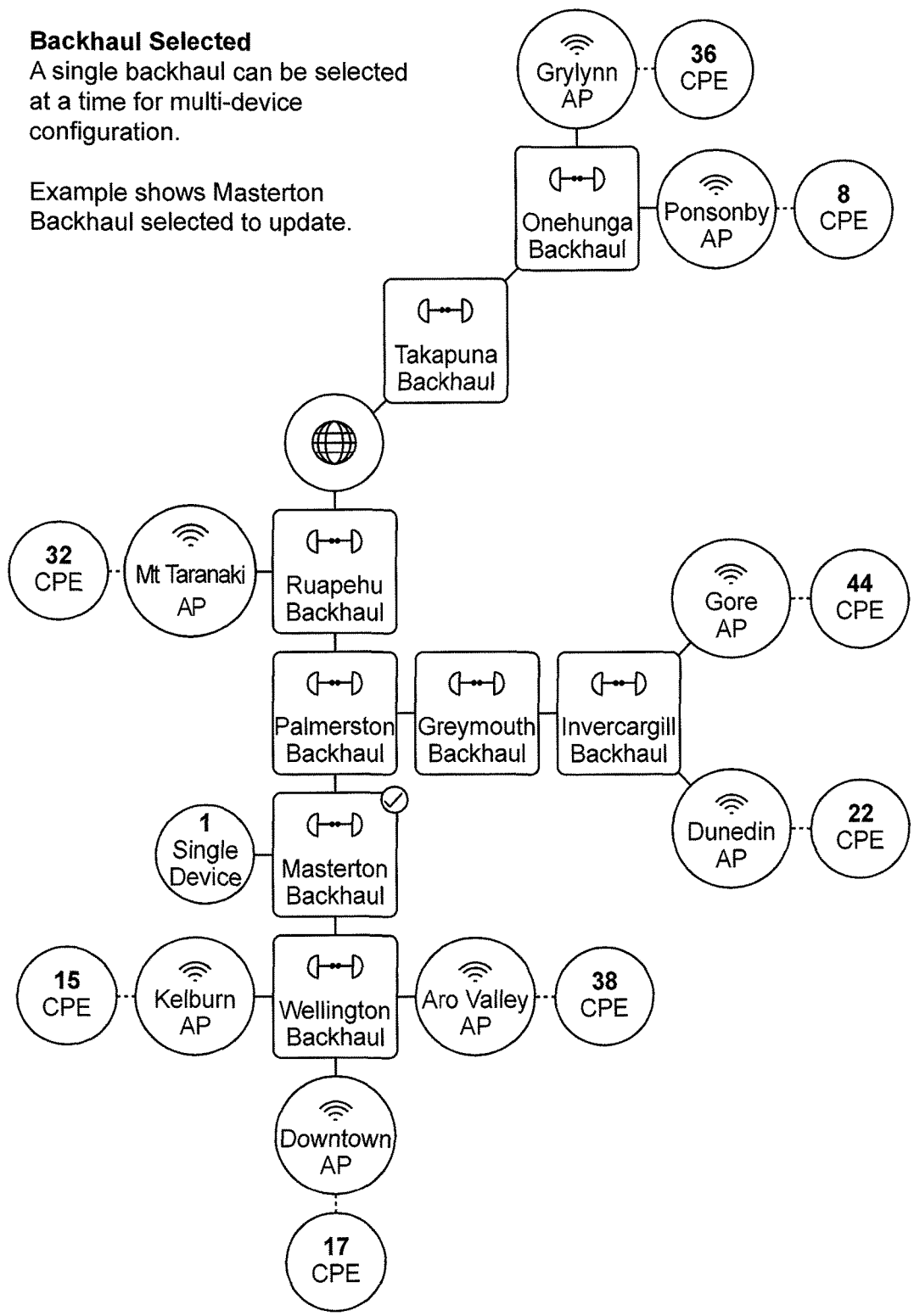
FIG. 24A illustrates a logical view with a single component (backhaul) of the network selected. Selecting a single node/link (component) in the network may also be used to automatically select an entire group of connected stations, e.g., for configuring them, as illustrated in FIG. 24B, which is similar to the view shown in FIG. 24A after automatically selected logically linked/connected nodes.

For example, FIG. 23 shows on example of "logical view" of a network, similar to that shown and described above. In a first example, shown in FIGS. 24A-24F, one or more (or a group) of nodes corresponding to a backhaul or group of backhauls may be selected. In FIG. 24A a single backhaul is selected at a time for a multi-device configuration.

Figure 24B:
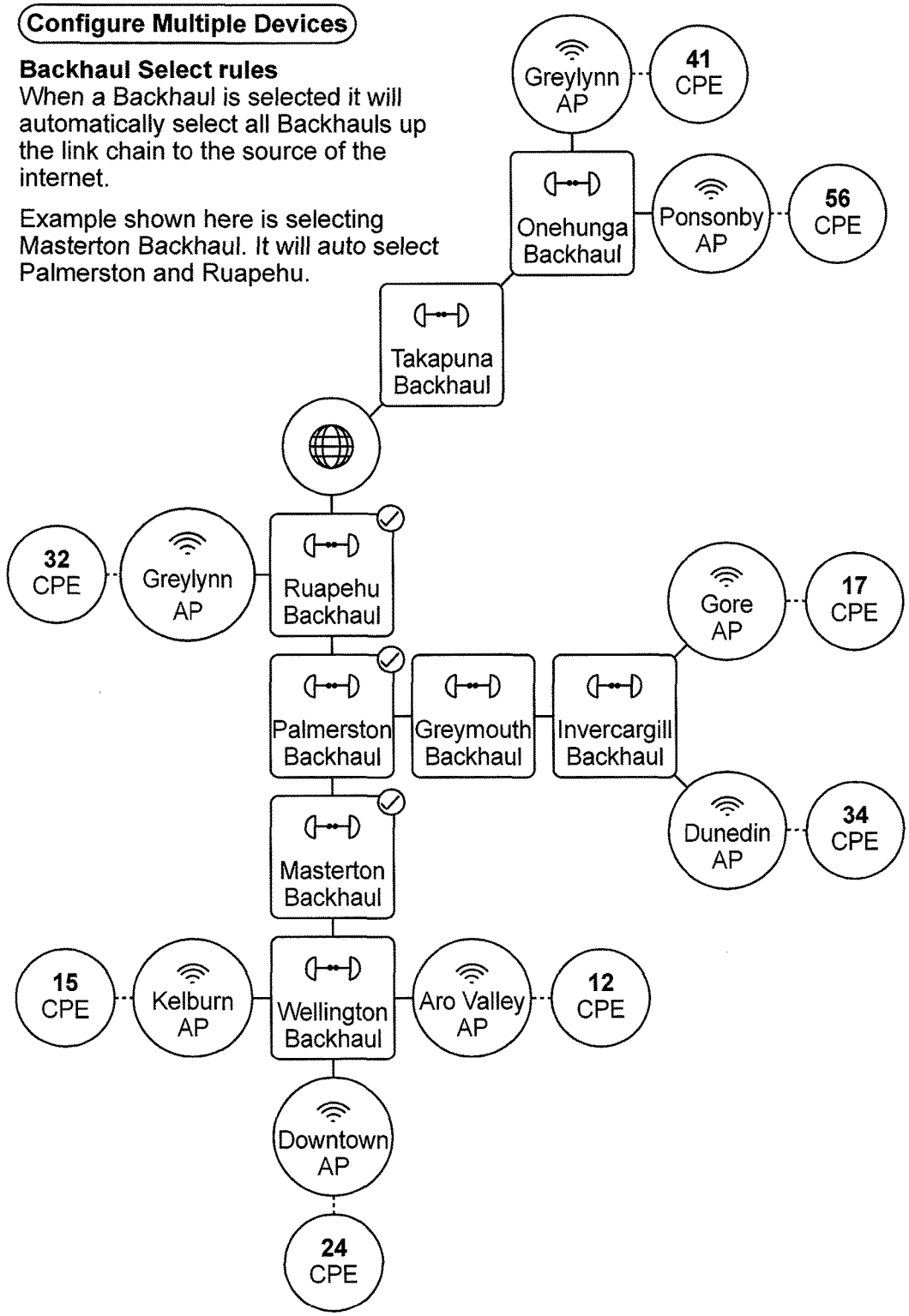
FIG. 24C illustrates an alternative example of automatically selected connected nodes for operating on all logically connected devices.
FIG. 24D illustrates another example of a logical view mapping using a tool as described herein in which a backhaul portion of a network has been selected.
FIG. 24E is an alternative view of the display shown in FIG. 24D.
FIG. 24F illustrates selection of nodes to configure all of the members in a node (group).
Figure 24C:
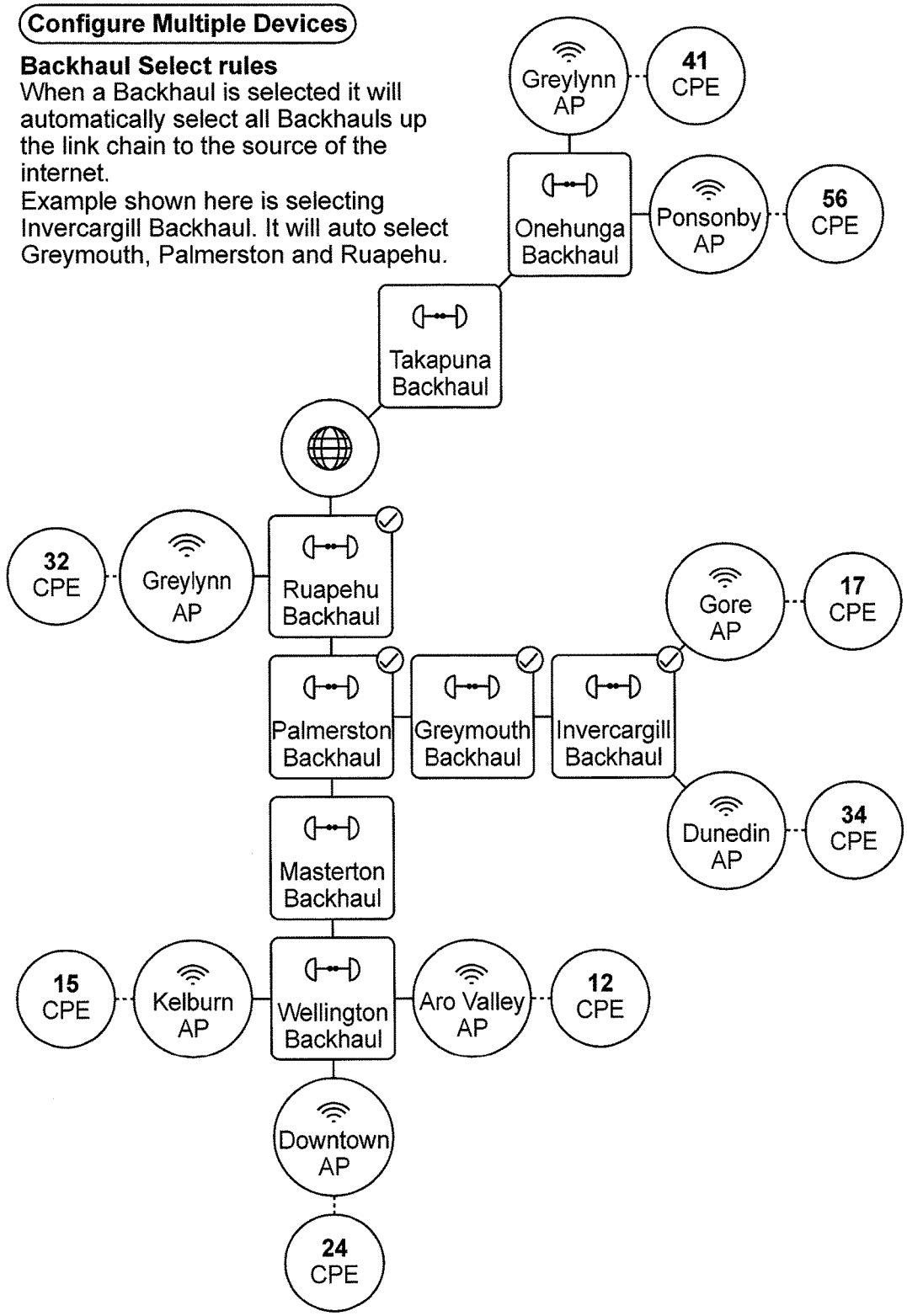
Figure 24:
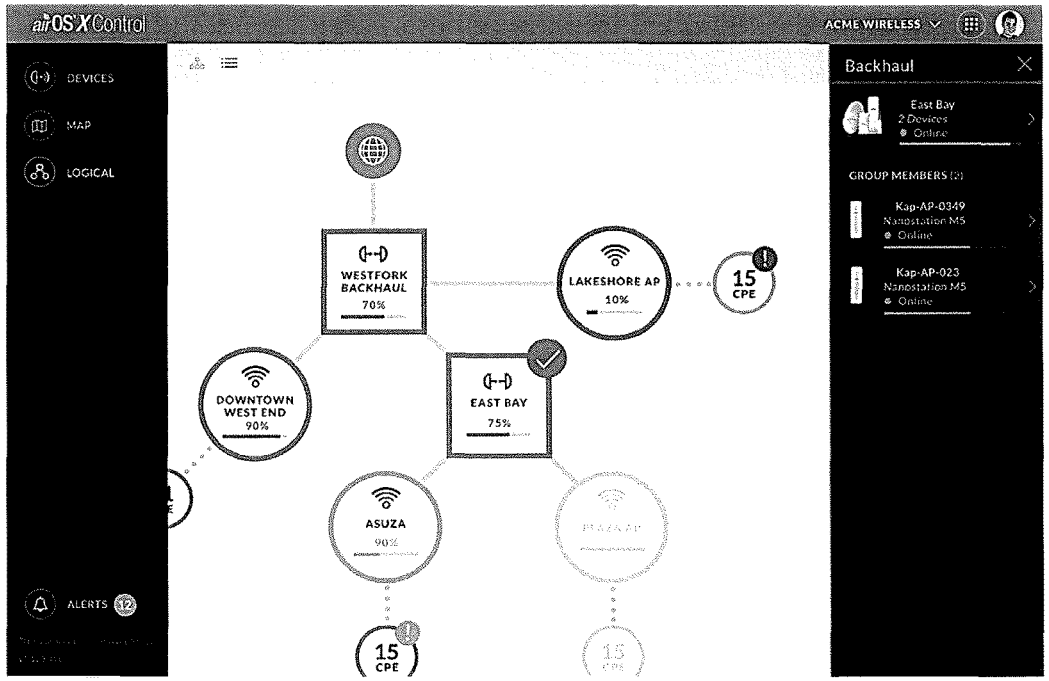

For example, FIGS. 24A-24F illustrate the selection of a group of logically linked devices forming a branch of a network and formatting them together. In FIG. 24A, a single backhaul may be selected ("Masterton Backhaul") and multiple devices linked to this backhaul as shown in the logical link topological display may be updated simultaneously. When the backhaul is selected, it may automatically select all of the backhauls up the logical link chain to the source of the internet; as shown in FIG. 24B, the Palmerston Backhaul and the Ruapehu backhaul connecting the Masterton Backhaul to the internet source are also selected automatically, as will (as shown in FIG. 24C) backhauls linked to these connecting to other nodes, such as Greymouth Backhaul and Invercargill Backhaul.

Figure 24E:
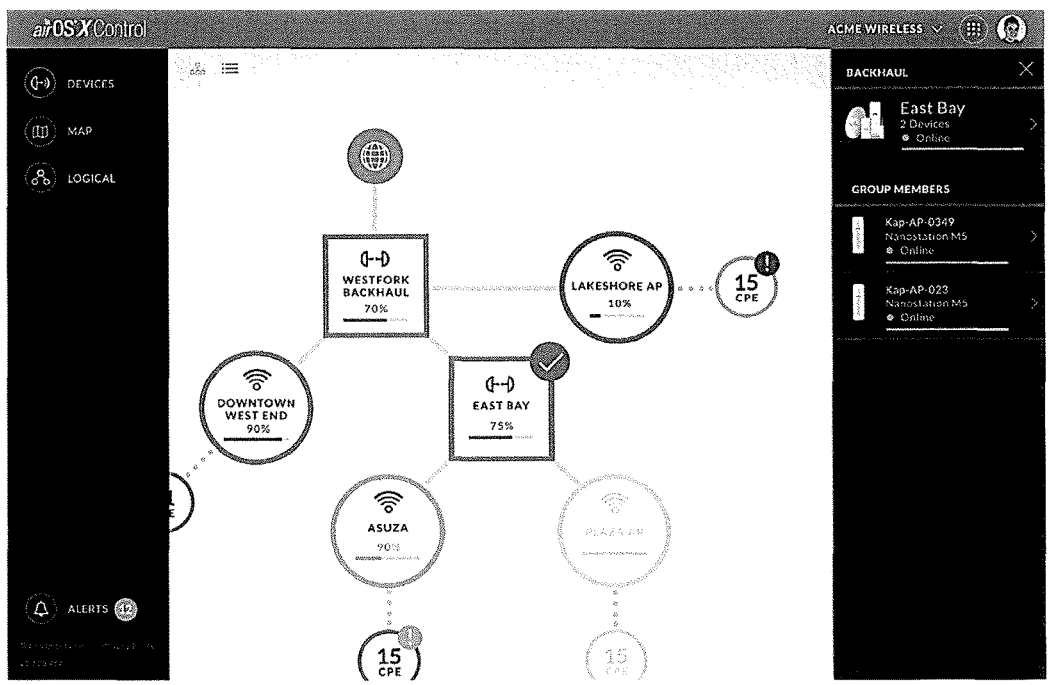
Figure 24F:
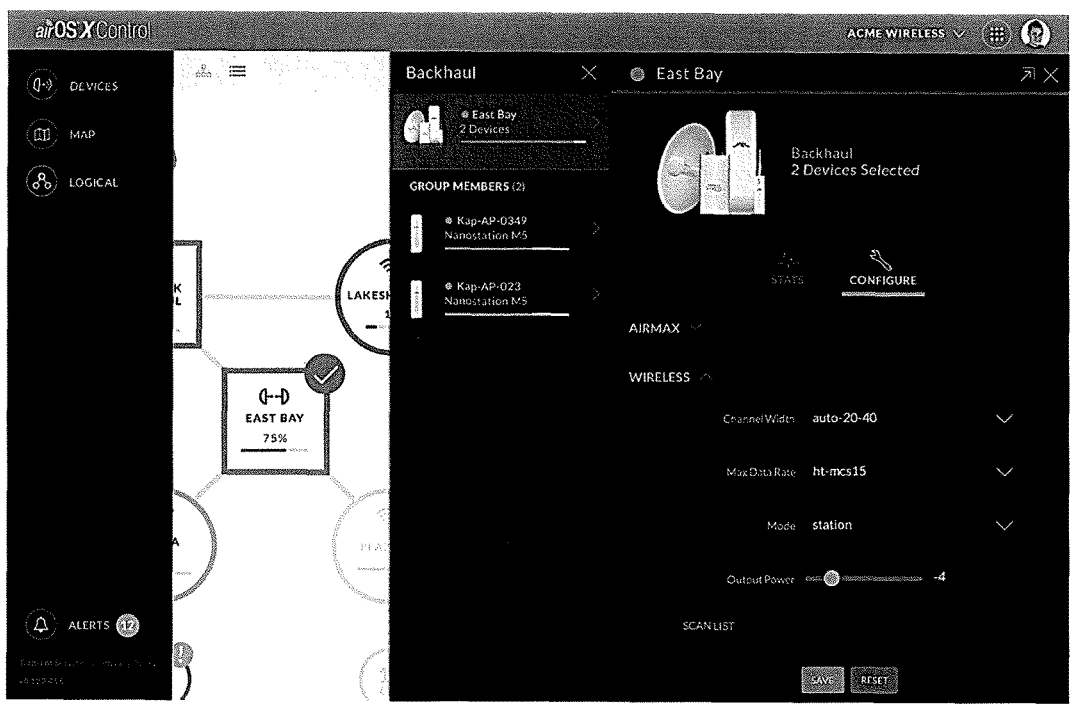

As shown in FIGS. 24D-24F, selection of nodes may allow configuration of all of the members in that node (group). For example, as shown in FIG. 24F, the selection of the "East Bay" p2p node, which has two members (Kap-AP-0349 and Kap-AP-023) will allow configuration of both group members, e.g., configuring the channel width, max data rate, mode and/or output power.

Figure 25A:
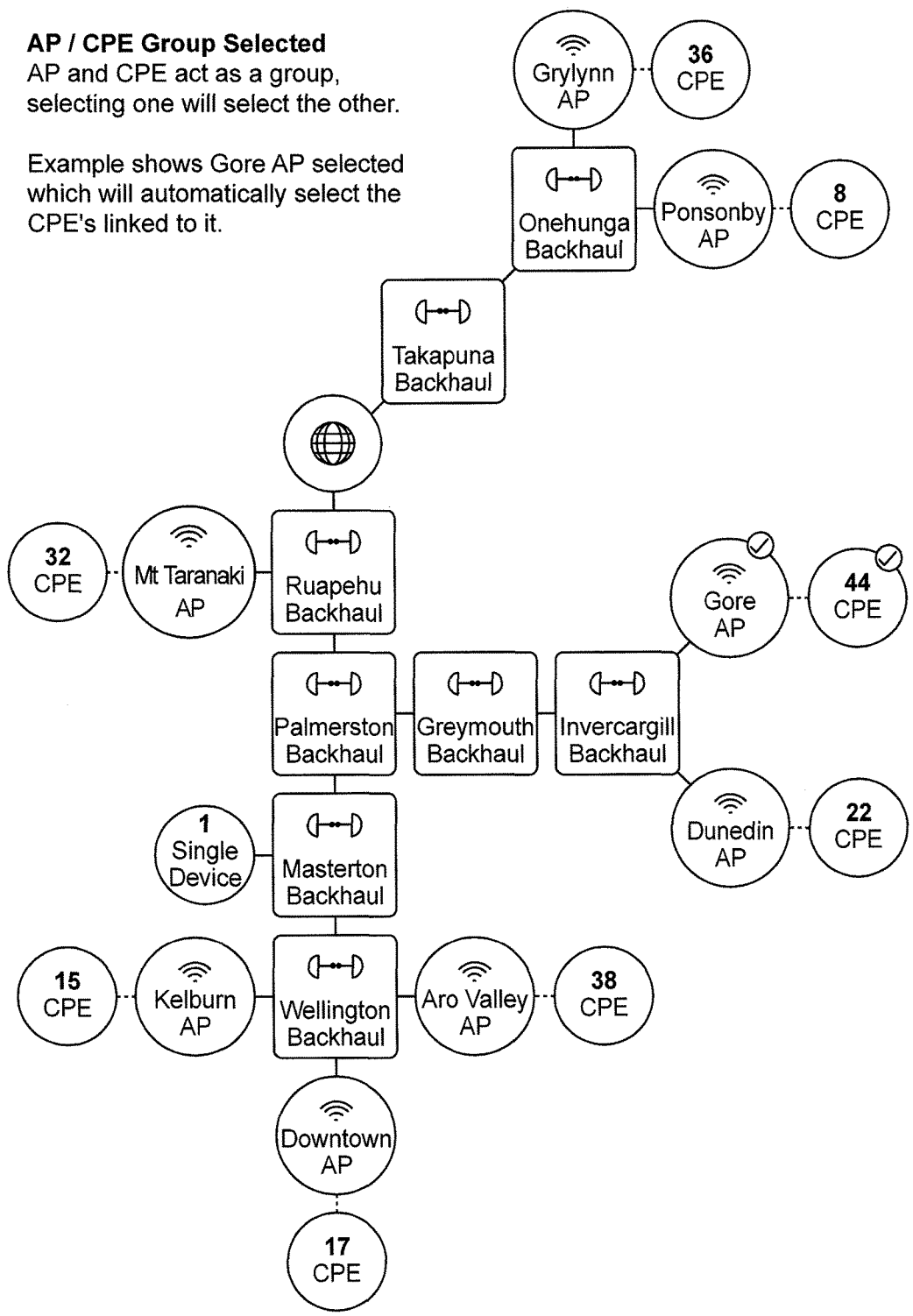
FIG. 25A illustrates a user tool including a logical link display that may be used for automatic selection of one or more groups (e.g., AP/CPE groups) in a logical link view.
Figure 25B:
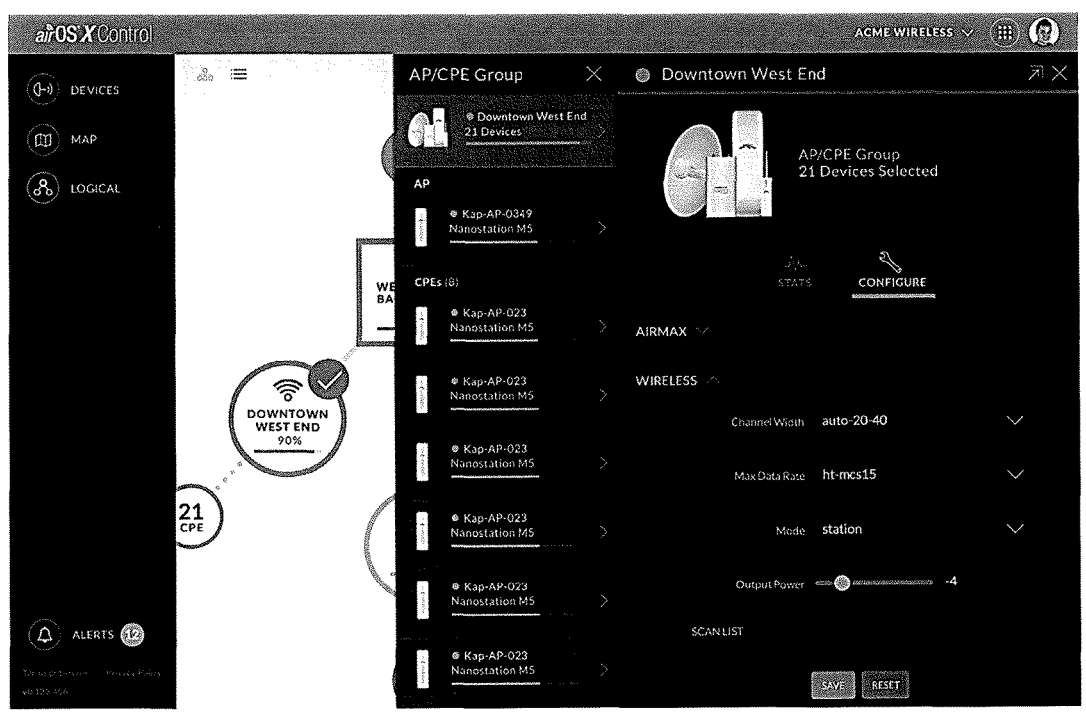
FIG. 25B illustrates the display of detailed information about a link (and AP/CPE link) including performance information about the AP and all or some of the CPEs which may be graphically and interactively displayed by the user interface tool.

Similarly, FIGS. 25A-25B illustrate the group configuration of an access point (AP) using the logical mapping user interface. In FIG. 25 the "Gore" AP has been selected, which includes 44 CPEs, and these CPEs are automatically selected. This is also shown in FIG. 27.

Figure 27:
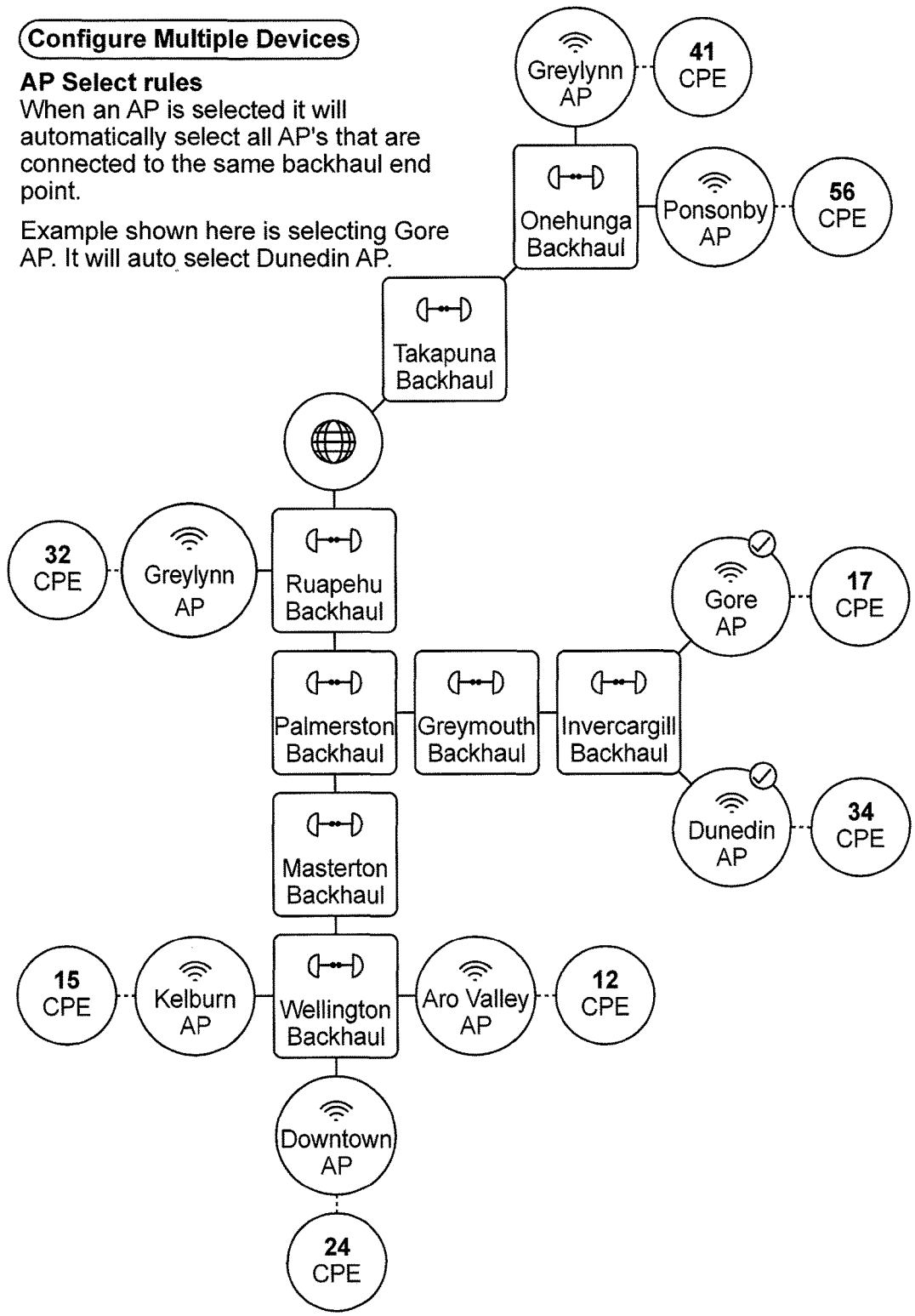
FIG. 27 is an example of a logical link mapping of a network illustrating the selection of multiple devices, including automatic selection of devices logically connected to the same portion/region of the network.

FIG. 27 illustrates the selection of multiple devices (e.g., two APs). In some configurations the apparatus or method may be configured so that selection of an AP automatically selects all of the APs that are connected to the same backhaul end point. In any of the variations described herein such "rules" may be included. The apparatuses and methods described herein may be configured so that these rules are not required, or may be selected by the user (or chosen as optional defaults).

Figure 26:
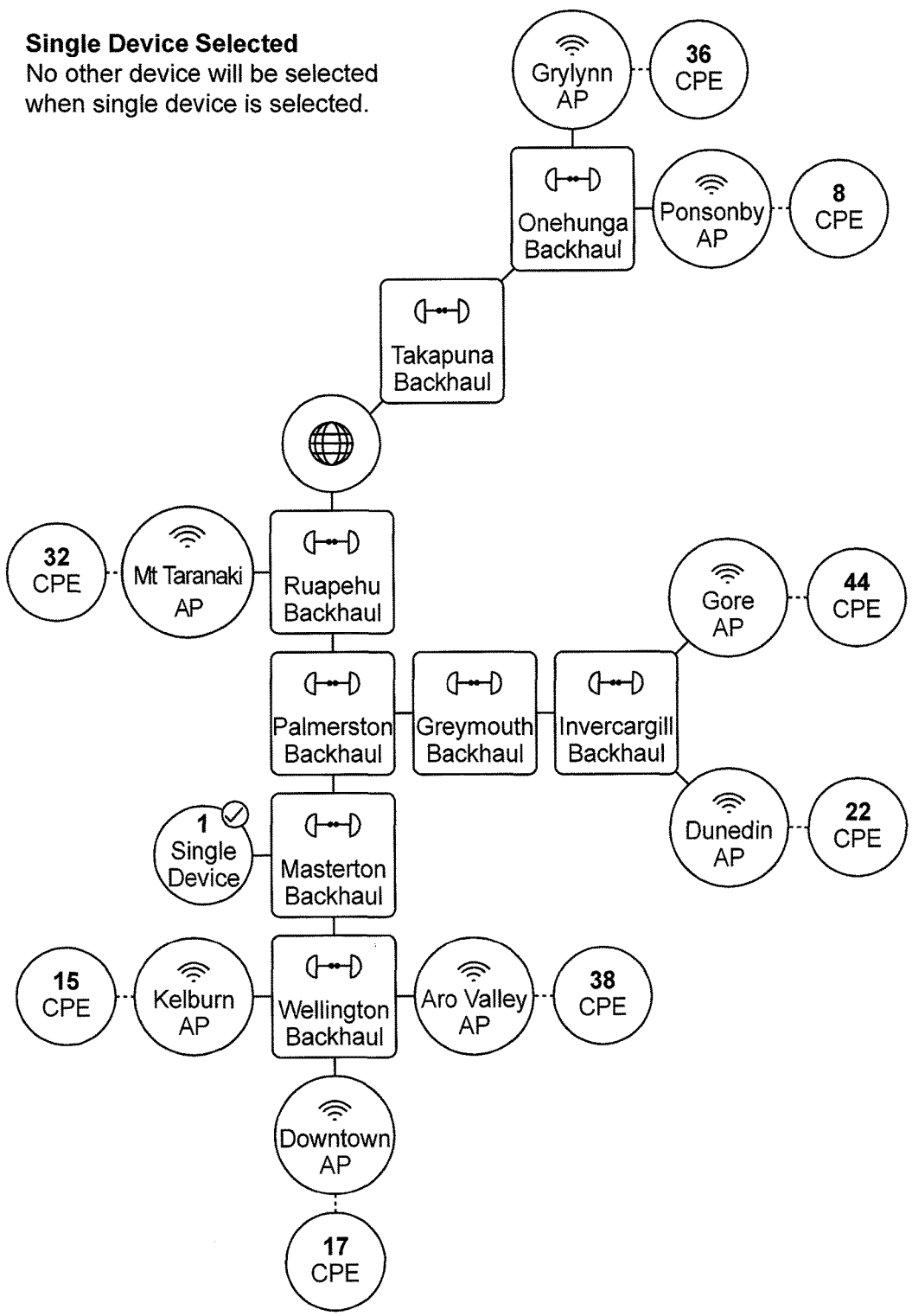
FIG. 26 is an example of a logical link mapping of a network illustrating the selection of a single device.
Figure 28:
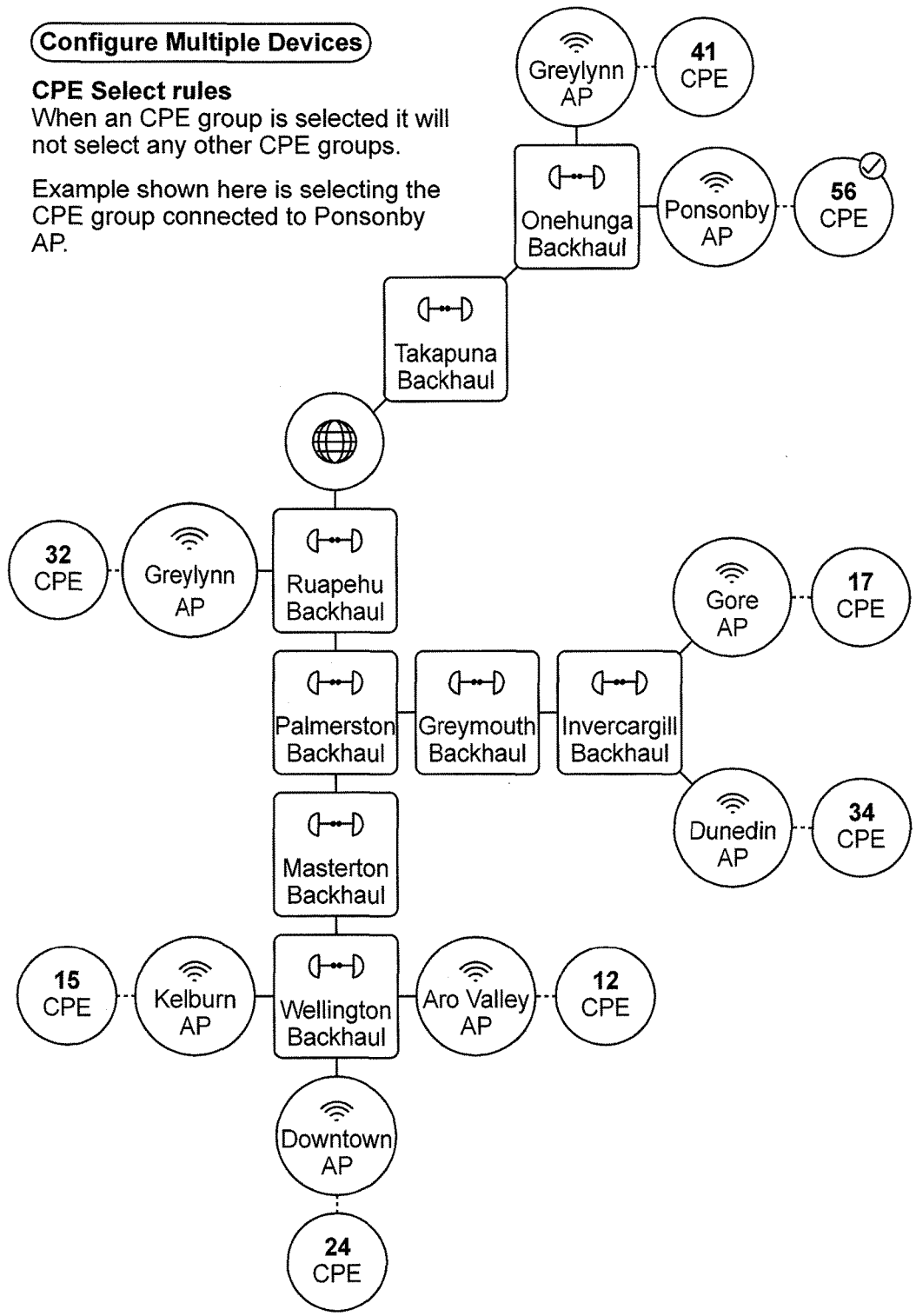
FIG. 28 graphically illustrates the use of a logical linking mapping to automatically select and operate on (e.g., configure) a plurality of devices connected to a selected node of the mapping.

In FIG. 25B, the AP/CPE group selected is the "Downtown West End" and 21 devices forming the group may be selected and configured together. As shown in FIG. 28, in some variations, when a group is selected it may not select any other CPE groups. Alternatively the user interface may allow a single device to be selected, as shown in FIG. 26. FIG. 28 illustrates the selection of a group of CPEs. In some variations, different groups of CPEs may be separately selected (e.g., even when connected to the same AP), or groups of different CPEs connected to different APs may be selected.

Figure 29:
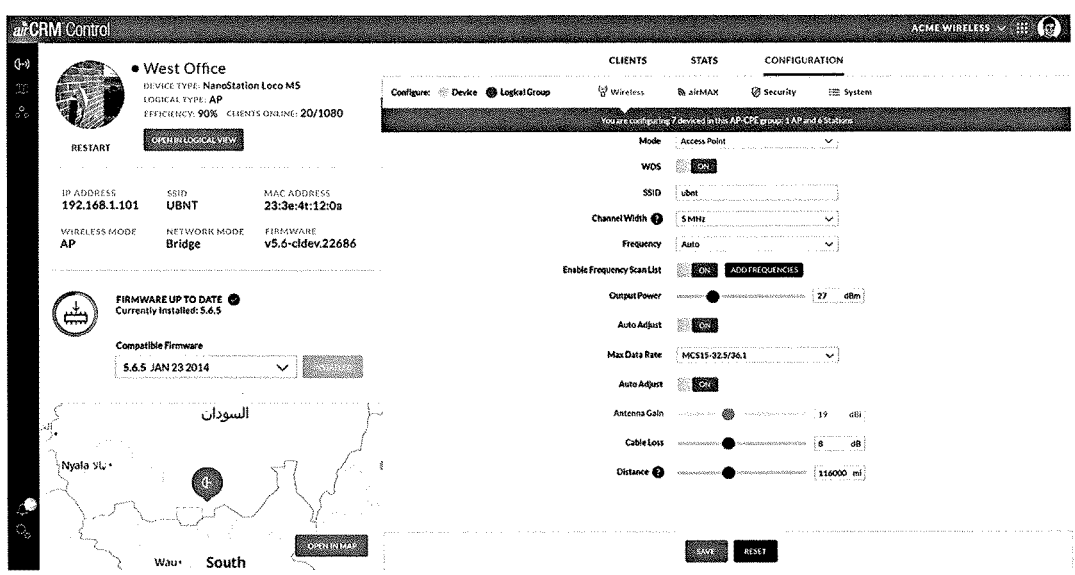
FIG. 29 illustrates a control and monitoring screen for a user interface of a tool indicating mass configuration based on logical link mapping, such shown in the topographical displays of FIGS. 10A-22.

FIG. 29 illustrates a summary configuration display which may be part of a user interface, showing parameters being configured, and linking to the logical view of the rest of the user interface. FIG. 29 illustrates a view of an exemplary display and control for configuration of a batch (group) of devices. In this example, seven devices (1 AP and 6 stations) are being configured. In addition to the configuration controls shown, additional information about the devices (e.g., all or a subset of the devices, such as the AP) may be displayed, e.g., on the left side as shown.

As mentioned above, the logical view may be generated by rational grouping. For example, a single node may be formed for one or more APs and all of the CPEs that communicate through the one or more APs (typically a single AP), and for all linked Point-to-point connections (e.g., all point-to-point antenna/radio devices in a chain), or the like.

During configuration, one or more information, alert or warning notifications may be displayed, e.g., when specific operations/configurations are performed. For example, modifying one or more of frequency, bandwidth, SSID, etc. may trigger a warning/confirmation (e.g., warning box) to be presented. In addition, the apparatus or method may be configured to control the order and timing of configurations between the devices. As mentioned above, Further, the method or apparatus may timeout if one or more devices are not responding within a predetermined time. In some variations, the apparatus or method may also be configured to prevent overlapping updates, e.g., when one update for logical group containing a particular device (e.g., an AP1), is followed (or concurrent) with a second update instruction that includes the same device (e.g., AP1), or the same device only. For example, the apparatus or method may lock out further updating for some predetermined period; e.g., updating a device may lock the logical group containing the device. When a group is locked, no further changes can be made until the lock is released. The lock may be released when all commits have completed, or all commits have timed out, and/or following some predetermined waiting period.

Link Simulator

Also described herein are map views that provide link simulation, in which one or more preferably multiple "links" may be simulated to determine the impact of new, removed or modified links on the network. The link simulators described herein may allow users to estimate a wireless link's performance before physically installing and configuring the link (or multiple links). These link simulators will let the user know if there are potential issues prior to installation, for example, indicating a need a larger antenna (e.g., signal too weak), obstructions in the path (e.g., mountain/trees/buildings), a need to raise height, due to Fresnel zone obstruction, or the like.

Previous link calculator tools suffered from numerous defects, including the need for intensive calculations, requirement for access to third-party databases, required a lot of constants, and the data used/generated was not persistent. The methods and apparatuses described herein may be point-to-point or multipoint (and may therefore be used in conjunction with tower coverage determinations).

The calculators described herein may calculate expected signal level. For example, when installing long-range wireless equipment, maximum signal levels may depend on the distance of the link. With simple equations, and some information about the devices, one can estimate what the maximum possible signal level of a link should be. For example, Free Space Loss (FSL) may be calculated. In RF, we can calculate how much power (energy) is lost over a certain distance by using the FSL calculation. This is derived from the Friis equation, and simplified based on constants & assumptions:

$$FSL=32.4+20\ \log(f)+20\ \log(d)$$

Where: f=Frequency (in MHz), d=Distance (in km) and FSL=Amount of signal lost (in dB). Link budget may also be calculated:

$$LB=txPower+txGain+rxGain$$

Where LB=Link Budget in dBm, the total amount of available power received at remote radio without loss, txPower=Transmit power of remote device, txGain=Transmit gain of remote device's antenna, and rxGain=Receive gain of local device's antenna. Receive Signal level may be calculated:

$$RSL=LB-FSL$$

RSL=Receive Signal Level (in dBm—denoted with negative value. −30 dBm is very strong, −90 dBm is very weak).

The Fresnel zone may also be calculated, using the equation:

$$r = 8.657\sqrt{\frac{D}{f}}$$

where r=radius in meters, D=total distance in kilometers, f=frequency transmitted in gigahertz, and the "r" is the radius at the center of the link. The Fresnel zone may be displayed as 0 at link edges, and gradually getting larger to size "r" in center of link. When displaying Fresnel zone, the full Fresnel zone (above) may be displayed, but in most cases slight Fresnel obstruction will not cause major problems. When 40% of Fresnel zone is obstructed, a user may start seeing degradation. The methods or apparatuses described herein may display three lines: an original link (straight line between two points), a 100% Fresnel (using the equation above, this is typically displayed below the original link) and a 60% Fresnel mark (using 60% of value above).

The rain rate may also be determined as based on ITU-R P837-3 (e.g., "Characteristics of precipitation for propagation modelling"). A database based on latitude/longitude may be provided to allow calculation/estimates.

Other factors may also be included and calculated (displayed) in the link maps provided herein, either on the map or included as one or more "layers" that may be shown/removed from the map. For example, TDWR (e.g., TDWR towers) may be included, and radar signals may be detected if above a threshold. The display may include the frequency of TDWR, and the direction of a link may be compared in relation to TDWR position.

Figure 30:
FIG. 30 illustrates another variation of a user interface for a tool for simulating one or more links in a network for determining wireless transmission characteristics.
Figure 31:
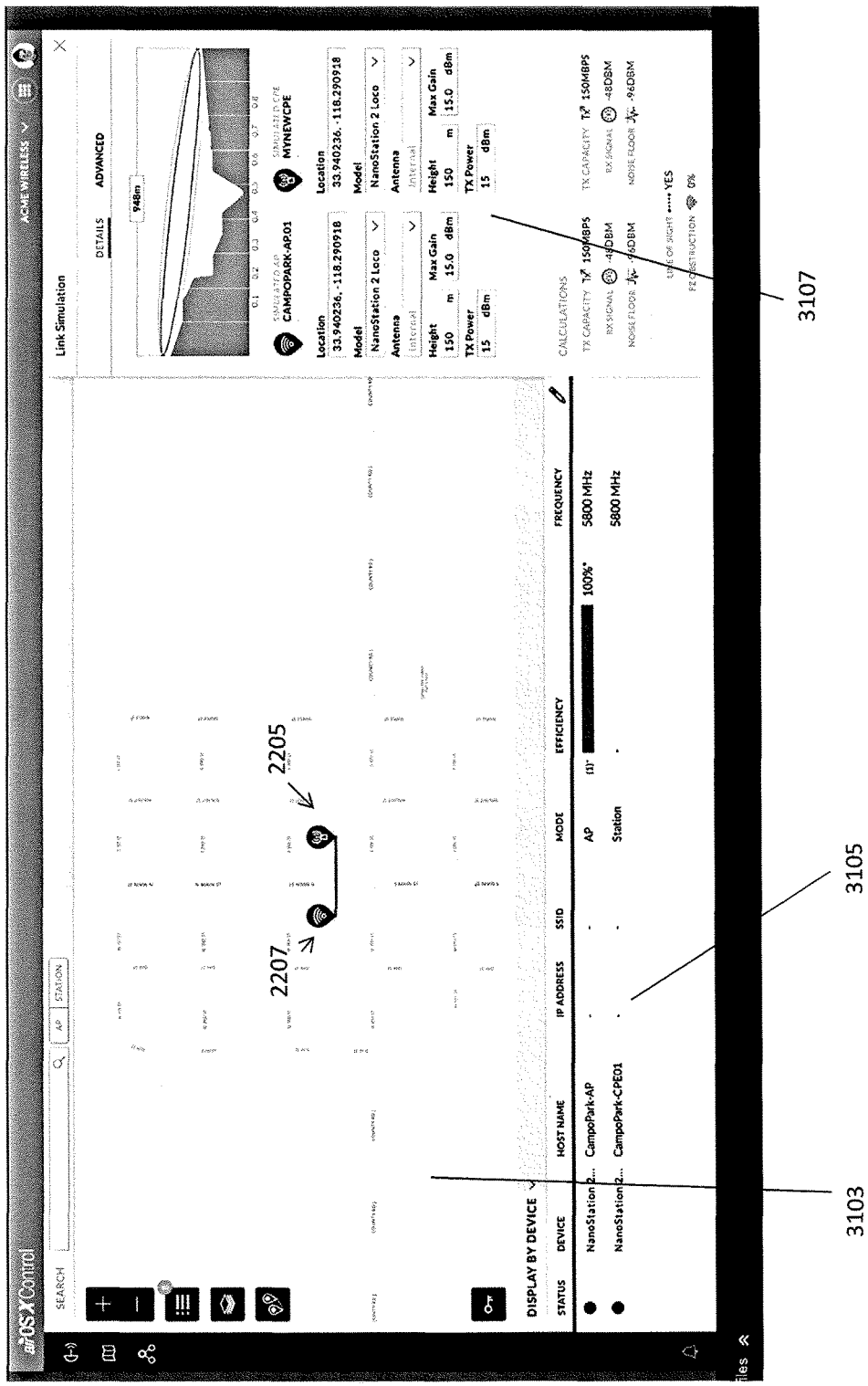
FIG. 31 illustrates the use of a link simulation tool to simulate the connection between two devices.

FIGS. 30 to 37 describe examples of the methods and apparatuses (including displays) for link determination as described herein. For example, FIG. 30 shows a map view of a region (geographical region) that may be at least partially covered, or that a user may wish to cover, with a network. In FIG. 30, the user interface shown may also include controls 2101 (e.g., buttons, etc.) for inputting information into the user interface, including positioning potential ('new') devices such as stations, APs, backhauls, towers, etc. on the map 2105.

Stations may be positioned based on actual locations of existing network devices, or they may be simulated devices/locations, and/or they may be existing devices that are simulated at a different location. For example in FIG. 31, two devices 2207, 2205 are shown positioned on the geographic mapping. These icons indicate an AP 2207 and station 2205. The user interface also includes a display 3105 below the geographic mapping 3103, and a window or region 3107 showing the link simulation between the two selected devices. The link simulation display portion of the tool is described in greater detail in FIGS. 37A-37B, 38 and 40.

In any of these display tools, the geographic display may include a plurality of devices of the network, or all of the network; in addition, other non-network RF sources may also be displayed, including antenna towers, etc. For example, In FIG. 32, the map includes a plurality of stations communicating with a particular AP, similar to that shown in FIG. 31. As mentioned, the devices forming the network may be automatically or manually added 3305, including copying existing stations. Thus, the user interface may include controls for adding/removing stations, moving them, and may allow selecting them to modify their properties. Properties for each station may be manually entered or automatically entered, e.g., from a database, etc. For example, the database may include a mapping of devices and information both identifying the device(s) and providing functional characteristics (antenna position and/or orientation, type, power, antenna gain, antenna direction, data rate, operating frequency, operating frequency channel(s), maximum Tx/Rx rate(s), center frequency, interference level, bandwidth/channel width, cable loss, maximum power output, etc.), and/or some or all of this information may be manually entered.

Figure 32:
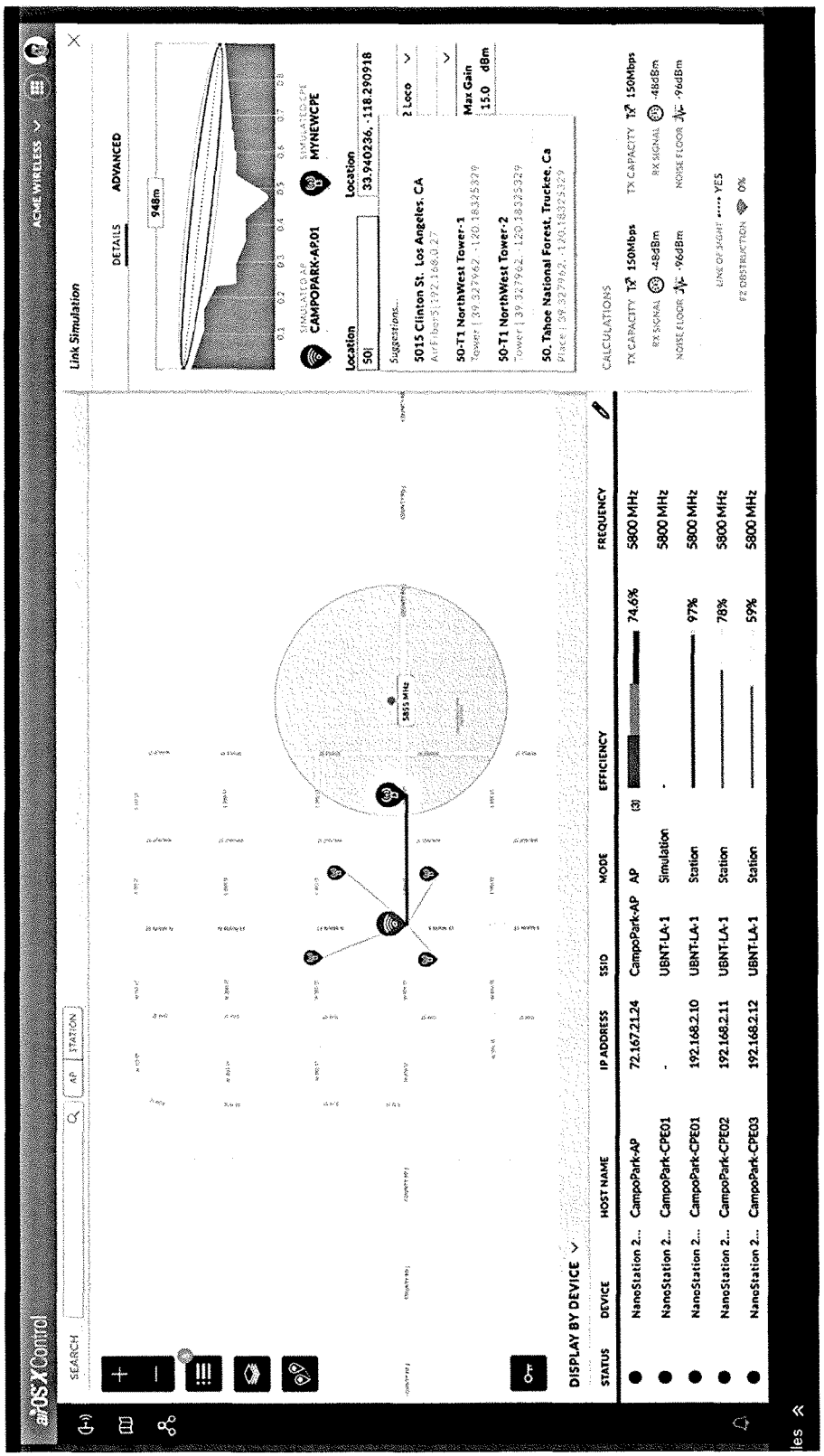
FIG. 32 shows a link simulation tool including multiple links between client devices and an access point, and also illustrates a nearby RF source.
Figure 33:
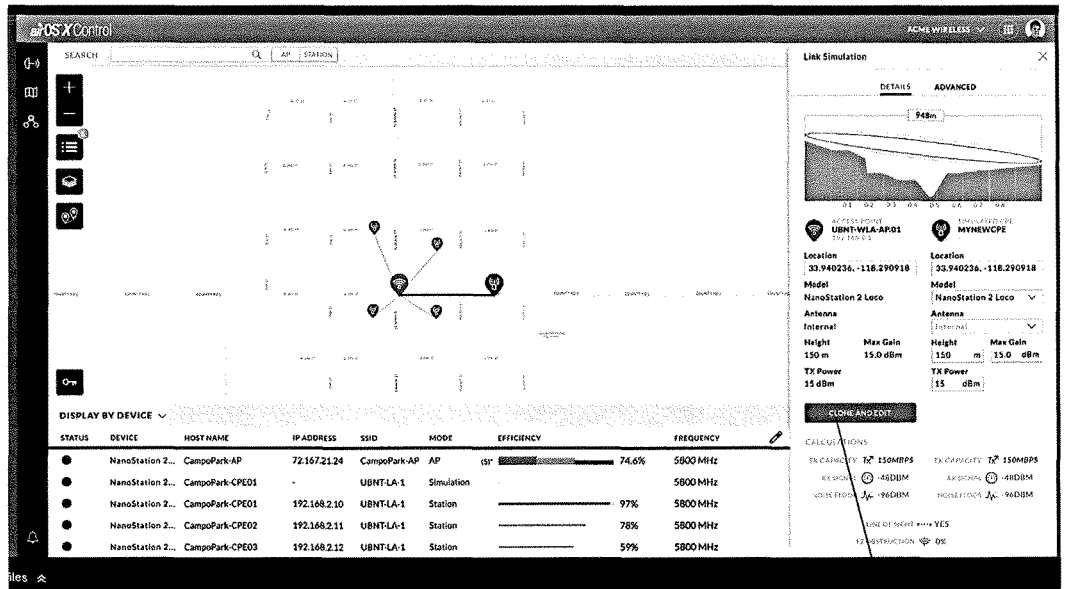
FIG. 33 illustrates the link simulation tool of FIGS. 31 and 32, graphically displaying a geographic mapping of a portion of a network, including an access point and a plurality of stations, details on devices shown in the map (including device name, host name, SSID, IP address, Mode, Efficiency and frequency), and a simulation of a link between two (selected) devices in the mapping.

The user may select (e.g., graphically/interactively) the link to be simulated, and with additional links selected, the displays may be updated to reflect the additional information, as shown in FIGS. 32 and 33.

Figure 34:
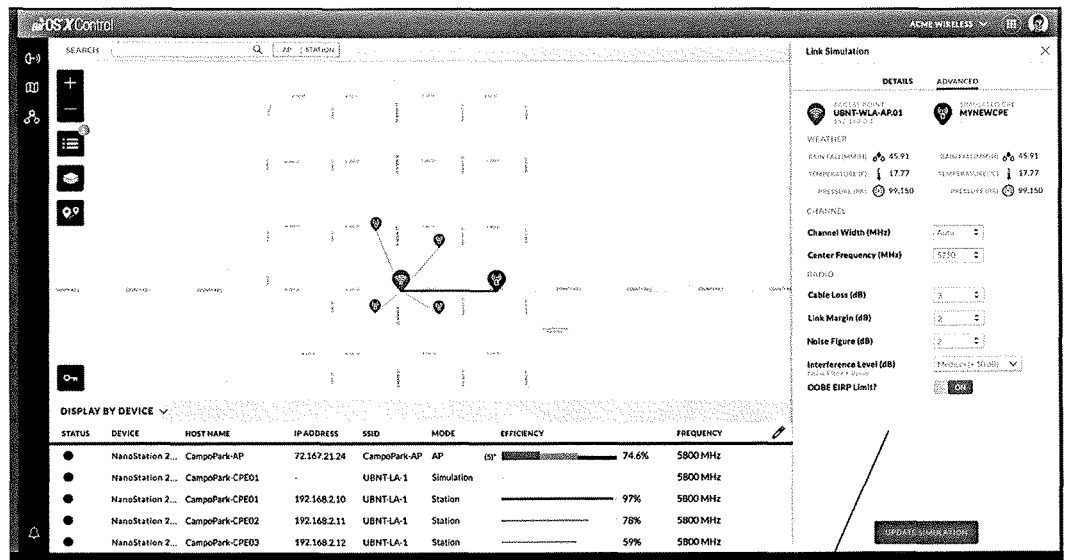
FIG. 34 is similar to FIG. 33 showing detailed information about the two devices from the geographic map forming the link being analyzed.
Figure 35:
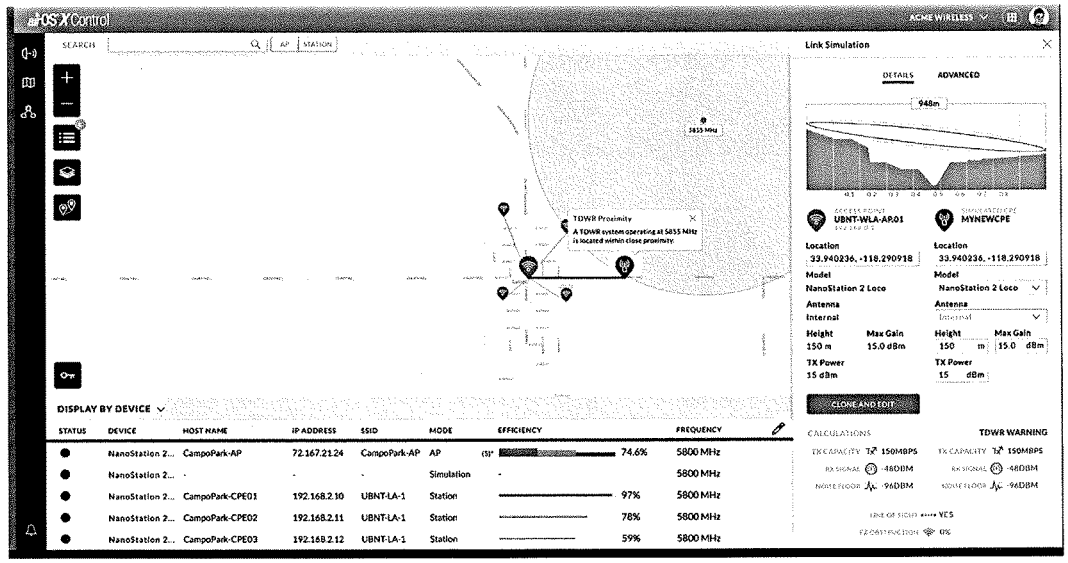
FIG. 35 is similar to FIG. 33, indicating a nearby RF source of TDWR (Terminal Doppler Weather Radar) which may need to be avoided and may interfere.

FIG. 33 illustrates a link simulation showing a map with a predictive search for a device based on the parameters provide by the user. FIG. 33 shows a link simulation in a simulation mode with a placed point. FIG. 34 illustrates a link simulation using advanced settings and weather data. FIG. 35 illustrates a link simulation in simulation mode with TDWR tower warning.

In any of these variations, the information provided may also include environmental information, describing one or more of the geography, weather, and/or RF environment. For example, the RF environment may include any of the geospectral information described above. This information may be automatically or manually entered, as illustrated in FIG. 34, showing the "advanced" information 3404 portion of the link simulation user interface. This information may also be graphically displayed on the map, as illustrated in FIG. 35, showing a potential interferer, a TDWR tower. The user interface may also warn the user that there is a potential problem with the link or links, as shown.

Figure 36:
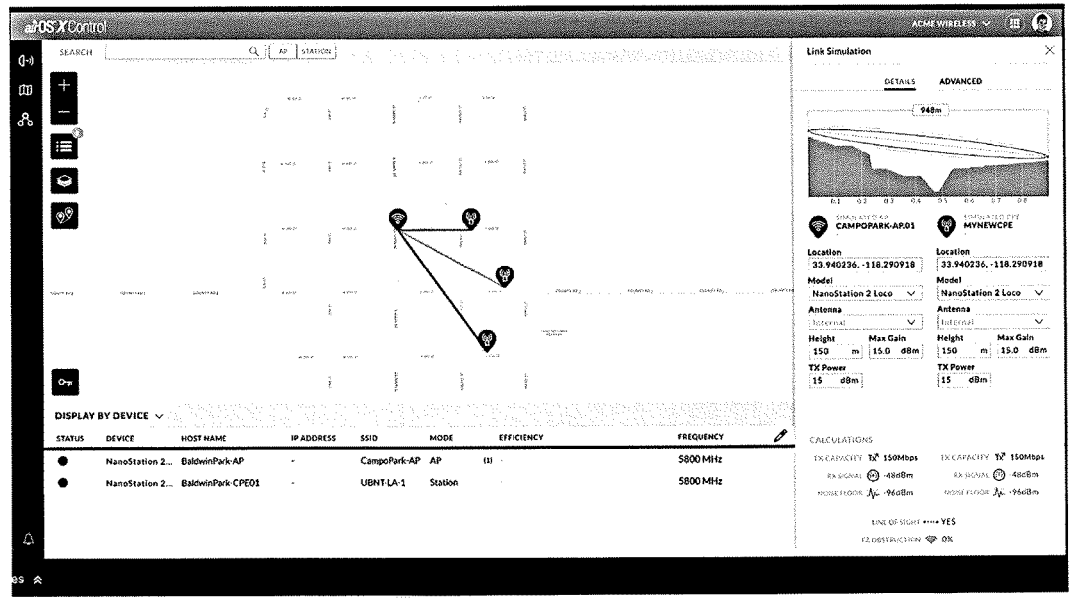
FIG. 36 is another example of a user interface including a plurality of stations (actual or simulated) connected to an AP (actual or simulated), including device specific performance and identity information as well as link simulation of one or more of the links between the AP and devices.

In some variations the apparatuses and methods described herein may also be configured to display link quality information between various points. For example, links placed on the map using the "Create Link" button may be automatically calculated based on the default device settings. An estimated quality of the link may be displayed between the two points, using a color, for example to indicate the quality of the link (e.g., green=link quality is good; yellow/orange=link quality is "ok/fair", concerns may be outlined in a calculations and Fresnel profile; red=link quality is "poor" or completely obstructed). FIG. 36 shows one illustration of this.

In some variations the apparatus or method may include controls (e.g., buttons) such as map control buttons that place two points on the map, as illustrated in FIG. 36, e.g., two markers may be placed on the map using an "Add Link Button". These points are arbitrarily placed and calculations may need to be run until the user moves one of the markers using any of various methods, and an initial link line may be determined. Locations may be set by, e.g., dragging and dropping either of the marker/pins, and/or entering a location, address or latitude/longitude in the corresponding location input. A link quality line may be determined. Dependent upon the quality of the signal, the link lines may change to reflect the average quality of the link. For example, link efficiency data may be represented by a line color. The map may also show partial quality line indicators. For example, a partial line may depict two things, and average quality of the link signal, and the point where the Fresnel profile is obstructed. If there is a partial obstruction of the outer 30% of the Fresnel profile, the quality may be degraded but the signal may be usable. This may be displayed this for the user. In addition, efficiency bars may be displayed. Efficiency may be calculated using real world signal analysis (or a simulation thereof). In the simulations described herein the simulated data may be marked as such to alert the user (e.g., by indicating with a label such as "efficiency is simulated at 100%"). FIGS. 37A and 37B illustrate link simulation details.

Figure 38:
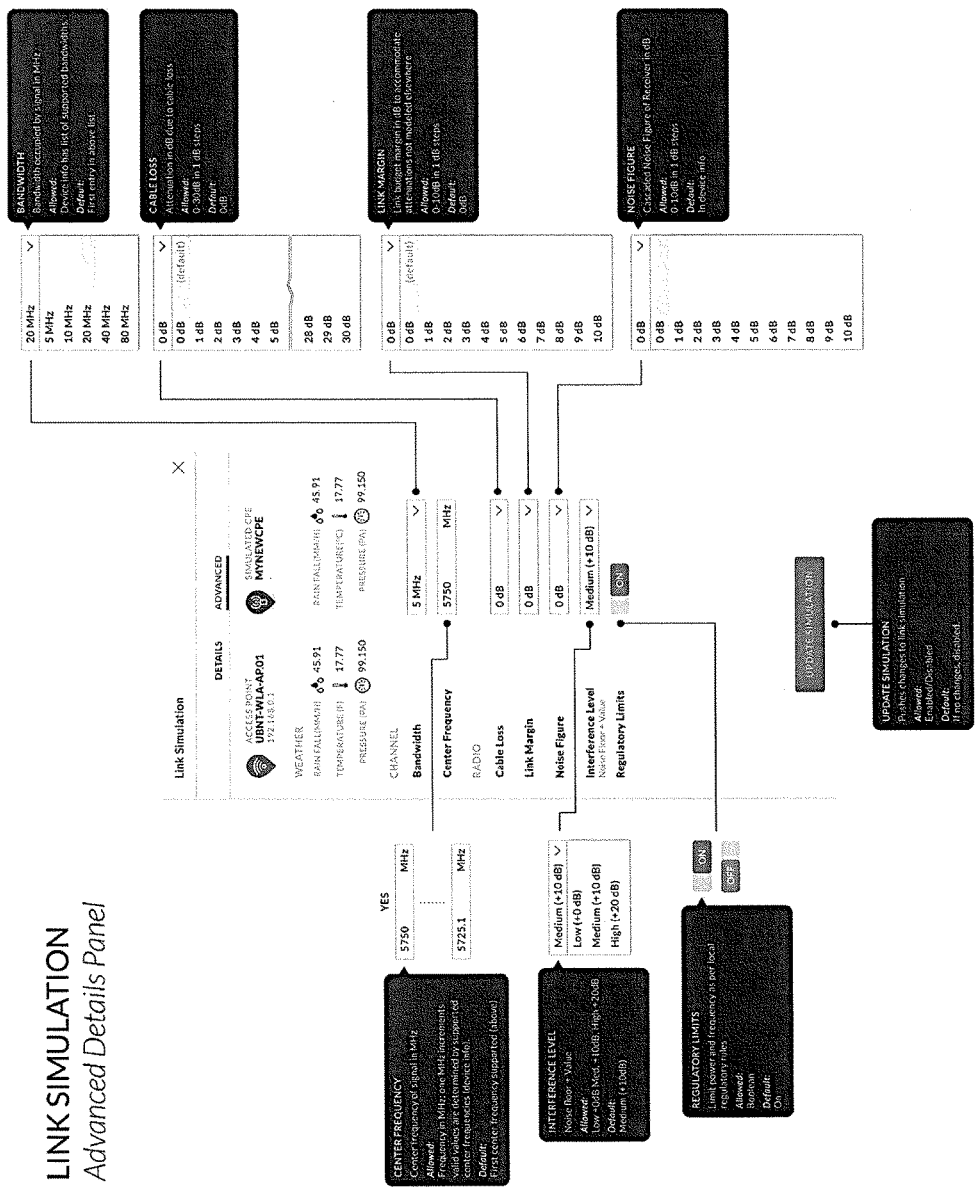
FIG. 38 is a detailed view of one of the user interface display (advanced details) panels such as the one shown in FIG. 37B.

FIG. 38 illustrates details from a link simulation user interface. In this example, the ranges of allowed and disallowed values for the center frequency parameters, interference level parameters, bandwidth, cable loss, link margin, noise figure, and a toggle for regulatory limits ("on/off") are illustrated. The interface may also include button updating the simulation. Ranges may be predefined (as shown), undefined, and/or user-defined. FIG. 38 also illustrates some of the components that may be used to determine the link simulation, including the simulation of the Fresnel profiles shown. For example, the weather information (average rainfall, temperature, pressure, etc.) at each end of a link, channel information (bandwidth, center frequency), radio information between the link (cable loss, link margin, noise figure, interference level, regulatory limits, etc.). These factors may be input manually or automatically (e.g., from the database) based on the location and/or the type (including make/model) of equipment forming the ends of the link. When multiple devices are communicating with one or more end of the link (e.g., when an AP is communicating with multiple devices including the device forming the end of the link), the properties may be adjusted based on the presence/operation of the other devices in the network, such as the effect on the overall behavior of the AP.

Figure 39:
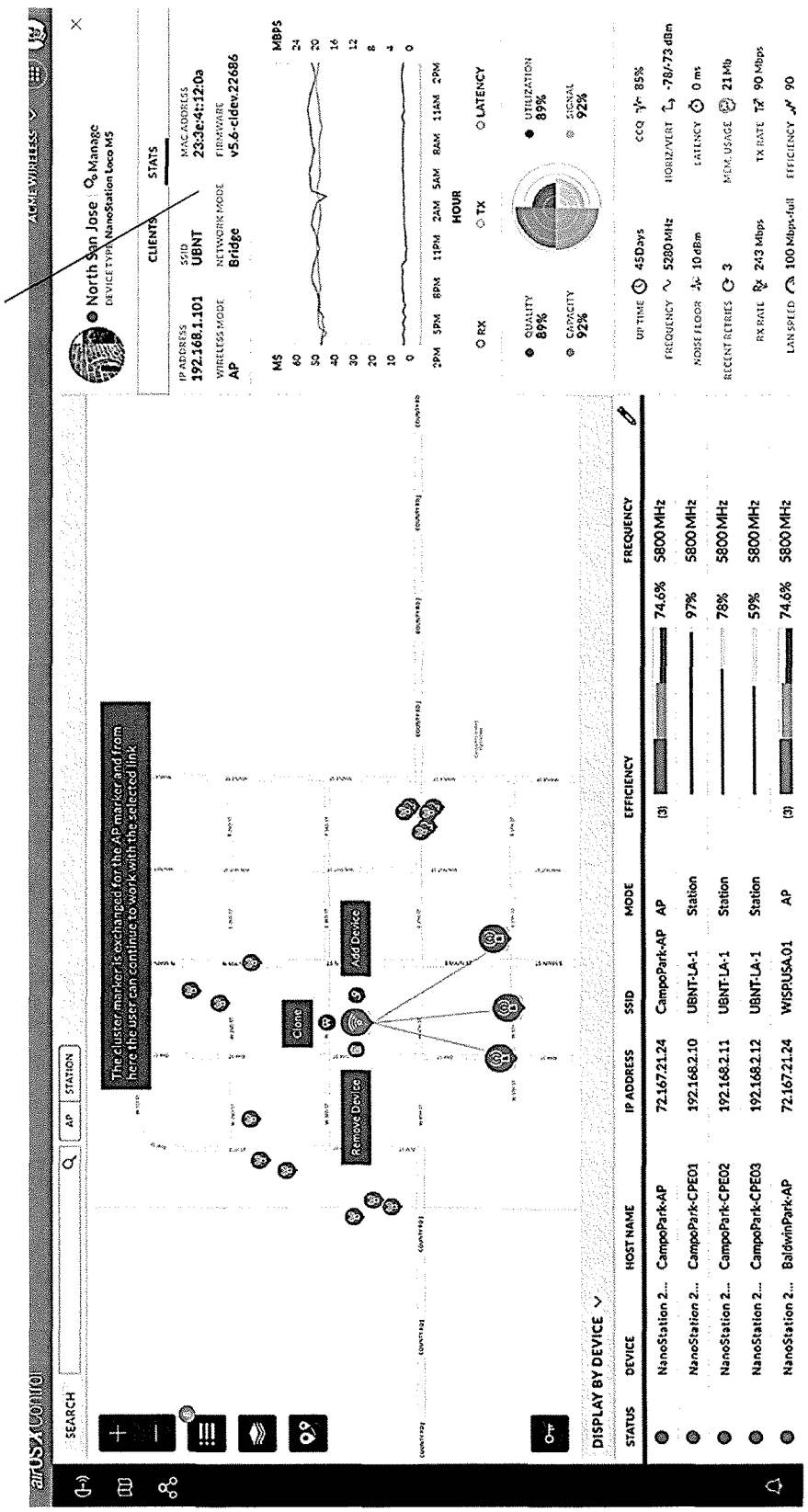
FIG. 39 illustrates one example of operation of a user interface for a link simulation tool/method as described herein.

FIG. 39 illustrates an alternative view of a user interface including a link simulator. In this example, as described above, the user may interactively place one or more device in the network and may simulate actual or hypothetical links and see how they impact the performance of the network. In FIG. 39, this is illustrated as shown in the right side 3905 portion of the display, showing statistics about the selected device (in this example, the access point "North San Jose"). This information may be provided by the database and/or derived and calculated from database information by the tool.

Figure 40:
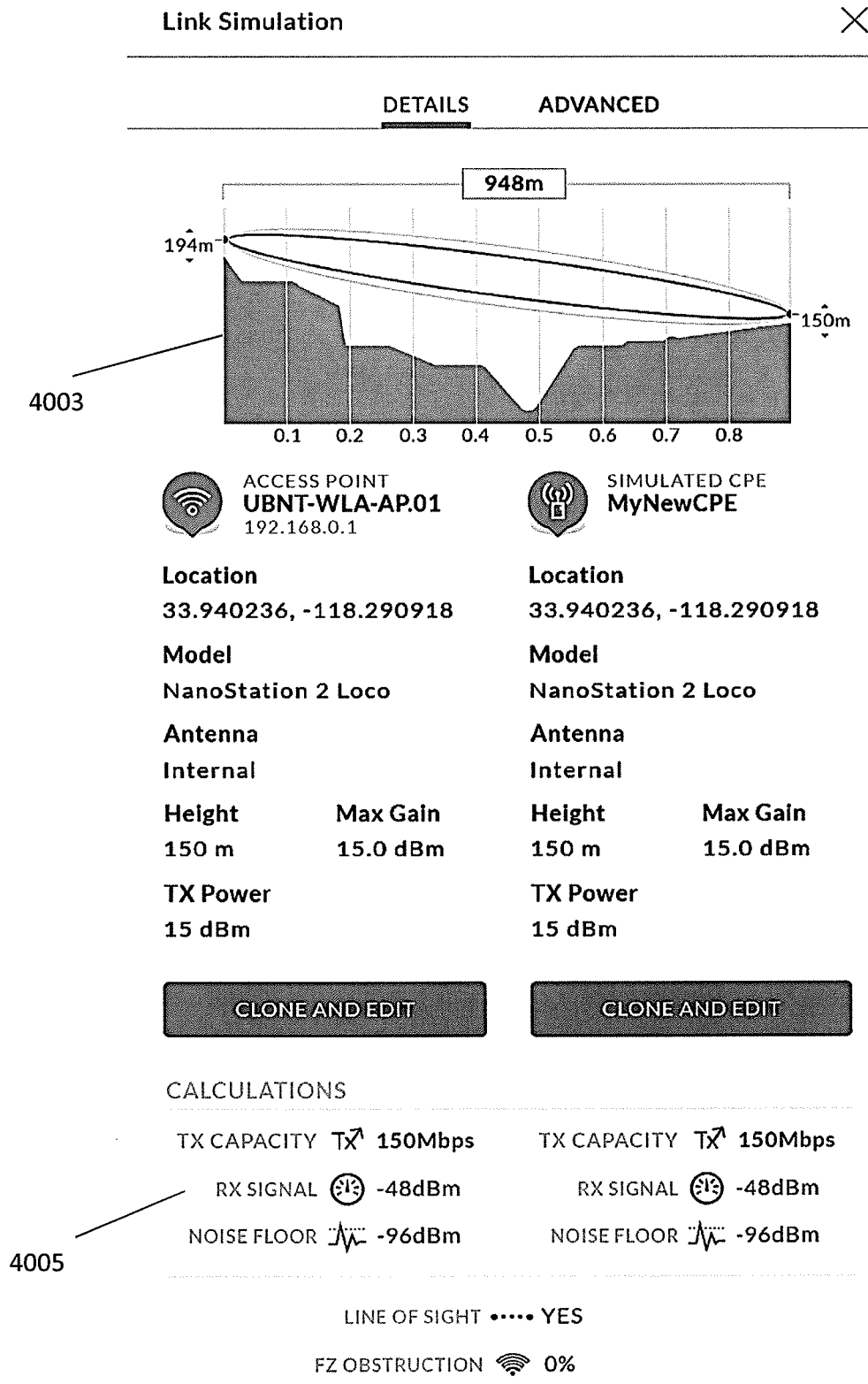
FIG. 40 illustrates one example of a link simulation window of a user interface, showing display of the Fresnel profile of the link, functional information about the link and information about the devices forming the link.

FIG. 40 illustrates an example of a link simulation display of the tool, in which a detailed Fresnel profile of the link is shown graphically 4003, above a description of the device properties, and the resulting link simulation calculations 4005.

In general, where a method is described herein, this disclosure supports and functionally describes (and illustrates) a tool that may perform the method. Any of these tools may include user interface and may include (or may include control logic for controlling) a processor that may communicate with a database (e.g., a cloud database). For example, FIG. 41 schematically illustrates one variation of a tool 4100 that may be configured as a tool for assisting in the configuration of a wireless network and/or a tool for building a cloud database, and/or a tool for automatically determining and displaying a topographical representation of a wireless network, and/or a tool for simulating one or more links in a network.

Figure 41:
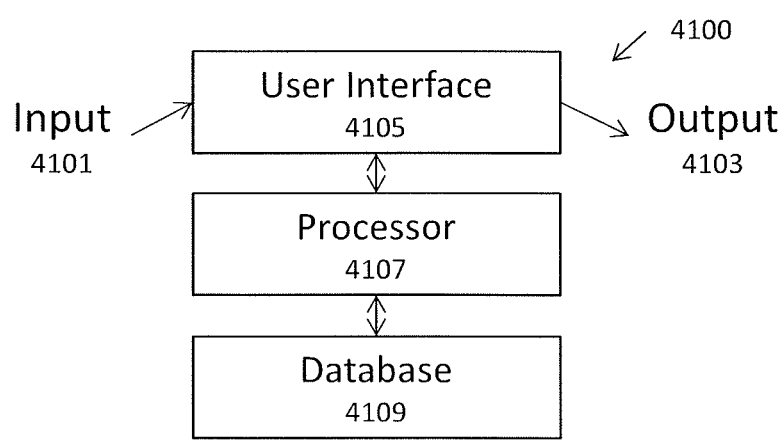
FIG. 41 illustrates one variation of a tool as described herein.

For example, in FIG. 41, the tool includes a user interface 4105, which may be any of the user interfaces described herein. The user interface may be software, hardware, firmware, or some combination thereof. The user interface may be configured to receive user and/or database input 4101 into the user interface, and to output 4103 the appropriate output for presentation to the user, including displays such as any of the displays described herein. The tool may also include a processor 4107 (e.g., processing circuitry, and/or memory, which may be programmable). The processor may, in particular, be configured to receive input from the user interface and may provide output to be displayed/presented by the user interface. The processor may also be connected to a database 4109 such as a geospectral databased, or any other database as described herein; data may be added to the database and it may be provided to the processor.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein. Per M.P.E.P. § 2173.05(b), one of ordinary skill in the art would know what is meant by "substantially equal". For example, the phrase "substantially equal" or "substantially the same" in a statement such as "a fourth RF signal having substantially the same carrier frequency as a first RF signal" may mean a radio receiver that receives either RF signal may operate in an equivalent manner.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of persistent spectrum analysis of an operating frequency band, the method comprising:
    transmitting and receiving wireless information within the operating frequency band from each of a plurality of wireless radio devices that are separated geographically from each other and in wireless communication with an access point in a network;
    monitoring the frequency spectrum of the operating frequency band over time to detect a set of spectrum information of the operating frequency band from each of the wireless radio devices simultaneously with, and independently of, transmitting and receiving the wireless information;
    periodically transmitting to a spectrum analysis engine the sets of spectrum information detected along with information identifying a geographic location of the wireless radio device that detected each set of spectrum information, wherein each set of spectrum information is time stamped;
    creating a geographic database of spectrum information over time at the spectrum analysis engine using the sets of spectrum information;
    determining a measure of efficiency for each of the plurality of wireless radio devices;
    simulating, using the spectrum analysis engine, the addition of a new wireless radio device having predetermined operating characteristics to the network at a plurality of different geographic locations and determining a new measure of efficiency for each of the plurality of wireless radio devices and the new wireless radio device at the different geographic locations;
    providing, from the spectrum analysis engine, a link simulation for the new wireless radio device at each of the plurality of different geographic locations including a Fresnel profile; and
    configuring the new wireless radio device at the new geographic location having the provided operating characteristics.

2. The method of claim 1, wherein the plurality of wireless radio devices are wireless stations.

3. The method of claim 1, wherein monitoring comprises monitoring the frequency spectrum of the entire operating band.

4. The method of claim 1, wherein transmitting and receiving comprises transmitting and receiving in one or more channels within the operating frequency band.

5. The method of claim 1, wherein transmitting comprises transmitting information identifying at least one of the time or date that the set of spectrum information was detected.

6. The method of claim 1, wherein transmitting comprises transmitting information identifying the wireless radio device that detected the set of spectrum information.

7. The method of claim 1, wherein monitoring the frequency spectrum of the operating frequency band comprises storing one or more sets of spectrum information of the operating frequency band in the wireless radio devices collecting the one or more sets of spectrum information.

8. The method of claim 1, further comprising updating the geographic database of spectrum information with additional sets of spectrum information detected at different times from each of the plurality of wireless radio devices.

9. A method of building a geographic database of spectrum information for an operating frequency band, the method comprising:
    monitoring a frequency spectrum of the operating frequency band to detect a set of frequency spectrum information of the operating frequency band from each of a plurality of wireless radio devices in a network, wherein each of the wireless radio devices both monitors the frequency spectrum of the operating frequency band and transmits and receives wireless information;
    encoding, in each wireless radio device, an enriched set of frequency spectrum information, wherein the enriched set of frequency spectrum information includes the set of frequency spectrum information and a geographic location of the wireless radio device that detected the set of frequency spectrum information;

transmitting the enriched set of frequency spectrum information from each wireless radio device to a spectrum analysis engine;

aggregating the enriched sets of frequency spectrum information to create a geographic database of spectrum information over time;

determining a measure of efficiency for each of the plurality of wireless radio devices;

simulating, using the spectrum analysis engine, the addition of a new wireless radio device having predetermined operating characteristics to the network at a plurality of different geographic locations and determining new measure of efficiency at the different geographic locations for the new wireless radio device and each of the plurality of wireless radio devices;

providing, from the spectrum analysis engine, a link simulation for the new wireless radio device at each of the different geographic locations including a Fresnel profile display and; and locations including a Fresnel zone; and configuring the new wireless radio device at the new geographic location having the provided operating characteristics.

10. The method of claim 9, wherein at least some of the wireless radio devices are access points.

11. The method of claim 9, wherein monitoring comprises monitoring the frequency spectrum of the entire operating band.

12. The method of claim 9, wherein each of the wireless radio devices independently and simultaneously monitors the frequency spectrum of the operating frequency band and to transmit and receive wireless information with other wireless radio devices.

13. The method of claim 9, wherein each of the wireless radio devices transmits and receives wireless information in one or more channels within the operating frequency band.

14. The method of claim 9, wherein encoding comprises including in the enriched set of frequency spectrum information identifying at least one of the time or date that the set of spectrum information was detected.

15. The method of claim 9, wherein encoding comprises including in the enriched set of frequency spectrum information identifying the wireless radio device that detected the set of spectrum information.

16. The method of claim 9, wherein monitoring the frequency spectrum of the operating frequency band comprises storing one or more sets of spectrum information of the operating frequency band in the wireless radio devices collecting the one or more sets of spectrum information.

17. The method of claim 9, further comprising updating the geographic database of spectrum information with additional sets of spectrum information detected at different times from each of the plurality of wireless radio devices.

* * * * *